(12) United States Patent
Duffy et al.

(10) Patent No.: US 11,331,796 B2
(45) Date of Patent: May 17, 2022

(54) AUTONOMOUS MULTI-TASKING MODULAR ROBOTIC SYSTEM

(71) Applicant: Brain Corporation, San Diego, CA (US)

(72) Inventors: Phil Duffy, San Diego, CA (US); Jim McCullough, San Diego, CA (US); Eugene Izhikevich, San Diego, CA (US); Nicole Renke, San Diego, CA (US); Justin Couvignou, San Diego, CA (US); Jimmy Kim, San Diego, CA (US)

(73) Assignee: Brain Corporation, San Diego, CA (US)

( * ) Notice: Subject to any disclaimer, the term of this patent is extended or adjusted under 35 U.S.C. 154(b) by 512 days.

(21) Appl. No.: 16/271,234

(22) Filed: Feb. 8, 2019

(65) Prior Publication Data
US 2019/0248007 A1 Aug. 15, 2019

Related U.S. Application Data

(60) Provisional application No. 62/757,851, filed on Nov. 9, 2018, provisional application No. 62/741,915, filed on Oct. 5, 2018, provisional application No. 62/679,342, filed on Jun. 1, 2018, provisional application No. 62/670,161, filed on May 11, 2018, provisional application No. 62/629,516, filed on Feb. 12, 2018.

(51) Int. Cl.
  *B25J 9/16* (2006.01)
  *B25J 15/00* (2006.01)
  *B25J 15/04* (2006.01)

(52) U.S. Cl.
  CPC .......... *B25J 9/1615* (2013.01); *B25J 9/1653* (2013.01); *B25J 15/0066* (2013.01); *B25J 15/0483* (2013.01)

(58) Field of Classification Search
  CPC .... B25J 9/1615; B25J 9/1653; B25J 15/0483; B25J 15/0066; B25J 5/007; B25J 9/08; E01H 1/00; A47L 2201/02; A47L 9/28; A47L 2201/00
  See application file for complete search history.

(56) References Cited

U.S. PATENT DOCUMENTS

2012/0169497 A1* 7/2012 Schnittman ........... A47L 9/2894
  340/540
2017/0057081 A1* 3/2017 Krohne ..................... B25J 5/007
2017/0282089 A1* 10/2017 Wang ....................... G09B 5/00

* cited by examiner

*Primary Examiner* — Basil T. Jos
(74) *Attorney, Agent, or Firm* — Reed Smith LLP; Sidharth Kapoor

(57) ABSTRACT

Systems and methods for a universal connection interface between a robot and a plurality of modular attachments are disclosed. The connection interface includes a data connection and a dynamic amplifier configured to adjust output of at least one electromechanically coupled mechanical output; and a processor configured to control gain of the dynamic amplifier.

28 Claims, 32 Drawing Sheets

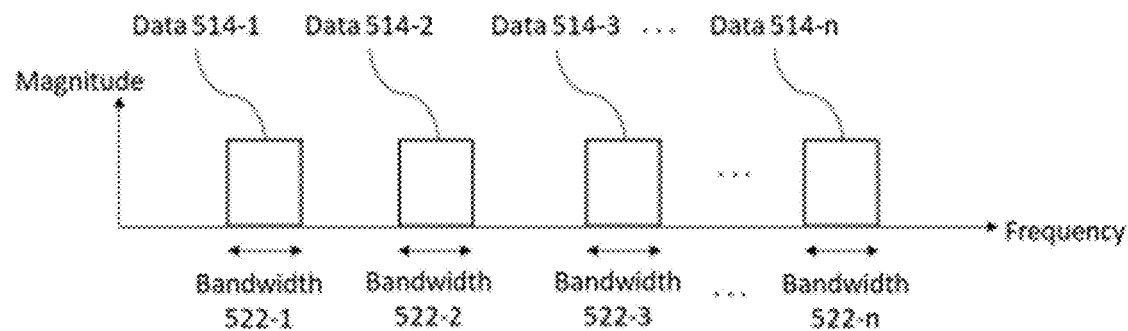
FIG. 5C
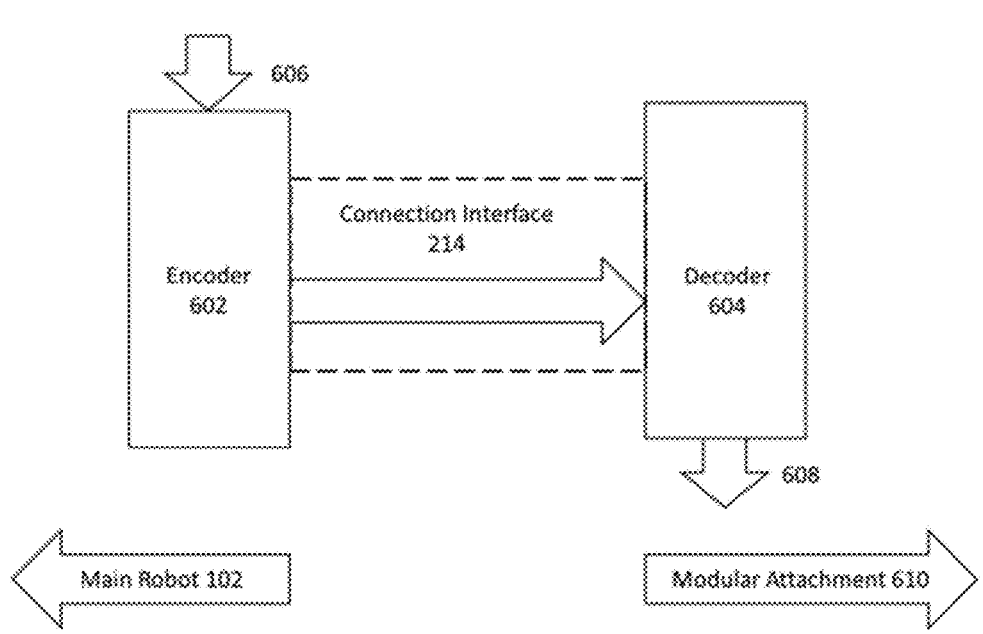
FIG. 6A
FIG. 6B

| Header ID Binary | Header ID Number | Operation |
|---|---|---|
| 0 (...000) | 1 | Connection Test |
| 1 (...001) | 2 | Connection Confirmed |
| 2 (...010) | 3 | Close Connection |
| 3 (...011) | 4 | Assign Header ID |
| 4 (...100) | 5 | Send data of type 1 |
| 5 (...101) | 6 | Receive data of type 1 |
| ... | ... | ... |
| 25 (...11001) | 26 | NULL |
| 26 (...11010) | 27 | NULL |
| ... | ... | ... |

Fixed-Height; Brain on Top

Variable-Height; Brain in Base

Variable-Height; Brain on Top

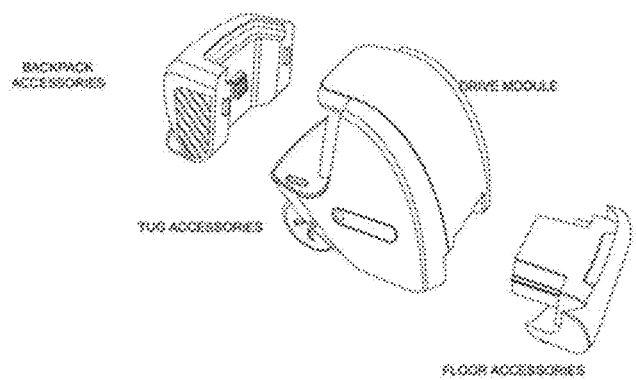
Fig. 26A
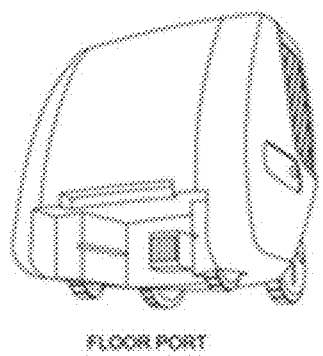
Fig. 26B
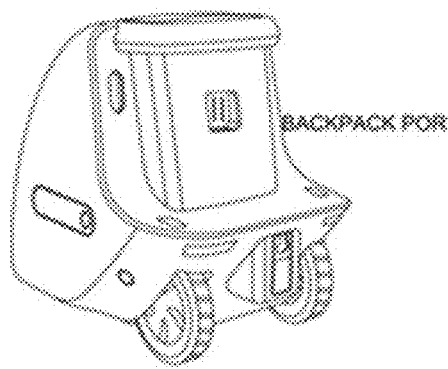 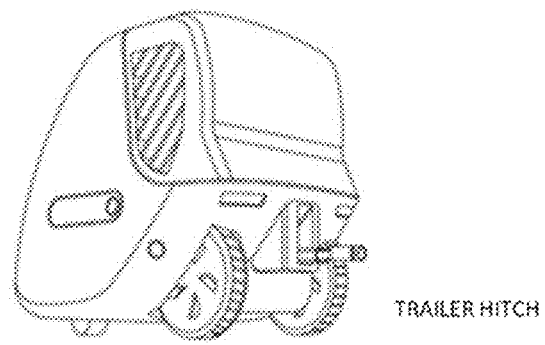
Fig. 26C                Fig. 26D

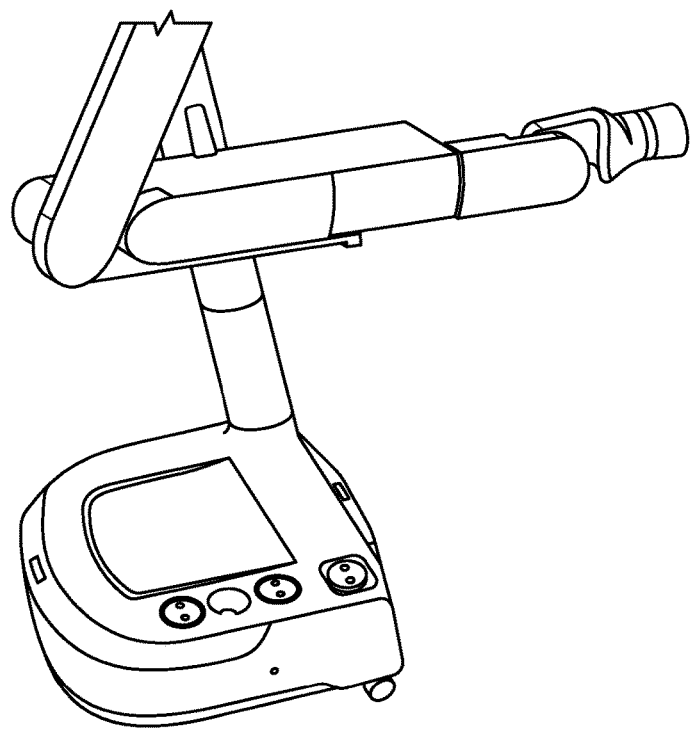
FIG. 43
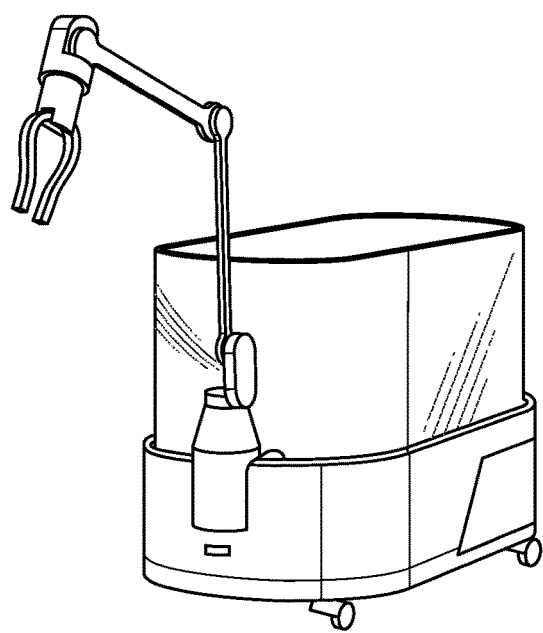 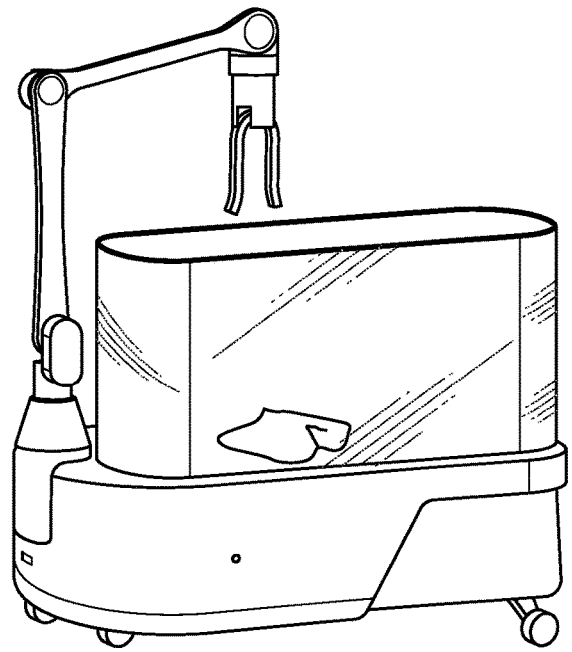
FIG. 44A                FIG. 44B

AUTONOMOUS MULTI-TASKING MODULAR ROBOTIC SYSTEM

CROSS-REFERENCE TO RELATED APPLICATIONS

This application claims benefit of the earlier prior-filed applications; U.S. Patent Application No. 62/629,516 filed Feb. 12, 2018; U.S. patent application Ser. No. 62/670,161 filed May 11, 2018; U.S. patent application Ser. No. 62/679,342 filed Jun. 1, 2018; U.S. Patent Application No. 62/741,915 filed Oct. 5, 2018; and U.S. Patent Application No. 62/757,851 filed Nov. 9, 2018; the entire contents for each of such applications are hereby expressly incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for a universal connection interface for robotic modular attachments and an autonomous modular robotic system for moving through a physical space and conducting tasks. The example embodiments herein more particularly, relates to a system and robotic device to perform multiple tasks. The systems provide apparatuses, and methods for multi-tasking robots that may be used in various home or commercial applications. Home applications include, for example, cleaning, scrubbing, washing dishes, doing laundry, and mopping.

Background

Robotic technology is under development in many academic and industrial environments. With the continuous improvement of living standards and advances in technology, it is desirable for more activities to be automated or conducted by an autonomous robotic system. Robotic devices are used in a variety of applications, such as manufacturing, medical, safety, military, exploration, cleaning and/or other applications. Autonomous devices are now becoming part of the home environment to perform repetitive activities including cleaning and yard maintenance tasks. Some existing robotic devices are configured to travel through a physical space to conduct a task. However, the conventional technology is limited to a single robotic module that performs independently of another robotic module. However, as more of these activities are automated, a proliferation of specialized autonomous devices can result. It is desirable that fewer autonomous devices can be used to perform multiple tasks.

Currently, designing a single robot to perform a plurality of tasks of varying complexity autonomously may be difficult if not impossible based on the complexity of the tasks. Accordingly, a robotic design comprising a main robot and a plurality of modular attachments may allow the main robot to perform a wide variety of tasks with the plurality of modular attachments.

For example, a robot operating in a supermarket may be tasked with cleaning a floor, take inventory of the contents of an aisle, and pick up and relocate items from shelves. The robot may first attach to a cleaning module and clean the floor. The robot may then retrieve a second camera module to collect data on items on shelves of the aisle. Lastly, the robot may retrieve a third gripper arm module to grab and reposition items on shelves.

As illustrated in this example, the robot may use the plurality of modular attachments to perform the tasks of varying complexity, however each module may require different inputs from the robot therefore requiring a plurality of different connection interfaces to be positioned on the robot chassis. The plurality of different connection interfaces may be inefficient for a designer of a robot, may make it difficult for a robot to attach to a plurality of modules, and may not be aesthetically pleasing to a human observer. Accordingly, there is a need in the art for improved systems and methods for a universal connection interface between a main robot and a plurality of modular attachments of varying complexity.

SUMMARY

The invention overcomes the above problem by providing, inter alia, systems and methods for a universal connection interface for robotic modular attachments. In some exemplary embodiments, the universal connection interface may provide a modular attachment with electrical and mechanical input. The universal connection interface provides a system and/or robotic device to perform multiple tasks.

Exemplary embodiments described herein have innovative features, no single one of which is indispensable or solely responsible for their desirable attributes. Without limiting the scope of the claims, some of the advantageous features will now be summarized.

In an exemplary embodiment, a universal connection interface is disclosed. The universal connection interface may comprise at least one data connection configured to send and receive electrical signals between a main robot and a modular attachment. The universal connection interface may further comprise at least one mechanical output to be mechanically coupled to a mechanical input of a modular attachment. Additionally, the universal connection interface may comprise a connection unit configured to securely attach the data connections and mechanical outputs to a modular attachment.

One aspect of the disclosure relates to an autonomous robotic system that may comprise a control module comprising a central processing unit, memory, and a set of computer readable instructions. The system may further comprise at least one sensor, and a drive module comprising a plurality of wheels, at least one of which is steerable and at least one of which is in operational connection to a motor to drive the module. The drive unit is attached to a module wherein the module has a plurality of accessories like backpack accessories, trailer accessories and floor or ground accessories. By attaching a plurality of accessories to the module and drive unit, the robotic system can perform multiple tasks. The system may comprise a wireless communication device, an application, a data transmitting unit and a data receiving unit. The wireless communication device sends a voice command via an application to the robotic device. The robotic device then receives the data from the data transmitting unit through the data receiving unit.

Also, the system may further comprise at least one task module configured to perform a task or set of tasks as instructed by the control module; wherein the control module is in operative connection to the drive module and the at least one task module. The central processing unit may be configured to function as an adaptive computerized predictor apparatus by receiving input from the at least one sensor and operate in accordance with a learning process based on the sensor input to determine a path of motion through a space and control the motion of the drive module through the space, and function as a controller to direct the task module to perform its task.

The learning process may comprise: at a first time instance, based on a sensory context, causing the predictor apparatus to generate the robot control output; providing the predicted robot control output as the teaching input into the learning process; and at a second time instance subsequent to the first time instance, causing the predictor apparatus to generate the predicted robot control output based on the sensory context and the teaching input. The predicted robot control output may be configured to cause the robot to perform an action consistent with the sensory context.

According to example embodiments, provided is a robot for providing a degree of freedom of motion to an accessory device, comprising a docking port configured to have the robot dock and undock from the accessory device, the docking port including one or more of a mechanical plug and an electrical plug; and a storage unit configured to store a map of one or more locations. According to example embodiments, the accessory device is configured to dock by an autonomously navigating device, receive a degree of motion movement from an external device, and maneuver autonomously; and the robot is configured to select one or more programs based on the accessory, configured to assign labels to one or more locations, and configured to maneuver autonomously. According to example embodiments the accessory device and the robot are configured to follow one or more users to one or more locations.

In view of the foregoing, an example embodiment herein provides a robotic device to perform a variety of tasks. The robotic device comprises a drive unit, a control module and an accessory task module. The accessory module is removably attached to the drive unit. The accessory module comprises a plurality of accessories like backpack accessories, trailer accessories and floor or ground accessories to perform multiple household and yard maintenance tasks. The drive unit has ports such as a floor or ground port, a backpack port and a trailer hitch for the attachment of accessories.

According to example embodiments, the task performed by the at least one task module is selected from the group consisting of: cleaning, mopping, vacuuming, dusting, purifying, carrying, reaching, retrieving, serving and delivering. Cleaning may comprise surface cleaning wherein the surface is a floor, wall, corner, baseboard, shelf, and or counter. Purifying may comprise filtering air, water or other fluid. Carrying, retrieving, serving and delivering comprise transferring an object from one location to another location.

Yard maintenance tasks include mowing, vacuuming, sweeping, blowing, scrubbing, fertilizing, edging, string trimming, weeding, hedge trimming, and leaf collecting. In one example embodiment, the floor or ground accessories include mower, vacuum, yard vacuum, sweeper, hard surface scrubber, and other accessories. In an example embodiment, the backpack accessories may comprise modules for detail cleaning, such as vacuuming or wiping baseboards and corners, edge trimming of lawns, hedge trimming, pickup arm and other backpack accessories. In embodiments, the trailer accessories may comprise modules for fertilizing or leaf collecting. In another example embodiment, the trailer hitch is attached to a utility cart.

In another exemplary embodiment, a method for a main robotic device to perform a plurality of tasks of varying complexity using a plurality of modular attachments is disclosed. The plurality of modular attachments may vary in complexity, function, design, or other parameter and may be configured to perform a plurality of tasks of varying complexity. The method comprises the main robot, upon being assigned a set of tasks, navigating to a plurality of modular attachments, attaching the modular attachments to the main robot using a universal connection interface, and performing the set of tasks using the plurality of modular attachments.

Another embodiment is a system and device to perform multiple tasks. The drive unit is attached to a module wherein the module has a plurality of accessories like backpack accessories, trailer accessories and ground accessories. By attaching a plurality of accessories to the module, the drive unit can perform multiple tasks.

The example embodiments disclosed herein can be performed as a method and/or by a non-transitory computer readable medium. A non-transitory computer-readable storage apparatus is disclosed. In one embodiment, the non-transitory computer-readable storage apparatus has a plurality of instructions embodied or stored thereon. The instructions, when executed by a specialized processor, may cause the processor to operate a robot associated with a modular attachment used to perform a task, test the connection once the modular attachment attached, and secure the connection using a connection unit. The instructions may further cause the processor of a main robot to send and receive data to and from, respectively, a modular attachment effectuating the control of the modular attachment by the processor of the main robot. The instructions may further cause the processor to dynamically adjust a plurality of gains corresponding to a plurality of dynamic amplifiers configured to control the mechanical output of the universal connection interface. The instructions are configured to, when executed by the processing apparatus, carry out various cleaning, yard maintenance or other tasks.

The inventive concepts disclosed are performed by features in specific and particular configuration that make non-abstract improvements to computer technology and functionality. Some of these improvements in computer technology and functionality include executing specialized algorithm by unique and specialized processor(s) that allow the processor to perform faster and more efficiently than conventional processor(s); and requires usage of less memory space as data is collected, analyzed and stored therein. Accordingly, the inventive concepts disclosed herein are an improvement over the conventional technology or prior art directed to maneuvering a robot along a trajectory that are prone to safety risks to itself, humans and objects around it. Lastly, structural components disclosed herein, such as, for example, various sensor units, navigation units, actuator units, communication units and user interface units, are oriented in a specific manner and configuration that is unique to the functioning and operation of the robotic device as it maneuvers along a path.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. Many changes and modifications may be made within the scope of the example embodiment herein without departing from the spirit thereof, and the example embodiments herein include all such modifications.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5C illustrates a plurality of data communication channels multiplexed based on carrier frequency according to an exemplary embodiment.

FIG. 6A is a functional block diagram illustrating an exemplary method for a controller of a main robot to communicate with a modular attachment and vice-versa.

FIG. 6B illustrates a data protocol used for communication between a main robot and a modular attachment according to an exemplary embodiment.

FIGS. 26A, 26B, 26C and 26D show views of an embodiment of a robotic apparatus comprising a drive unit or module adapted to physically connect with various task modules via floor, backport and trailer ports.

FIGS. 41-43 illustrate other example embodiments of a master robot coupled to a slave robot.

FIGS. 44A and 44B illustrate another example embodiment of a master robot coupled to a slave robot.

Figure 1A:
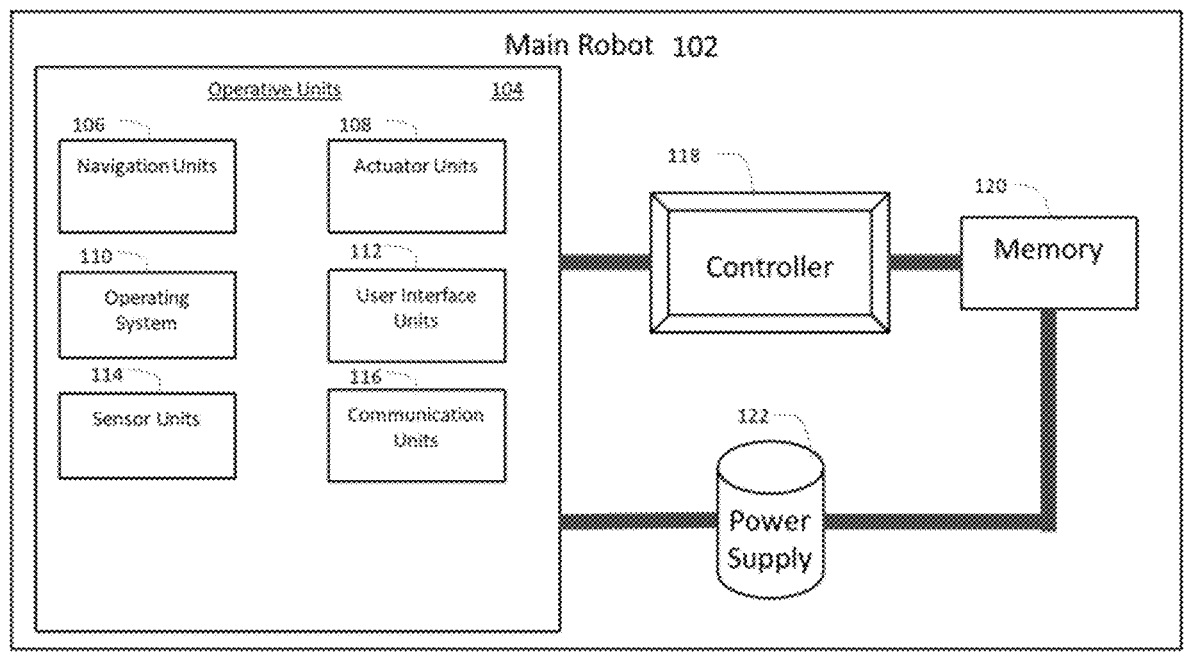
FIG. 1A is a functional block diagram of a main robot in accordance with some embodiments of this disclosure.

All Figures disclosed herein are © Copyright 2018 Brain Corporation. All rights reserved.

DETAILED DESCRIPTION

As used in the specification and in the claims, the singular form of "a", "an", and "the" include plural referents unless the context clearly dictates otherwise.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

Implementations of the present technology will now be described in detail with reference to the drawings, which are provided as illustrative examples so as to enable those skilled in the art to practice the technology. Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

The present disclosure provides for systems, apparatuses, and methods for operating a main robot comprising a universal connection interface configured to connect the main robot to a plurality of modular attachments to perform tasks of varying complexity.

The present disclosure provides for systems, apparatuses, and methods for precise navigation of robots using motion primitives and cost evaluation.

The example embodiments herein achieve this by providing a system and robotic device to perform multiple tasks.

The autonomous robot system described herein provides a customizable, expandable system that allows a user to select task modules that meet the user's needs. A plurality of task modules may be selected and combined with a mobile drive module, all of which are controlled by a common control module. The system may be expanded beyond a single drive robotic unit by networking a plurality of mobile units to a single control hub.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, a robot or master robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, the complexity of a modular attachment may be based on the number of degrees of freedom (DOF) of the modular attachment, the number of motors/actuators to be controlled by a main robot, processing power required to operate the modular attachment, or any combination thereof. Similarly, as used herein, the complexity of a task may be based on the complexity of the modular attachment needed to perform the task; the length, duration, or number of steps comprising the task; or any combination thereof. For example, a passive antenna modular attachment may be of low complexity when compared to a gripper arm modular attachment of high complexity wherein the gripper arm may comprise multiple degrees of freedom, motors, and sensors to be controlled by the main robot.

As used herein, modular attachments may include appliances, machines, and/or equipment configured to enable a main robot to perform additional or specialized tasks. According to at least one non-limiting exemplary embodiment, the modular attachment may include one or more motors that drives the motions of the modular attachment based on control signals sent by a main robot through a connection interface. According to at least one non-limiting exemplary embodiment, a modular attachment may include one or more specialized processor configured to execute computer readable instructions from a non-transitory computer readable storage medium. The specialized processor may receive the computer readable instructions from a main robot, using a connection interface, or form a storage medium on the modular attachment. According to at least one non-limiting exemplary embodiment, a modular attachment may include one or more sensors configured to generate data on state parameters of the modular attachment and/or collect data from a surrounding environment. According to at least one non-limiting exemplary embodiment, a modular attachment may operate fully autonomously, semi-autonomously, or fully under the control of a main robot, wherein a main robot may serve to position the modular attachment, communicate with the modular attachment, and/or determine when the modular attachment acts autonomously.

Figure 2:
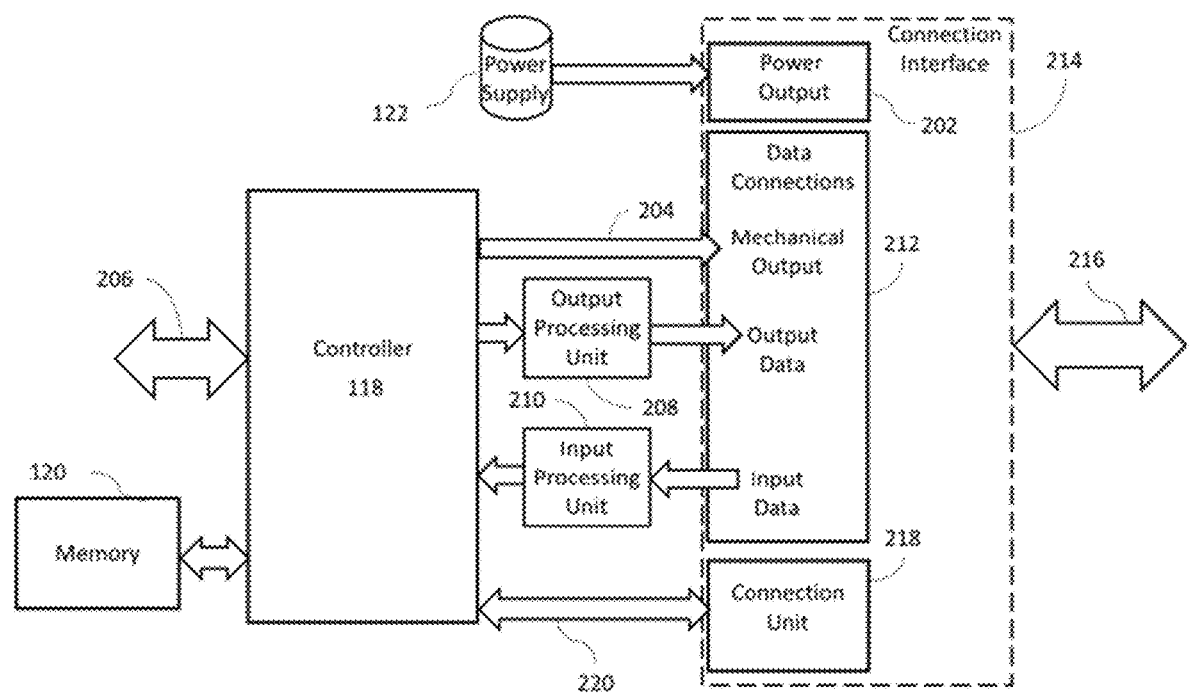
FIG. 2 illustrates a functional block diagram of a controller of a main robot communicating with a connection interface in accordance with some embodiments of this disclosure.

As used herein, a main robot connecting or attaching to a modular attachment may comprise a proper connection of a connection interface, illustrated in FIG. 2, on the main robot to a connection interface of the modular attachment; wherein, a proper connection may comprise data connections, mechanical outputs, and connection units of the connection interface to function without error.

As used herein multiplexing data may comprise any system and method for sending a plurality of data channels simultaneously across a single connection. Similarly, demultiplexing data may comprise a system and method for receiving a single input and separating the single input to a plurality of data channels based on the multiplexing method used. Exemplary methods for multiplexing and demultiplexing data according to exemplary embodiments are disclosed herein with respect to FIG. 5B-C, discussed below.

As used herein, a modular attachment or module may comprise of a system configured to attach and detach from a robot to enhance functionality and/or capabilities of a robot to perform one or more specific tasks. For example, a module may comprise a vacuum attachment such that a robot may attach to the vacuum module to perform vacuuming.

As used herein, the term "bus" is meant generally to denote all types of optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" and the like may include one or more of, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, the terms "processor", "microprocessor" and "digital processor" and the like may include any type of digital processing device such as, without limitation, one or more digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/300 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc.

As used herein, connection, link, and/or wireless link may include a causal link between any two or more entities (whether physical or logical/virtual), which enables information exchange between the entities.

Domestic autonomous robots have been designed to carry out a single function such as vacuuming, mopping or mowing. Recently, some domestic power tools have been designed to be modular, with a single power pack and motor or drive unit that is configured to operate interchangeable task modules. For example, small electric-powered hand tools such as drills and/or saws have been made modular. Larger devices, such as gasoline or electric powered equipment to carry out domestic yard chores such as mowing, tilling, leaf blowing, and/or snow blowing have also been developed. These modular devices are still operated by humans to carry out the task for a given module. It would be desirable to develop a robotic system capable of autonomous movement and control of more than one repetitive task.

Disclosed herein is a robotic system which comprises a robotic apparatus comprising a drive unit or module adapted to physically connect with various task modules, according to one or more implementations. Controlled by a control module, the drive unit transports the various task modules to locations in a space such as a room, house, yard, shop, warehouse and the like where the task assigned to the task module is to be conducted. The control module instructs the task module to carry out its task, according to its dedicated task instructions.

Figure 15:
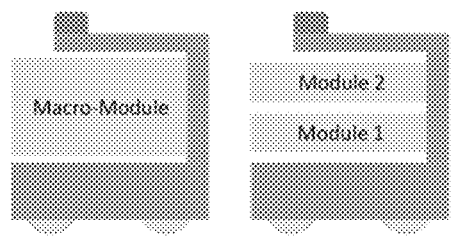
FIG. 15 is a schematic diagram illustrating a robotic apparatus comprising a drive unit or module adapted to physically connect with various task modules for cleaning functions, according to one or more implementations.
Figure 15:
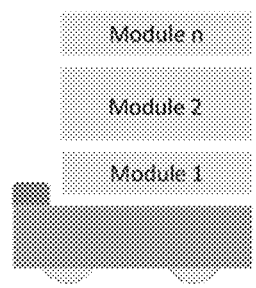
Figure 15:
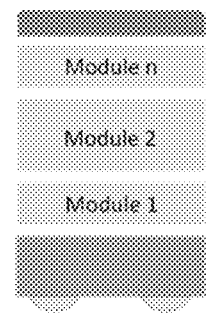
Figure 16:
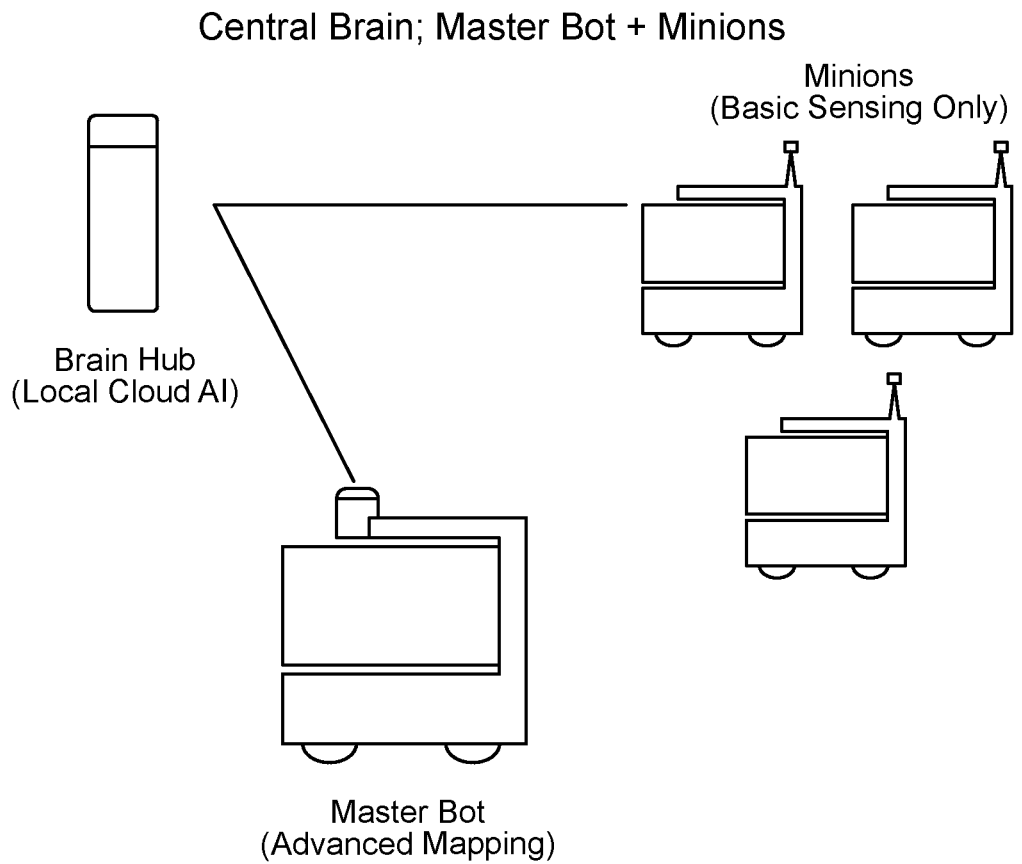
FIG. 16 is a schematic diagram illustrating a robotic apparatus comprising a drive unit or module adapted to physically connect with various task modules for yard maintenance functions, according to one or more implementations.

The autonomous robot system described herein provides a customizable, expandable system that allows a user to select task modules that meet the user's needs. As shown and discussed in more detail in reference to FIGS. 15 and 16, a plurality of task modules may be selected and combined with a mobile drive module, all of which are controlled by a common control module. FIG. 15 shows accessories and tasks generally related to indoor cleaning, serving, fetching and entertainment or security. FIG. 16 shows accessories and tasks generally related to outdoor yard maintenance tasks. The system may be expanded beyond a single robotic drive unit by networking a plurality of mobile units to a single control hub.

Detailed descriptions of the various embodiments of the system and methods of the disclosure are now provided. While many examples discussed herein may refer to specific exemplary embodiments, it will be appreciated that the described systems and methods contained herein are applicable to any kind of robot or modular attachment for a robot. Myriad other embodiments or uses for the technology described herein would be readily envisaged by those having ordinary skill in the art, given the contents of the present disclosure.

Advantageously, the systems and methods of this disclosure at least: (i) allow robots to perform a wide variety of tasks of varying complexity; (ii) easily switch between modules to perform the aforementioned tasks; (iii) accurately effectuate control of a modular attachment by a main robot; and (iv) reduce resource costs, such as labor, time, and energy by having a robot perform a wide variety of tasks otherwise carried out by humans.

According to some non-limiting exemplary embodiments, a main robot, utilizing a single universal connection interface, may attach to a plurality of different modular attachments of varying complexity. The universal connection interface may reduce complexity for the main robot to attach to a modular attachment since the same connection interface may be used to connect to the plurality of different modular attachments. A main robot not utilizing a connection interface may approach each module, of the plurality of different modules, differently to ensure a secure connection as each module may comprise varying levels of complexity and therefore may require different connection interfaces (e.g., ethernet, USB, etc.) from the main robot. A universal connection interface, as illustrated in this example, may enable a main robot to reduce the complexity of performing a connection by reducing the number of connection interfaces to a single universal connection interface. Additionally, the universal connection interface may enable a main robot to provide varying levels of output complexity to the modular attachment based on the complexity of the modular attachment.

For example, a main robot operating in a store may be given a series of tasks comprising cleaning a floor, stocking shelves, and recording inventory of the shelves. The main robot may navigate to a location in the store wherein a plurality of modular attachments are stored for the main robot to utilize to accomplish the series of tasks. The main robot may first navigate and connect to a scrubber attachment using a universal connection interface prior to scrubbing the floor. The main robot, upon finishing the task of floor cleaning, may navigate back to the location of the plurality of modular attachments, detach the scrubber, and attach to a gripper arm modular attachment using the same universal connection interface. The main robot may, after utilizing the gripper arm modular attachment to stock shelves, navigate back to the plurality of modular attachments and connect to a camera modular attachment using the same universal connection interface. One skilled in the art would appreciate the range of complexity of the aforementioned exemplary tasks and modular attachments, wherein the gripper arm modular attachment may comprise multiple motors, actuators, and sensors whereas the camera modular attachment may only comprise a single sensor (e.g., the camera). Advantageously, the universal connection interface may provide a single connection interface for a main robot to control a plurality of modular attachments of varying complexity to accomplish the tasks of varying complexity.

In an embodiment, the systems and methods utilize a single changing station to exchange between a plurality of modular attachments; (ii) provide a centralized hub of communications for a robot to perform its tasks; and (iii) reduce clutter associated with a robot utilizing a plurality of modular attachments to perform its tasks. Other advantages are readily discernable by one having ordinary skill in the art given the contents of the present disclosure.

According to at least one non-limiting exemplary embodiment, a module changing station system is disclosed. The module changing station system may comprise a non-transitory computer readable memory comprising a plurality of instructions embodied thereon and a specialized processor configured to execute the instructions to: detect a presence of a robot within a dock of the module changing station system, detach a current module from the robot, determine a desired module to be utilized by the robot to perform a task, and attach the desired module to the robot. The specialized processor of the module changing station system may further be configured to send and receive control and communication signals from the robot as the robot performs tasks.

According to at least one non-limiting exemplary embodiment, a method for a robot to utilize a module changing station is disclosed. The method may comprise of the robot docking within a dock of the module changing station, communicate a desired module to perform a task, and the module changing station attaching the desired module to the robot. The method may further comprise of sending and receiving control and communication signals to and from the robot as the robot performs the task.

According to at least one non-limiting exemplary embodiment, a non-transitory computer readable memory comprising a plurality of instructions embodied thereon is disclosed. The instructions, when executed by a specialized processor of a module changing station, configure the module changing station to: detect a presence of a robot within a dock of the module changing station system, detach a current module from the robot, determine a desired module to be utilized by the robot to perform a task, and attach the desired module to the robot. The specialized processor of the module changing station system may further be configured to send and receive control and communication signals from the robot as the robot performs tasks.

Figure 1B:
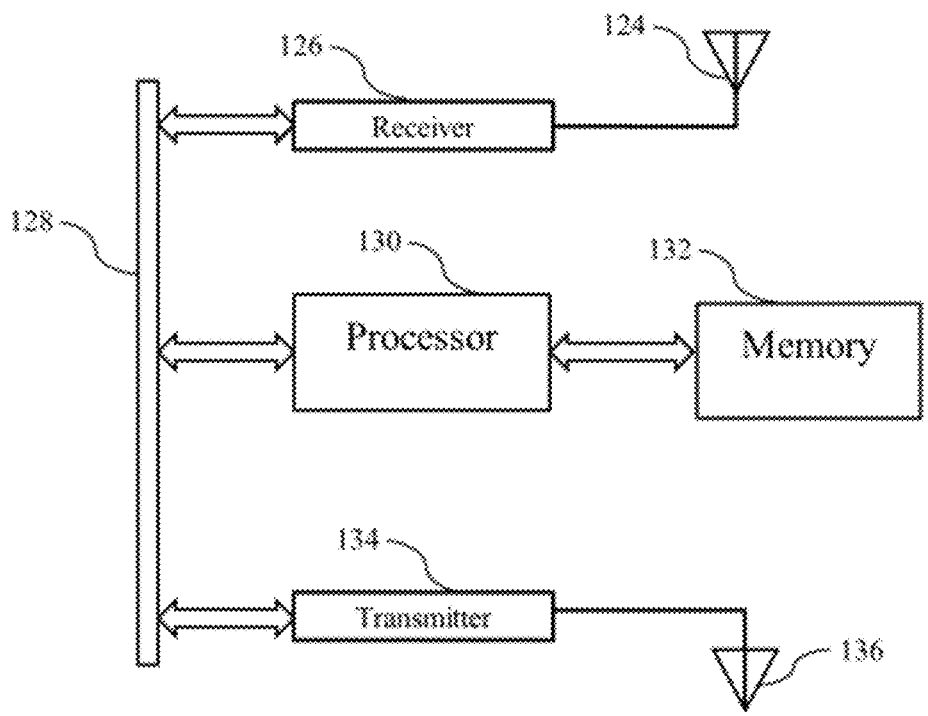
FIG. 1B is a functional block diagram of a controller or processor in accordance with some embodiments of this disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator units 108, communications units 116 and power supply 122, as well as other components and subcomponents (e.g., some of which may not be illustrated). Each of these aforementioned components can be operatively and/or communicatively coupled to each other and each other's components and/or subcomponents. Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure. The operation of the control module is described in greater detail with reference to FIG. 2. FIG. 2 is a diagram of an overall view of the autonomous device and components therein. That is, FIG. 2 illustrates an example embodiment of a functional block diagram of the autonomous devices as shown in FIGS. 1A and 1B. Again, reference to "autonomous device" is synonymous with "device" and "robot."

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as those described above.

Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

In some cases, the processing apparatus can be configured to execute the computer-readable instructions to perform various methods, features, and/or functionality described in this disclosure.

Controller 118 may be operatively and/or communicatively coupled to memory 120. Memory 120 may include any type of integrated circuit or other storage device configured to store digital data including, without limitation, ROM, RAM, NVRAM, PROM, EEPROM, DRAM, Mobile DRAM, SDRAM, DDR/2 SDRAM, EDO RAM, FPM RAM, RLDRAM, SRAM, flash memory (e.g., NAND/NOR), memristor memory, PSRAM, etc. as described above.

Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. The processing apparatus can be configured to execute the computer-readable instructions to perform various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. The operative units 104 may include one or more task modules.

Operative units 104 may include various units that perform functions for robot 102. For example, operative units 104 may include at least one of the following: navigation units 106 including mapping and localization units, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

Operative units 104 may comprise both computer-implemented instructions executed by a controller and hardcoded logic. Where operative units 104 are implemented in part in software, operative units 104 may include units/modules of code configured to provide one or more functionalities. As such, the term "units" as used herein is not a generic non-structural placeholder per se. Instead, in light of the disclosure of example embodiments disclosed herein, one skilled in the art would appreciate that the units included in the operative units 104 can be either software or hardware and/or both software and hardware. Moreover, one skilled in the art would appreciate that the aforementioned different components may be arranged in a unique and special manner that aids and promotes in functionality of the controller such that the controller may process and execute an algorithm efficiently.

Still referring to FIG. 1A, in exemplary embodiments, navigation units 106 may include systems and methods that may computationally construct and update a map of an environment and/or routes as the robot 102 navigates the environment. Mapping and localization units can record a demonstrated route in a map. In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104. By way of illustrative example, mapping and localization units can map the environment and localize the robot 102 (e.g., find the position and/or pose) in a map at one or more points in time, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

Mapping and localization units can also receive sensor data from sensor units 114 to localize robot 102 in a map. In some implementations, mapping and localization units can include localization systems and methods that allow robot 102 to localize itself in the coordinates of a map. As will be described further in this disclosure, mapping and localization units can also process measurements taken by robot 102, such as by generating a graph and/or map.

While the robot described herein may use a guide wire or other boundary indicating device as part of its mapping and localization programming, its primary means of mapping comprises a learning program instantiated within the control module combined with user and sensory input. Prior to operating the robot system described herein, a user uses remote control to drive the robot around the property to localize perimeter boundaries, zone boundaries, grassy areas, exclusion areas, hardscapes, etc. Similarly, the indoor environment can be mapped to locate rooms and furniture therein. Alternatively or additively, an application on a hand-held device such as a cell phone and/or a mapping minion robot can be used for mapping. Localization on the map can comprise ranging to at least one fixed location emitter within the user's property, such as the robot system's base station, a digital assistant, Wi-Fi modem or computer hub within the house, and/or emitter(s) located in the yard separate from the base station. Triangulation with at least two fixed location emitters can provide more accurate localization and mapping. Compass bearings and odometer measurements may also be used. GPS coordination may also be used. Mapping also includes visual or other sensing from 2D or 3D cameras, LiDARS, etc, to provide reference images to the control module that are linked to and coordinated with the ranging map. Pattern recognition software may further augment localization by defining grassy areas, mulched areas and hardscapes by their different visual appearance. The map can be easily updated if features in the yard change, such as new or expanded flower beds, new hardscape and the like without needing to dig up and move a guide wire.

Once mapping is complete, the user programs the robot to link tasks with areas and/or locations on the map. For instance, grassy areas are assigned to mowing tasks, hardscapes to sweeping, vacuuming and/or scrubbing tasks, and the like. When additional accessory modules are added to the system, their tasks and locations can be mapped similarly.

In some example embodiments, navigation units 106 can include components and/or software configured to provide directional instructions for robot 102 to navigate. Navigation units 106 can process maps and localization information generated by mapping and localization units, sensor data from sensor units 114, and/or other operative units. For example, navigation units 106 can receive a map from mapping and localization units. Navigation units 106 can also receive localization information from mapping and localization units, which can be indicative at least in part of the location of robot 102 within the map, including a route. Navigation units 106 can also receive sensor data from sensor units 114 which can be indicative at least in part of objects around robot 102. Using one or more of the map, location, and sensor data, navigation units 106 can instruct robot 102 where to navigate (e.g., go forward, left, right, back, and/or any other direction).

Further, navigation units 106 can also implement actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 114, and/or any action taken by robot 102. In some cases, such actions and/or action-specific tasks can be indicated in a map and be executed by actuator units 108.

Still referring to FIG. 1A, actuator units 108 may include actuators such as motors/engines (e.g. (e.g., electric motors, combustion engines, steam engines, and/or any type of motor/engine known in the art), driven magnet systems, solenoid/ratchet systems, piezoelectric systems (e.g., inchworm motors), magnetostrictive elements, gesticulation, and/or any way of driving an actuator known in the art. For example, actuator units 108 can allow robot 102 to move and/or navigate through an environment where it is to perform tasks, and/or any other environment. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location. By way of illustration, such actuators may actuate the wheels or other displacement enabling drivers (e.g., tracks, mechanical legs, jet engines, propellers, hydraulics, etc.) for robot 102 to navigate a route; navigate around obstacles; rotate cameras and sensors.

In some cases, actuator units 108 also can include actuators configured for actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 114, and/or any movement desired for robot 102 to perform an action.

Visual data processing the features that may be detected in the sensory output may comprise one or more of representations (e.g., representations of objects, corner, edges, patches of texture, color, brightness, and/or other patterns that may be present in visual output). Sensors pertaining to accelerometers, inertial measurement units, odometers, gyroscopes, speedometers, and/or the like, provide information such as motor torque, motor position, motor load, battery current draw, battery voltage, position of actuators and/or controllable elements (e.g., rotor blade, rudder, wheel), and/or other parameters).

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, voice detection sensors, Sensor units 114 can also include proprioceptive sensors, such as accelerometers, inertial measurement units, odometers, gyroscopes, speedometers, and/or any other sensor known in the art. According to exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in data structures, such as matrices, arrays, queues, lists, arrays, stacks, bags, etc. According to exemplary embodiments, the data structure of the sensor data may be called an image. Data from the sensors may also be stored in the memory 120, and used by other units, such as navigation units 106 to perform their functions.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g., using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include can include sensors that detect voice commands and/or hand gestures, touch panels, buttons, keypads/keyboards, ports (e.g., universal serial bus ("USB"), digital visual interface ("DVI"), Display Port, E-Sata, Firewire, PS/2, Serial, video graphics array ("VGA"), Small Computer System Interface ("SCSI"), audioport, High-Definition Multimedia Interface ("HDMI"), Personal Computer Memory Card International Association ("PCMCIA") ports, memory card ports (e.g., SD and miniSD), and/or ports for computer-readable media), mice, rollerballs, consoles, vibrators, audio transducers, and/or any interface for a user to input and/or receive data and/or commands, whether coupled wirelessly or through wires (including, without limitation, any of the wireless or wired connections described in this disclosure, such as with reference to communication units 116).

User interface units 112 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation.

According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot (e.g., to provide information to the occupant or to people around the robot). The information could be the direction of future movement of the robot, such as an indication of moving forward, left, right, back, at an angle, and/or any other direction. In some cases, such information may utilize arrows, colors, symbols, etc. graph and/or map.

Still referring to FIG. 1A, according to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2) or 4G, high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102. Communications unit 116 may also receive updates (e.g., firmware or data updates), data, statuses, commands, and other communications from a server for robot 102.

In exemplary embodiments, power supply 122 may include one or more batteries, including, without limitation, lithium, lithium ion, lithium-iron-phosphate, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. The power supply may be carried in the drive unit described herein. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. In some embodiments, one or more of operative units may be instantiated remotely from robot 102. For example, mapping and localization units, may be located in a cloud and/or connected to robot 102 through communication units 116. Connections can be direct and/or through a server and/or network. Accordingly, implementations of the functionality of this disclosure should also be understood to include remote interactions where data can be transferred using communication units 116, and one or more portions of processes can be completed remotely. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, robot, or modular attachment performing a task illustrated in the figures below comprises a controller executing computer readable instructions stored on a non-transitory computer readable storage apparatus, such as memory 120, as would be appreciated by one skilled in the art.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 which stores computer code or instructions in order for the processor 130 to execute the specialized algorithms. As illustrated in FIG. 1B, memory 132 may comprise some, none, different, or all of the features of memory 124 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

FIG. 2 illustrates a functional block diagram of a controller 118 of a main robot 102 utilizing connection interface 214 to send and receive signals via a communication channel 216 to and from an external modular attachment (not shown) according to an exemplary embodiment. Connection interface 214 comprises both data connections 212, configured to send and receive analog and/or digital signals, as well as a connection unit 218, configured to attach the connection interface 214 securely to a modular attachment as further illustrated below in FIG. 3.

As illustrated in FIG. 2, controller 118 may receive input 206 from a plurality of operative units 104 (shown in FIG. 1A) such as, but not limited to, sensor data, localization data, input from an external server, and/or user input data. Input 206 may further comprise data to be communicated to a modular attachment, such as a user command, causing controller 118 to utilize connection interface 214 to communicate data to the modular attachment. Controller 118 may communicate output data to an output processing unit 208 configured to process the output data using an encoder and, according to some exemplary embodiments, a multiplexer further discussed in FIG. 5A-B. The output processing unit 208 may send the output data to data connections 212 of the connection interface 214.

Data connections 212, as further illustrated below in FIG. 8, may comprise one or more data connections configured to send and receive signals to and from a master robot and a modular attachment, as illustrated by communication channel 216. Communication channel 216 may be further configured to receive input signals from the modular attachment, these signals may comprise sensor data, feedback, state parameters, and/or any additional data the modular attachment may communicate with the master robot 102. These input signals are received by data connections 212 and are sent to an input processing unit 210. Input Processing unit 212 may comprise a decoder and, according to some exemplary embodiments, a demultiplexer, both configured to process the input analog or digital signal into computer readable data useful for controller 118 to operate the modular attachment.

The connection interface 214 may further comprise a power output 202 configured to provide power to an attached modular attachment. Power output 202 may be configured to draw power from power supply 122, as illustrated in FIG. 1A, or a separate power supply, according to some exemplary embodiments. According to at least one non-limiting exemplary embodiment, power output 202 may be dynamically adjusted by controller 118 to account for different power consumption and/or power ratings of different modular attachments.

Figure 3:
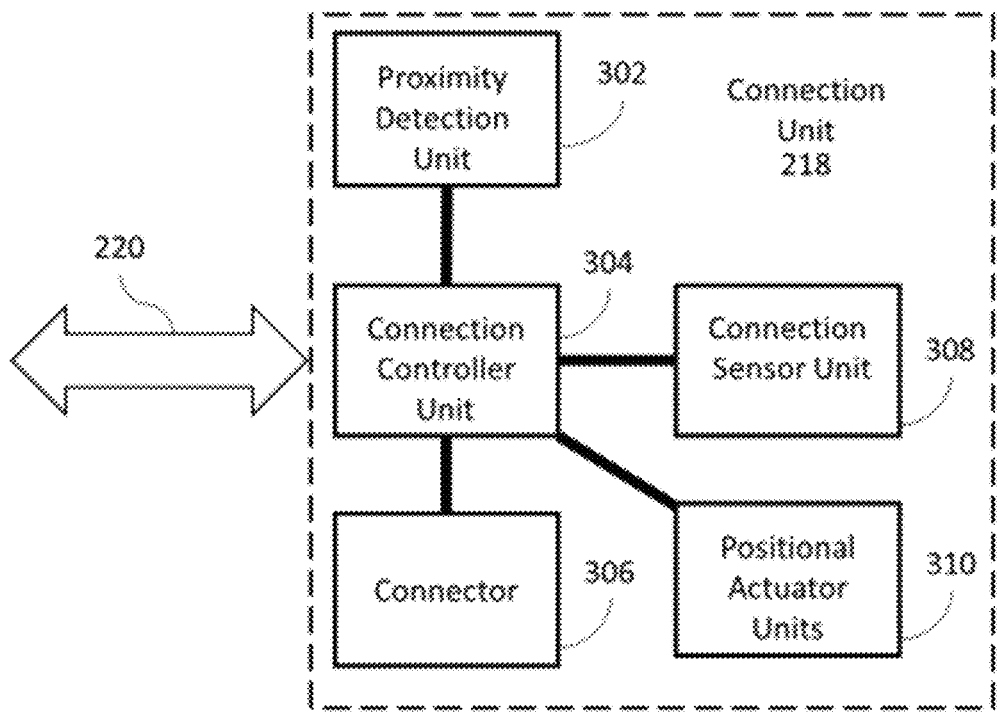
FIG. 3 illustrates a functional block diagram of a connection unit of a connection interface according to an exemplary embodiment.

Additionally, the connection interface 214 may further comprise a connection unit 218 configured to securely attach the data connections to the modular attachment, further illustrated in FIG. 3. Connection unit 218 sends and receives signals to and from controller 118 via communication channel 212, the signals may comprise an activation signal, feedback, sensor data from a connection sensor unit 308, and additional data further illustrated in FIG. 3.

Data connections 212 may further provide a mechanical output 204 to the modular attachment. Mechanical output 204 may comprise, but is not limited to, one or more drive shafts, gears, belts, and/or any other mechanical output used by controller 118 to effectuate the control of a modular attachment. Advantageously, a connection interface 214 comprising a mechanical output allows for controller 118 of a main robot to effectuate the control of one or more motors or actuators on the modular attachment. These mechanical outputs are further illustrated below in FIG. 7.

One skilled in the art would appreciate a substantially similar architecture may be observed on the modular attachment side of the data connection interface, wherein the modular attachment may comprise a controller, memory, input processing, and output processing as well as a connection unit to be coupled with the connection unit 218 of the main robot. A modular attachment may not comprise a mechanical output but instead may be reliant on the mechanical output of the main robot to effectuate the control of the modular attachment. In other words, a modular attachment may comprise a mechanical input. In other words, the modular attachment comprises a connection interface with a receptive mechanical input.

FIG. 3-9 below further embellish upon components illustrated in FIG. 2, wherein multiple references are made to the components illustrated in FIG. 2 in the figures below. FIG. 3-9 are illustrative of non-limiting exemplary embodiments of systems and methods of operation of the components illustrated in FIG. 2.

FIG. 3 illustrates a functional block diagram of a connection unit 218, previously illustrated in FIG. 2, according to an exemplary embodiment. Connection unit 218 may include a connection controller unit 304, proximity detection unit 302, connector 306, connection sensor unit 308, and positional actuator units 310. Connection unit 218 may be configured to control and ensure proper attachment of connection interface 214 of a main robot 102 to a modular attachment.

Connection controller unit 304 may comprise a specialized processor or may be illustrative of controller 118, as previously illustrated in FIG. 2, effectuating the control of connection unit 218. Connection controller unit 304 communicates with controller 118, as shown in FIG. 2, through connection 220. Imagine FIG. 2 being positioned alongside FIG. 3 such that connection 220 between the two is maintained, thereby allowing controller 118 and controller unit 304 to be electrically and operatively coupled. Connection 220 may be configured to send and receive signals from controller 118 comprising control signals used for determining when to connect connection interface 214 with a modular attachment using the connection unit 218. Connection 220 may further be configured to communicate computer-readable instructions from memory 120, as illustrated in FIG. 2, to be executed by connection controller unit 304 to perform the below tasks.

Proximity detection unit 302 may comprise an operative unit configured to determine if a main robot 102 is near a desired modular attachment. Proximity detection unit may comprise a radio-frequency identification (RFID) device, near-field communication (NFC) device, Bluetooth low energy (Bluetooth LE®) device, and/or any similar device used for determining a main robot 102 is near a desired modular attachment. According to an exemplary embodiment, a modular attachment may be equipped with a passive RFID tag and proximity detection unit may comprise an active RFID reader wherein connection controller unit 304 may activate the active RFID reader when searching for a desired modular attachment. A main robot 102 may navigate to a plurality of modular attachments equipped with passive RFID tags wherein robot 102, using proximity detection unit 302 equipped with an active RFID reader, may determine the desired modular attachment based on a correct identification reading received from a passive RFID tag of the desired modular attachment.

Connection unit 218 may further include a connection sensor unit 308 configured to ensure accurate connection of connection interface 214 to the modular attachment. Connection sensor unit 308 may comprise some, none, all, or different features and/or functionalities of sensor units 114, previously illustrated in FIG. 1A.

Connection sensor units 308, as illustrated in FIG. 3, may be illustrative of one or more sensors of sensor units 114 configured to collect data to ensure a proper connection of connection interface 214 to the connection interface of a modular attachment. Connection controller unit 304 may receive data from connection sensor unit 308 to determine control signals to be sent to controller 118, via connection 220, and/or to positional actuator units 310 to ensure the connection interface 214 of main robot 102 is correctly connected to the desired modular attachment. For example, data from connection sensor unit 308 may be used by connection controller unit 304 or controller 118 to determine motor commands for a main robot 102 to position the main robot 102 such that the connection interface 214 aligns with the connection interface of the modular attachment.

According to at least one non-limiting exemplary embodiment, connection controller unit 304 may deactivate connection sensor unit 308 when a main robot 102 does not desire to attach to a modular attachment wherein connection controller unit 304 may reactivate connection sensor unit 308 when a modular attachment is desired. According to at least one non-limiting exemplary embodiment, connection sensor unit 308 may be activated and utilized only during an attempted connection of a main robot to a modular attachment. Connection sensor unit 308 may comprise some, different, or all of the features of sensor units 114 illustrated in FIG. 1A.

Connection unit 218 may further include a connector 306 comprising an electromagnet, a latch, screws, and/or any other mechanical, magnetic, electromagnetic, and/or electromechanical connector configured to ensure a secure connection, effectuated by controller unit 304, between the connection interfaces 214 of a main robot 102 and a modular attachment. According to one non-limiting exemplary embodiment, connector 306 may comprise an electromagnet configured, by connection controller unit 304, to be non-magnetic when a connection with a modular attachment is not desired and to be magnetic when the modular attachment is desired. According to at least one non-limiting exemplary embodiment, connector 306 may be built into data ports 802-$n$, illustrated below in FIG. 8, wherein connecting data port 802-$n$ to an opposite port type (e.g., female or male port type) may comprise a secure connection. According to another non-limiting exemplary embodiment, connector 306 may be located at a separate location on a chassis of a main robot 102. For example, a connection interface of a modular attachment may be located at a different location from where the modular attachment connects mechanically, electromechanically, etc. to the chassis of the main robot 102 using connector 306. Advantageously, having a connector 306, effectuated by a connection controller unit 304, may ensure a secure mechanical connection between a modular attachment and connection interface 214 of a main robot 102 only when a modular attachment is desired therefore avoiding accidental connections with modular attachments, or other objects (e.g., magnetic objects) of a surrounding environment.

Additionally, connection unit 218 may further include a positional actuator unit 310 configured to perform orientation or positional movements of a connection interface 214. Positional actuator unit 310 may comprise some, different, or all of the features of actuator units 108 illustrated in FIG. 1A. Positional actuator units may be positioned on the mounting of the connection interface 214 to facilitate movements of the connection interface 214. For example, positional actuator units 310, controlled by connection controller 304, may be configured to alter the roll of a connection interface 214 by ten (10) degrees to align with a connection interface of a modular attachment. Performing adjustments, such as adjusting pitch, roll, and/or yaw adjustments, may not be possible for the main robot 102 according to some embodiments of a main robot 102. According to at least one non-limiting exemplary embodiment, positional actuator units 310 may be configured to rotate a connection interface 214 by up to ninety (90) degrees, or more, with respect to a roll, pitch, and/or yaw axis. Advantageously, positional actuator units may perform the adjustments to ensure a proper connection between a main robot 102 and a modular attachment by adjusting the orientation of the connection interface 214 when the main robot 102 attempts to connect with the modular attachment. Additionally, positional actuator units 310 may adjust a connection interface 214 of a main robot 102 more accurately than a main robot 102 adjusting the orientation of its entire chassis to align with a connection interface of a modular attachment.

Figure 4A:
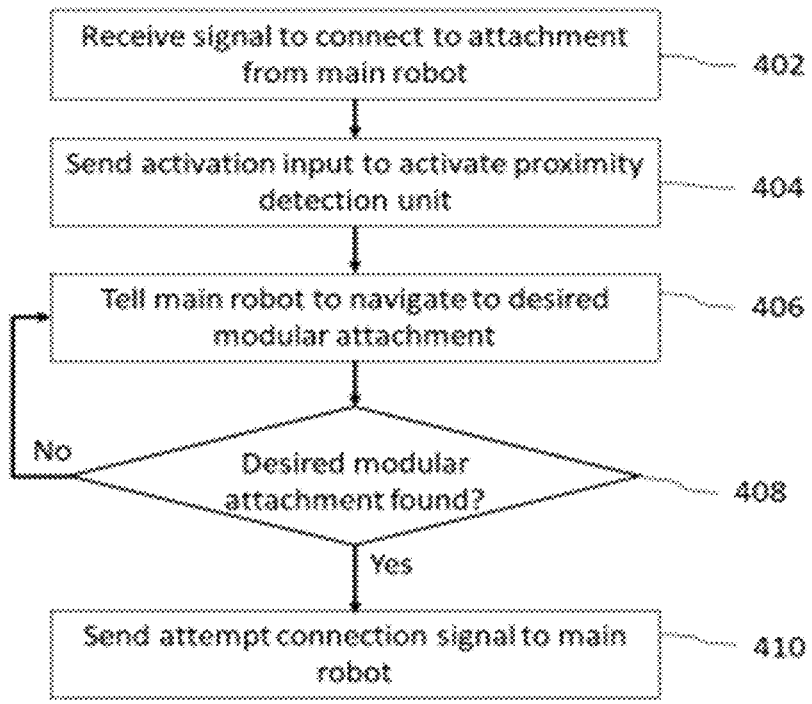
FIGS. 4A-B are process flow diagrams illustrating an exemplary methods for a main robot to attach to a modular attachment using a connection interface in accordance with some embodiments of this disclosure.

FIG. 4A is a process flow diagram illustrating an exemplary method for a connection controller unit 304, illustrated previously in FIG. 3, communicating with a controller 118 of a main robot to find a desired modular attachment upon receiving a signal to connect to the desired modular attachment from main robot 102, according to an exemplary embodiment. As previously stated, connection controller unit 304 may be illustrative of controller 118, of the main robot 102, effectuating the control of connection unit 218 by executing computer-readable instructions stored in memory 120.

Block 402 illustrates connection controller unit 304 receiving an input signal, from controller 118 of main robot 102, to find and connect to a desired modular attachment. The input signal may be determined by a user, by giving input to user interface units 112, desiring main robot 102 to perform a task with a specialized modular attachment. Additionally, the input signal may be received by a main robot 102, operating autonomously, desiring to find and use a modular attachment to perform a specialized task. The input signal may comprise an identification number of the desired modular attachment such that proximity detection unit 302 may determine the desired modular attachment from a plurality of other modular attachments available to main robot 102, as illustrated below in FIGS. 15 and 16 and block 404.

Block 404 illustrates connection controller unit 304, upon receiving the input signal to find and connect the main robot 102 to the desired modular attachment, sending an activation signal to proximity detection unit 302. The activation signal may configure the proximity detection unit 302 to turn on and identify a unique identification for each of the plurality of modular attachments number based on an interrogation reading from the proximity detection unit 302. The interrogation reading may comprise the proximity detection unit 302 reading an identification number of a modular attachment, wherein each of the plurality of possible modular attachments comprises a unique identification number transmitted by, for example, a passive RFID tag or similar device. According to some exemplary embodiments, proximity detection unit 302 may comprise an active RFID reader configured to read the identification numbers corresponding to a plurality of modular attachments comprising passive RFID tags and determine, based on the identification number of each RFID tag, if main robot 102 is near the desired modular attachment, as further illustrated in block 406.

Block 406 illustrates connection controller unit 304 telling controller 118 of main robot 102 to navigate main robot 102 to find the desired modular attachment from a plurality of modular attachments. Connection controller unit 304 may not navigate main robot 102, moreover connection controller unit 304 may simply communicate to main robot 102 when the desired modular attachment is found. According to at least one non-limiting exemplary embodiment, the communication may be a binary output of connection controller unit 304 set to zero (0) until the desired modular attachment is found based on a determination by proximity detection unit 302. Controller 118 may navigate the main robot 102 to one or more modular attachments until an output from connection controller unit 304 one (1) is detected, corresponding to a confirmation that the desired modular attachment is found based on a determination by proximity detection unit 302, as further illustrated in block 408. Additionally, according to at least one non-limiting exemplary embodiment, a computer readable map of an environment surrounding the main robot 102 may be stored in memory 120 and the map may comprise locations of each of the plurality of modular attachments, wherein controller 118 may navigate directly to the desired modular attachment and verify it is the correct module based on a determination by proximity detection unit 302.

Block 408 illustrates connection controller unit 304 determining if a nearby modular attachment is the desired modular attachment using proximity detection unit 302. If proximity detection unit 302 determines the nearby modular attachment is the desired modular attachment based on a interrogation reading, connection controller unit 304 moves to block 410. If proximity detection unit 302 determines the nearby modular attachment is not the desired one, connection controller unit 304 may send signals to controller 118, of the main robot 102, to navigate the main robot 102 to a different modular attachment illustrated previously in block 406.

Block 410 illustrates connection controller unit 304 sending an attempt connection signal to controller 118 through connection 220, as illustrated in FIG. 2 and FIG. 3, once the correct modular attachment is found. The attempt connection signal, when received by controller 118, may cause controller 118 to position the main robot 102 and attempt a connection to the desired modular attachment, further illustrated in FIG. 4B.

According to at least one non-limiting exemplary embodiment, a modular attachment comprising at least one specialized processor may have its clock synchronized with the clock of controller 118 main robot 102. The synchronization may be carried out upon receiving an interrogation signal from proximity detection unit 302 or may be communicated by a main robot 102 after a modular attachment is determined to be the desired one using communication units 116. The synchronization of the two processor clocks may be performed using a network time protocol (NTP) or any similar method wherein the network may be a network external to and communicatively coupled to the main robot 102 and the modular attachment connected to the network.

Figure 4B:
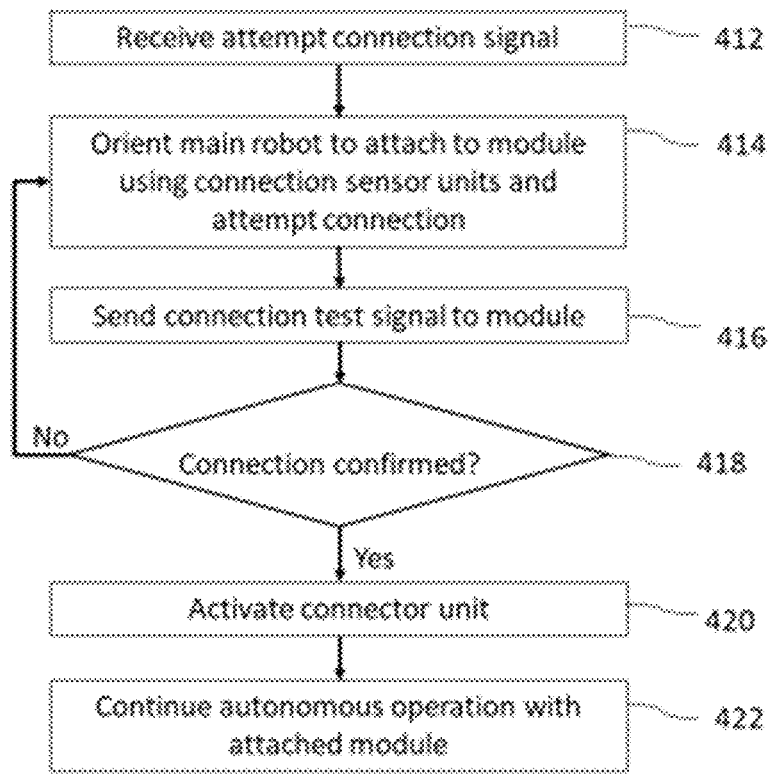

FIG. 4B illustrates a method for a controller 118 of a main robot 102 to attach to a modular attachment using connection interface 214 upon receiving an attempt connection signal from a connection controller unit 304, according to an exemplary embodiment.

Block 412 illustrates the controller 118 of the main robot 102 receiving an attempt connection signal from connection controller unit 304 via, connection 220 as illustrated in FIG. 2 and FIG. 3, upon connection controller unit 304 determining the main robot 102 has found a desired modular attachment, as illustrated above in FIG. 4A. According to at least one non-limiting exemplary embodiment, the attempt connection signal may be a binary output from connection controller 306 wherein an output of one (1) may correspond to a positive attempt connection signal and an output of zero (0) may correspond to a do not attempt connection signal.

Block 414 illustrates the controller 118, communicating with connection controller unit 304 as previously illustrated in FIG. 3, to determine a correct orientation for a main robot 102 to connect to the desired modular attachment using a connection interface 214. Connection controller unit 304 may send sensor data from connection sensor units 308 to controller 118 of main robot 102, wherein controller 118 may adjust the orientation of the main robot 102 based on sensor data from connection sensor units 308 and other sensor units 114. Controller 118 may utilize actuator units 108 to position the main robot 102 in the correct orientation for attachment to the desired module. Additionally, controller 118 may send signals to connection controller unit 304 to further utilize positional actuator units 310 to the orient the connection interface 214 correctly to ensure a proper connection between the main robot 102 and the desired modular attachment, as previously illustrated in FIG. 3. The main robot 102 may, after correctly orientating itself, attempt to connect connection interface 214 to the connection interface of the desired modular attachment using actuator units 108 and positional actuator units 310 to make the connection.

Block 416 illustrates controller 118 sending a connection test signal to the desired modular attachment through connection interface 214. According to at least one non-limiting exemplary embodiment, the connection test signal may be carried by a specific carrier frequency, as further illustrated in FIGS. 5B and 5C, and a return confirmation signal may be communicated from the desired modular attachment confirming proper attachment of data connections 212, of connection interface 214, to the desired module. According to another non-limiting exemplary embodiment, the connection test signal may comprise a specific header to be determined by the correct modular attachment as the connection test signal, further illustrated in FIGS. 6B and 6C. According to the same embodiment, the desired modular attachment may communicate a return confirmation return signal to connection controller 304 comprising, for example, a different header used for confirming the signal was received by the desired modular attachment, as illustrated in FIG. 6C. The confirmation return signal may be used for determining correct attachment of data connections 212, of connection interface 214, to the desired module.

Figure 8:
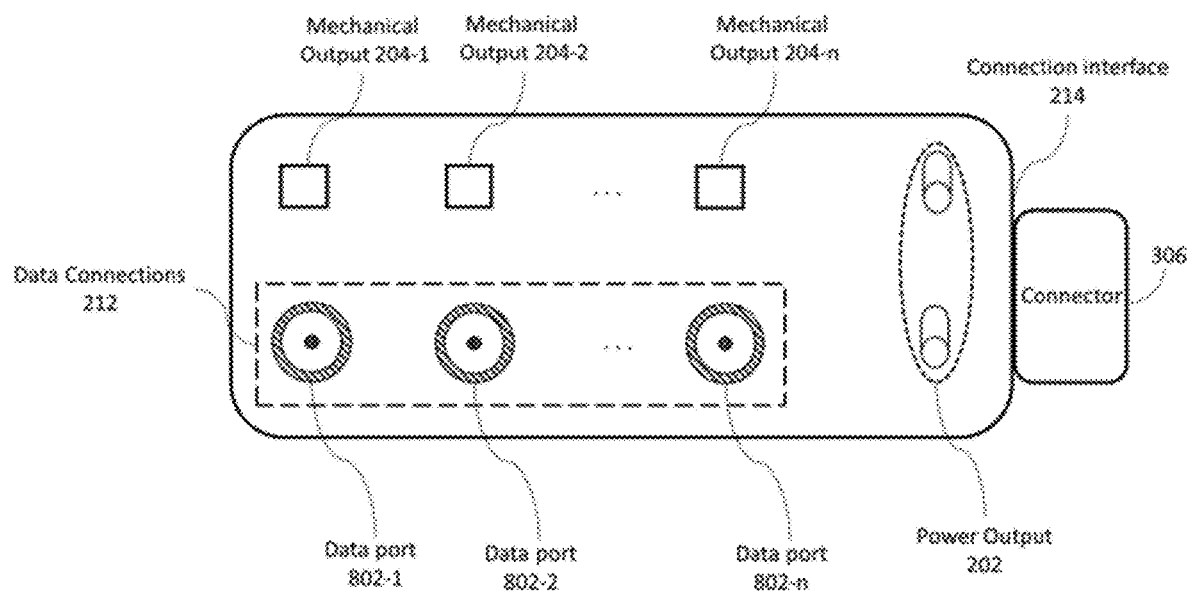
FIG. 8 illustrates a connection interface comprising mechanical outputs, data outputs, and power outputs to be outputted to a modular attachment from a main robot according to an exemplary embodiment.

Additionally, according to another non-limiting exemplary embodiment, main robot 102 may further test the connection of connection interface 214 by providing mechanical outputs 204, as illustrated in FIG. 2 and FIG. 8, and measuring a change in torque or resistance measurement, wherein a measurement of zero change in resistance or zero change in torque after an attempted connection may correspond to an improper attachment of mechanical outputs 204 and therefore improper attachment of connection interface 214. According to the same exemplary embodiment, if controller 118 determines a significant change (e.g., meets or exceeds a threshold) of the resistance or torque of mechanical outputs 204 after an attachment is performed, controller 118 may determine connection interface 214 is properly connected to the desired modular attachment and may communicate a confirmation return signal to connection controller unit 304.

Block 418 illustrates the controller 118 confirming the connection of data connections 212 and/or mechanical outputs 204 between the main robot 102 and the desired modular attachment. For a confirmation of the attachment to be determined, controller 118 may be required to receive a return connection test signal from all used data connections 212 as well as a confirmed connection of all the mechanical outputs 204 as illustrated above in block 412.

Block 420 illustrates controller 118, upon determining a confirmed connection, sending a signal to connection controller 304 to activate connector 306 to secure the attachment of connection interface 214 to the desired modular attachment. As previously illustrated, activating connector 306 may comprise activating an electromagnet, adjusting a latch to secure the connection, turning one or more screws, and/or any similar method for securely attaching connection interface 214 to the connection interface of the desired modular attachment. According to at least one non-limiting exemplary embodiment, a main robot 102 may input power to a modular attachment using power input 804, as shown in FIG. 8 below, upon determining a proper connection has been made.

Block 422 illustrates controller 118 continuing autonomous operation with the now attached desired modular attachment. The desired modular attachment may enable the main robot 102 to autonomously perform a specialized task, for example as illustrated in reference to FIGS. 15 and 16.

The steps illustrated in FIG. 4A-B may be repeated upon main robot 102 desiring to exchange the current modular attachment for a new one to perform a different specialized task. One skilled in the art would appreciate that the method illustrated in FIGS. 4A-B and may further comprise a main robot 102 returning to the original location where the desired modular attachment was found and detaching from the modular attachment, by controller 118 sending a deactivation signal to connector 306, prior to finding and attaching to a new modular attachment.

Figure 5A:
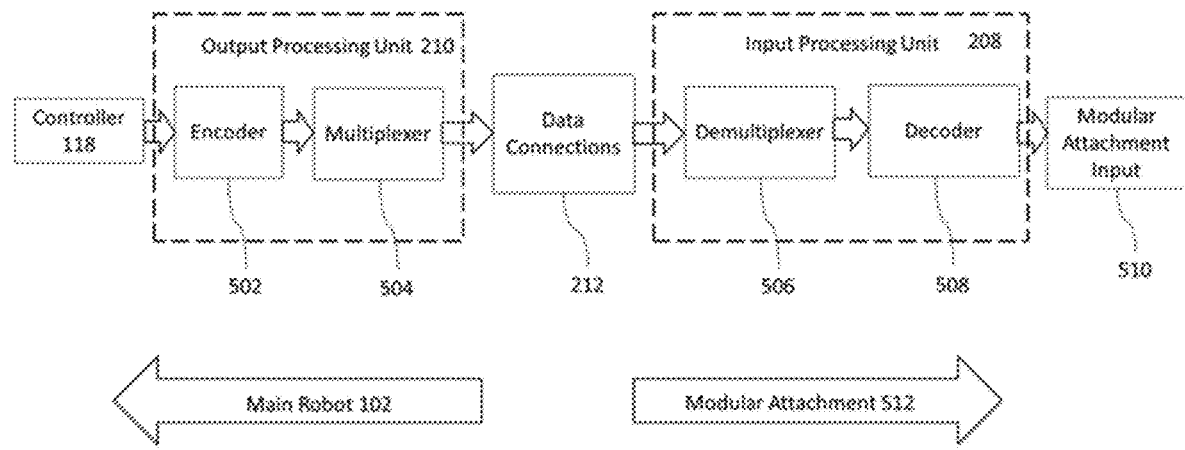
FIG. 5A is a process flow diagram illustrating an exemplary method for a controller of a main robot to communicate with a modular attachment and vice-versa.
Figure 5B:
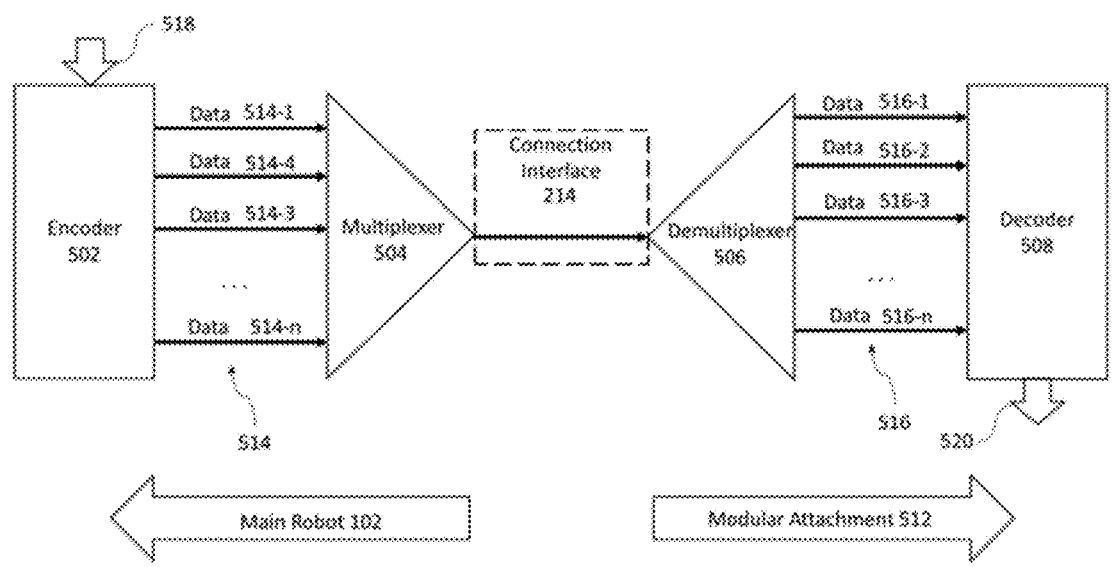
FIG. 5B is a functional block diagram further illustrating a lower level abstraction of the systems and methods illustrated in FIG. 5A.
Figures 6C, 7:
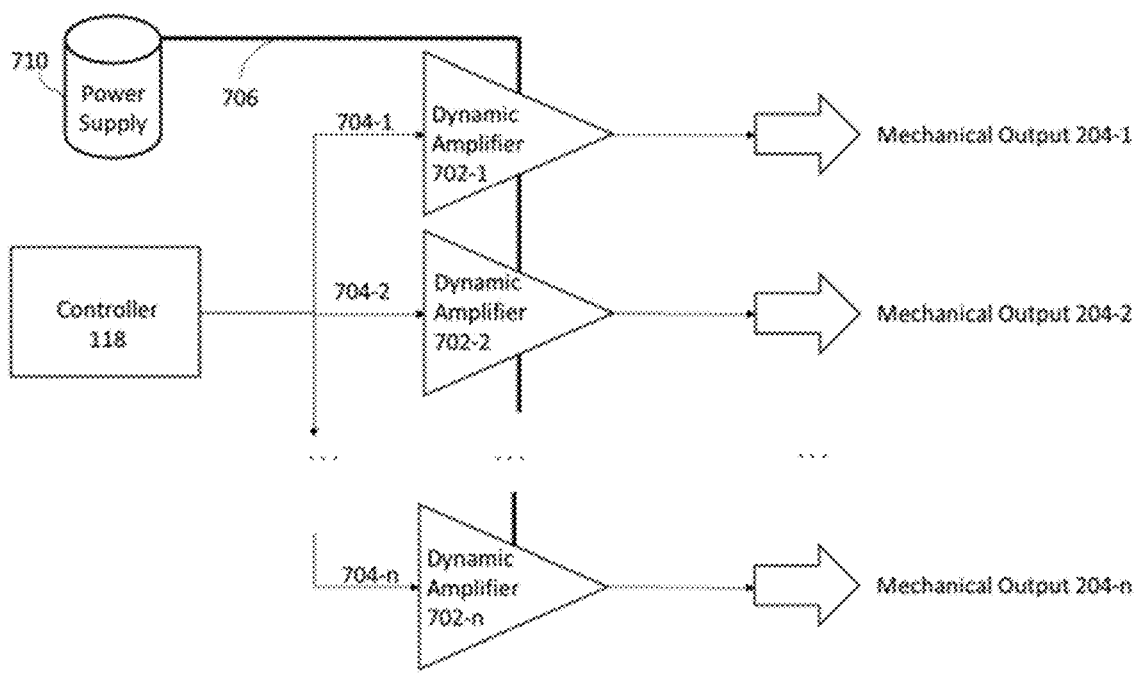
FIG. 6C further illustrates a reference table used for decoding a plurality of header identification numbers illustrated in FIG. 6B according to an exemplary embodiment.
FIG. 7 is a functional block diagram of a system configured to provide a plurality of mechanical outputs to a modular attachment from a main robot according to an exemplary embodiment.

FIG. 5A-C illustrates an exemplary embodiment of a system and method for communicating data between a controller 118, of a main robot 102, and a modular attachment input 510. The systems and methods illustrated in FIG. 5A-C may be independent from or operate in conjunction with those illustrated in FIG. 6A-C, according to some non-limiting exemplary embodiments.

FIG. 5A illustrates an exemplary embodiment of a process for a controller 118, illustrated previously in FIG. 1A and FIG. 2, to send data from a main robot 102 to a modular attachment 512 using data connections 212, of connection interface 214. As previously illustrated above with respect to FIG. 2, output from a controller 118 passes through an output processing unit 210 further comprising an encoder 502 and a multiplexer 504.

Output processing unit 210, previously illustrated in FIG. 2, may be configured to encode and multiplex data from controller 118 using encoder 502 and multiplexer 504, respectively, for output to data connections 212 of connection interface 214. The encoded and multiplexed data is then sent through data connection 212 to be received by an input processing unit 208 located on the modular attachment 512. Input processing unit 208, previously illustrated in FIG. 2, may be configured to demultiplex and decode the incoming signal using demultiplexer 506 and decoder 508, respectively. The demultiplexed and decoded signals are sent to the modular attachment input 510. One skilled in the art would appreciate a substantially similar reversed process to the one illustrated in FIG. 5A for a modular attachment 512 to send data to a main robot 102.

FIG. 5B illustrates a lower level abstraction of the output processing unit 210 and input processing unit 208 and their comprising components as previously illustrated in FIG. 5A according to an exemplary embodiment. FIG. 5B illustrates data flow from a main robot 102 to a modular attachment 512 through a single data port 802-$n$ of a connection interface 214, as further illustrated below in FIG. 8, wherein "n" may correspond to an integer number (e.g., 1, 2, 3, etc.). It is appreciated by one skilled in the art that a substantially similar architecture may be repeated to provide outputs to a plurality of data ports 802-$n$ of the connection interface 214.

Referring back to FIG. 5B, encoder 502 may be configured to receive input 518 from a controller 118 of a main robot 102, the input 518 may comprise sensor data, control signals, and/or any other data type useful for effectuating the control of the modular attachment 512. Encoder 502, after encoding data from input 518 based on a given code or protocol, may output data via data channels 514 to multiplexer 504. Data channels 514 may further comprise a plurality of channels 514-$n$, wherein data of index "n" may correspond to an integer number (e.g., 1, 2, 3, etc.) of the maximum number of data channels available. According to at least one non-limiting exemplary embodiment, encoder 502 may further be configured to encrypt the encoded data prior to outputting to data channels 514 based on a private key, wherein decoder 508 may be configured to decrypt incoming data channels 516 based on the private key, an output key from encoder 502, or other cryptographic protocol. According to at least one non-limiting exemplary embodiment, encoder 502 may further be configured to compress image data prior to outputting the compressed image data to data channel 514, wherein controller 118 may determine which input, of input 518, to compress.

Multiplexer 504, according to the exemplary embodiment illustrated in FIG. 5B, may comprise a frequency-division multiplexer (FDM) configured to assign carrier frequencies of increasing frequency value to each of the data channels 514 received from encoder 502, as further illustrated in FIG. 5C. Multiplexer 504 may output the multiplexed data to connection interface 214 to be communicated to the input processing unit 510 of the modular attachment 512.

Demultiplexer 506, as illustrated, may be configured to receive an encoded multiplexed signal from connection interface 214 and may be configured to demultiplex the incoming signal. Demultiplexer 506 may be configured to output demultiplexed encoded data through a plurality of data channels 516-$n$, wherein index "n" may correspond to an integer number of the total number of data output channels available. The output data channel 516-$n$ of a signal may correspond to a carrier frequency. For example, demultiplexer 506 may be configured to output data carried by a lowest frequency carrier to the lowest index data channel (e.g., 516-1 as illustrated), a second lowest frequency carrier to the second lowest index data channel, and so forth.

Decoder 508, as illustrated, receives encoded data from demultiplexer 506 through a plurality of data channels 516. Decoder 508 may be configured to decode the individual encoded data signals, based on a code or protocol, arriving from data channels 516 to be later outputted to a controller or directly to various components of the modular attachment 512 via output 520. Output 520 may comprise a plurality of connections (e.g., wires) configured to send the output data from decoder 508 to corresponding operative units of the modular attachment 512 such as, but not limited to, sensors, processors, and actuators of the modular attachment 512. According to at least one non-limiting exemplary embodiment, decoder 508 may further be configured to decrypt incoming encrypted data connection interface 214 based on a private key, an output key from encoder 502, or other cryptographic protocol.

According to other non-limiting exemplary embodiments, multiplexer 504 may utilize other multiplexing methods including a quadrature or octet phase-shift keying (QPSK or OPSK), code-division multiple access (CDM), or any other substantially similar method of multiplexing data to be communicated to the modular attachment 512. Similarly, demultiplexer 506 may be configured to demultiplex a signal to a plurality of data channels 516 based on the multiplexing method used. Additionally, according to another non-limiting exemplary embodiment, multiplexer 504 and demultiplexer may be replaced with a serializer/deserializer (SerDes) configuration to accomplish the same function. Moreover, the use of FDM, QPSK, OPSK, CDM, or SerDes configurations may enable a connection interface to minimize the number of outputs (e.g., cables, pins, or wires of connection interface 214) required to communicate data to and from a main robot 102 to a modular attachment 512 and vice-versa. Additionally, minimizing the number of outputs required for a connection to be made may minimize the chance for possible errors in performing a proper connection, as illustrated above in FIG. 4, by reducing the number of data connections 212 required for the proper connection. According to at least one non-limiting exemplary embodiment, a main robot 102 may require constant, instantaneous data from sensors on the modular attachment, such as a camera, to operate safely, wherein the systems and methods illustrated in FIG. 5A-C may enable the main robot 102 to essentially stream data simultaneously from a plurality of sensors, motors, and/or processors on the modular attachment 512, and vice-versa, using a minimum number of data connections 212 (e.g., cables, wires, and/or pins).

According to at least one non-limiting exemplary embodiment, a plurality of data channels 514 and 516 may be unused based on the amount of data a main robot 102 desires to communicate to a modular attachment 512. The amount of data the main robot 102 sends and receives to and from the modular attachment 512 may be based on the complexity of the modular attachment 512. For example, a modular attachment 512 may be a passive device such as an antenna wherein main robot 102 may not need to communicate data from a plurality of sensor units and therefore may not utilize all of the data connections available. Similarly, a modular attachment 512 may be a complex device comprising a plurality of sensors and actuators requiring multiple data communication channels to effectuate the control of the modular attachment 512 by the main robot 102.

One skilled in the art would appreciate a substantially similar architecture to be observed in the reverse direction, wherein a modular attachment 512 may send data to a main robot 102 using a substantially similar reversed architecture as shown in FIG. 5A-B. For example, a modular attachment 512 may comprise an encoder and multiplexer of similar or the same functionality as encoder 502 and multiplexer 504. Similarly, a main robot 102 may comprise a demultiplexer and decoder of similar or same functionality as demultiplexer 506 and decoder 508.

FIG. 5C illustrates a frequency spectrum view of data outputted from a multiplexer 504 using FDM to be communicated from a main robot 102 through connection interface 214 to a modular attachment 512, as previously illustrated in FIGS. 5A-B, according to an exemplary embodiment. Multiplexer 504, as previously stated, may be configured to multiplex a plurality of incoming data channels 514 by assigning carrier frequencies of increasing frequency value to each of the data channels 514-$n$ (e.g., FDM). Bandwidth 522-1 may be centered about a first carrier frequency carrying data from a first channel 514-1, bandwidth 522-2 may be centered about a second carrier frequency carrying data from a second channel 514-2, and so forth. According to at least one non-limiting exemplary embodiment, index "n" of bandwidth 522-$n$ may correspond to an upper carrier frequency limit of a data cable used in data connections 212 wherein attenuation effects become non-negligible when sending carrier frequencies larger than the carrier frequency corresponding to bandwidth 522-$n$. According to another non-limiting exemplary embodiment, index "n" may correspond to the number of data channels 514 inputted to multiplexer 504 determined by controller 118 of a main robot 102 or a controller on a modular attachment 512. For example, where a modular attachment 512 is a passive device, index "n" may be equal to or less than two (2). However, when a modular attachment 512 comprises a complex device, additional bandwidths may be designated to communicate a plurality of additional data channels such as, but not limited to, sensor data and control signals, and may therefore have an index "n" be greater than two (2).

According to at least one non-limiting exemplary embodiment, the number of channels required to communicate sufficient data between a main robot 102 and a modular attachment 512 may be determined by controller 118, of the main robot 102, by giving input to encoder 502, wherein the input configures encoder 502 to output data to the correct number of channels 514. Additionally, controller 118 may dynamically adjust the number of communication channels 514 based on the complexity modular attachment 512 attached, wherein the complexity of a modular attachment 512 may correspond to the number of motors and sensors on the modular attachment 512 to be controlled by main robot 102. Controller 118 may further determine essential communication channels required for a main robot 102 to operate with any modular attachment of any complexity. For example, bandwidth 522-1 may be assigned to send and receive a test connection signal for testing the connection of connection interface 214, bandwidth 522-2 may be assigned for the modular attachment 512 to communicate the number of data channels required by the modular attachment 512 to be controlled by controller 118 (e.g., how many data channels 514 and 516 encoder 502 and decoder 508 should expect to output or receive input from), and so forth.

According to at least one non-limiting exemplary embodiment, essential communication channels, such as bandwidth 522-1, may contain data comprising the number of communication channels demultiplexer 506 and decoder 508 should expect to receive, confirmation signals for testing connection as illustrated in FIG. 4, and/or any other data that may be communicated independent of the complexity of the modular attachment 512.

FIG. 5C is illustrative of an output of an FDM multiplexer, wherein one skilled in the art may appreciate substantial similarities in data output when implementing multiplexer 504 and demultiplexer 506 as in a QPSK, CDM, SerDes, and/or other similar configuration used to communicate a plurality of data channels across a minimum number of connection lines (e.g., cables or wires).

FIG. 6A-C illustrate further systems and methods for a main robot 102 to communicate with a modular attachment 610 using a protocol-based communication approach, according to an exemplary embodiment. The systems and methods illustrated in FIG. 6A-C may be utilized separately or in conjunction with the systems and methods illustrated in FIG. 5A-C, as would be appreciated by one skilled in the art.

FIG. 6A illustrates an exemplary functional block diagram of a method for a main robot 102 to communicate data to a modular attachment 610 comprising an encoder 602 and decoder 604. Encoder 602 may be configured to receive input 606 from controller 118, wherein the input 606 may comprise control signals and/or data to be communicated to modular attachment 610 through connection interface 214, to effectuate the control of the modular attachment 610. Encoder 602 may be further configured to encode the input 606 data into a specific format designated by a protocol, further illustrated in FIGS. 6B-C. Encoder 602 may then output the encoded data to connection interface 214, using data connections 212 as illustrated in FIG. 2. Encoder 602 may be configured to follow one or more of a plurality of protocols such as transmission control protocol (TCP), user datagram protocol (UDP), and/or any standardized or non-standardized protocol designed by an operator of the main robot.

Decoder 604 may be configured to receive input from connection interface 214, the input comprising encoded data signals from the encoder 602, and decode the input. Decoder 604 may be configured to decode the input data from connection interface 214 based on a protocol further illustrated in FIGS. 6B-C. Decoder may output decoded data through output 608 to a plurality of operative units on modular attachment 610 based on a protocol header including, but not limited to, a specialized processor, sensors, actuators, and/or other operative units (including, navigation units, actuator units, sensor units, communication units, and/or user interface units).

FIG. 6B illustrates an exemplary protocol format for encoder 602 to output data to connection interface 214. As illustrated in FIG. 6B, bits zero through fifteen (0-15) may correspond to a source port, wherein the source port may be a controller, sensor units, and/or any other source where the data being communicated originated from. Similarly, bits sixteen through thirty-one (16-31) may correspond to a destination port such as, but not limited to, a specialized processor, motor, or sensor data is being communicated to. Bits thirty-two through forty-seven (32-47) may correspond to a header ID number, wherein the headier ID number indicates an operation to be performed based on the data received, as further illustrated in FIG. 6C. Bits forty-eight through sixty-three (48-63) may correspond to a checksum configured to allow decoder 604 to determine that data arriving from connection interface 214 arrives without error (e.g., missing bits, incorrect bits, etc). Lastly, bits sixty-four onward (64+) correspond to data to be communicated to the modular attachment 610.

By way of an illustrative non-limiting exemplary embodiment, a main robot 102 may desire to send a control signal, determined by controller 118, to an actuator located on a modular attachment 610. Encoder 602 may designate source port bits (0-15) to correspond to indicate the control signal originates from controller 118. Encoder 602 may further designate destination port bits (16-31) to correspond to the desired actuator. Additionally, the header ID number may be set by encoder 602 to communicate a function for the actuator, such as rotate five (5) degrees. Encoder 602 may encode checksum bits (48-63) based on the protocol, wherein decoder 604 may verify the incoming data is complete and without error. Lastly, encoder 604 may encode data bits (64+) corresponding to a control signal to be executed by the desired actuator.

One skilled in the art would appreciate a substantially similar method for data transfer from a modular attachment 610 to a main robot 102 wherein data from the modular attachment 610 passes through an encoder, substantially similar to encoder 602; connection interface 214; and lastly a decoder, substantially similar to decoder 610, as illustrated in FIG. 6A. For example, encoded data sent from a modular attachment 610 to a main robot 602 may comprise the source port of a sensor on the modular attachment 610, a destination port corresponding to controller 118 of main robot 102, a header ID, a checksum, and data from the sensor.

According to at least one non-limiting exemplary embodiment, encoder 602 may further output data, encoded based on a protocol, across a plurality of data channels to a multiplexer (not shown) of substantial similarity to multiplexer 504 illustrated above in FIG. 5B. Additionally, connection interface 214 may output encoded, multiplexed data to a demultiplexer (not shown) of substantial similarity to demultiplexer 506 illustrated above in FIG. 5B, wherein the demultiplexer (not shown) may output encoded data across a plurality of data channels to decoder 604.

FIG. 6C illustrates an exemplary protocol reference table for encoder 602 and decoder 604 to reference while encoding or decoding a header ID of a data signal. The protocol reference table may comprise a plurality of header IDs, represented in binary and base ten, and their corresponding operation to be performed based on the data received (e.g., based on bits 64+). According to the exemplary reference table illustrated in FIG. 6C, header ID numbers one through three (1-3) may correspond to operations essential for ensuring a proper data connection. Header ID numbers one (1) and two (2), as illustrated, correspond to connection tests illustrated in FIG. 4 used to determine if data connections 212, of connection interface 214, are properly connected. Additional header ID numbers may be added to the reference table by a controller 118, or a controller on a modular attachment 610, based on the complexity of the modular attachment 610. For example, if a modular attachment 610 comprises a passive antenna, then essential communication header ID numbers may be required (e.g., header ID numbers 1, 2, and 3). However, if a modular attachment 610 comprises a complex system comprising a plurality of operative units requiring a plurality of data types to be communicated to and from a main robot 102, additional header ID numbers may be assigned to additional operations corresponding to the plurality of data types. A controller (e.g., either controller 118 or a controller on the modular attachment 610) may, according to the same example, assign unused header ID numbers (e.g., header ID with NULL operations) to new operations based on the function and complexity of the modular attachment. As illustrated in the exemplary header ID reference table of FIG. 6C, a plurality of header ID numbers may have a corresponding NULL operation, wherein controller 118 may add additional operations based on the complexity of the modular attachment 610 by sending or receiving an input packet comprising a header ID number of four (4) corresponding to assigning an unused header ID to an operation. One skilled in the art would appreciate that the header ID table shown in FIG. 6C is a self-referential table that may have additional rows and columns as controller 118 or a controller on a modular attachment 610 executes computer readable instructions.

FIG. 7 illustrates an exemplary embodiment of a system for providing a plurality of mechanical outputs 204-n to connection interface 214 on a main robot 102. As previously mentioned above, index "n" may correspond to the maximum number of mechanical outputs 204-n as well as controller inputs 704-n and dynamic amplifiers 702-n, wherein, as illustrated in FIG. 7, index "n" comprises the same maximum value for all of the above units or outputs labeled with index "n". Additionally, as used herein with reference to FIG. 7 and later FIG. 8, index "n" may represent an arbitrary integer value for a corresponding unit (e.g., dynamic amplifier 702-n corresponding to any or all of the dynamic amplifiers illustrated).

Power supply 710 may comprise some, different, or all of the features of power supply 122 and may represent the same power supply 122 illustrated in FIG. 1A. Power supply 710 may be configured to provide a bias to the plurality of dynamic amplifiers 702-n through connection 706. According to at least one non-limiting exemplary embodiment, dynamic amplifiers 702-n may be connected in parallel to ensure a uniform voltage bias across the dynamic amplifiers 702-n.

Mechanical outputs 204-n may comprise a drive shaft, gear, belt, or other similar mechanical output to be mechanically coupled to a modular attachment using connection interface 214, as illustrated above in FIG. 2. Each mechanical output 204-n may be electromechanically coupled to a corresponding dynamic amplifier 702-n.

Dynamic amplifiers 702-n may comprise voltage or current amplifiers wherein a gain of each dynamic amplifier 702-n may be controlled by inputs 704-n sent by controller 118. Dynamic amplifiers 702-n may comprise a complementary metal-oxide semiconductor (CMOS) amplifiers, operational amplifier (op-amp) amplifiers, and/or any other realization of an amplifier wherein the gain may be dynamically controlled by controller 118. Controller 118 may determine the gain for each dynamic amplifier 702-n based on a function of a corresponding coupled mechanical output 204-n. For example, a modular attachment may comprise a robotic arm wherein mechanical output 204-1 may be coupled to an actuator configured to maneuver two (2) pounds of the modular attachment, such as the wrist joint of the robotic arm, and mechanical output 204-2 may be coupled to an actuator configured to maneuver eight (8) pounds of the modular attachment, such as an elbow joint of the robotic arm. Controller 118, in this example, may determine the gain of dynamic amplifier 702-1 to be smaller than the gain of dynamic amplifier 702-2 as mechanical output 204-1 requires less mechanical power to carry out its function. The function of a coupled mechanical device may be communicated to controller 118 through data connections 212 of connection interface 214 and/or through a user interface unit 112.

According to at least one non-limiting exemplary embodiment, controller 118 may adjust a gain of a dynamic amplifier 702-n as a main robot 102 performs a task with a modular attachment. For example, dynamic amplifier 702-1 may effectuate the control of a scoop modular attachment coupled to mechanical output 204-1. In this example, upon main robot 102 picking up an item using the scoop modular attachment, controller 118 may increase the gain of dynamic amplifier 702-1 to enable the scoop modular attachment to lift heavy objects and reduce the gain once the objects are dropped from the scoop modular attachment.

The use of a plurality of dynamic amplifiers may allow controller 118 of a main robot 102 to accurately and safely effectuate the control of a modular attachment by providing appropriate power to the mechanical outputs 204-n. Additionally, dynamically adjusting the mechanical outputs 204-n using dynamic amplifiers 702-n may allow a main robot 102 to control a plurality of different mechanically coupled attachments using the same mechanical outputs 204-n by simply adjusting the output of each mechanical output 204-n based on the functionality or mechanical power consumption of the coupled mechanical attachments.

According to at least one non-limiting exemplary embodiment, a modular attachment may not utilize all available mechanical outputs 204-n wherein controller 118 may set the gain of unused dynamic amplifiers to zero (0) therefore not providing unused mechanical power and reducing power consumption.

According to at least one non-limiting exemplary embodiment, each mechanical output 204-n may be further equipped with an angular resistance or torque measurement sensor configured to measure a change in angular resistance or torque once a modular attachment is connected to a main robot 102. These measurements may be used for determining a proper connection, as previously illustrated in FIG. 4B.

FIG. 8 illustrates an exemplary embodiment of a connection interface 214, previously illustrated in FIG. 2, of a main robot 102 comprising a plurality of mechanical outputs 708-n, data ports 802-n, and power input 804. As illustrated in FIG. 8, data connections 212 further comprise a plurality of data ports 802-n, configured in a coaxial design, used to send and receive input to and from a modular attachment. Other embodiments of data ports 802-n are considered, such as a twisted pair dual pin configuration, and would be readily apparent to one skilled in the art.

According to one non-limiting exemplary embodiment, wherein a multiplexer (e.g., FDM, CDM, or similar multiplexing configuration) is implemented and/or a protocol-based communication is established, as illustrated above in FIGS. 5A-C and FIGS. 6A-C, a plurality of data ports may be present in data connections 212, however, one, some, or all of data ports 802-n may be used based on, for example, the bandwidth of the signal and allowable bandwidth of the cable used. Similarly, according to at least one non-limiting exemplary embodiment, a plurality of data ports 802-n may unused when a modular attachment is of low complexity and a few or no data ports 802-n may be unused when a modular attachment is of high complexity.

According to at least one non-limiting exemplary embodiment, wherein a multiplexing device and/or protocol-based communication are implemented as illustrated in FIGS. 5A-C and FIGS. 6A-C, a modular attachment may be configured to utilize additional data ports based on the system architecture of the modular attachment. For example, the control of a modular attachment may be accomplished by a controller 118 of a main robot 102 only utilizing data port 802-1 to communicate all necessary signals as the modular attachment may not be too complex. However, the modular attachment may comprise a specific system architecture wherein data port 802-2 may be used to communicate data between designated operative units of the main robot 102 and the modular attachment, such as, for example, the controller 118 communicating control signals directly to a motor using data port 802-2. The modular attachment may communicate this specialized system architecture to the controller 118 upon connection to the main robot 102, causing controller 118 to configure data connections 212 by sending signals to an encoder and decoder to output the necessary data to the data ports specified by the modular attachment.

Connection interface 214 may additionally comprise a plurality of mechanical outputs 204-n, previously illustrated in FIG. 2 and FIG. 7. These mechanical outputs 204-n may comprise gears, drive shafts, belts, and/or any other mechanical output to be coupled with a mechanical input of a modular attachment. According to at least one non-limiting exemplary embodiment, a connection interface 214 may provide a different number of and/or different mechanical output types such as, but not limited to, drive shafts, gears, belts, or a combination thereof based on type of modular attachment a main robot 102 expects to attach to the connection interface 214.

According to at least one non-limiting exemplary embodiment, a modular attachment may comprise fewer or the same number of inputs to be coupled to the data connections 212 and mechanical outputs 204-n of connection interface 214, wherein the number of inputs to be coupled may be based on a specific configuration of a modular attachment. Advantageously, providing a plurality of data and mechanical outputs as illustrated may allow for a main robot 102 to attach to a plurality of modular attachments of varying configuration and complexity.

Power output 202 may be configured to draw power from power supply 122, as previously illustrated in FIG. 1A, to provide power to a modular attachment according to an exemplary embodiment. According to at least one non-limiting exemplary embodiment, the power output 202 may further be connected to a dynamic amplifier, similar to the dynamic amplifiers illustrated in FIG. 7, to account for different power consumptions of different modular attachments. Power output 202 may be implemented as a two-pin design, as illustrated, or as a coaxial cable similar to data ports 802-n according to some exemplary embodiments.

Connection interface 214 may further comprise connector 306 of connection unit 218, as previously illustrated above in FIG. 2 and FIG. 3, configured to mechanically, magnetically, electromechanically, and/or electromagnetically secure a connection of connection interface 214 to a connection interface of a modular attachment. Connector 306 may be enabled by a connection controller unit 304 upon connection controller unit 304 receiving a signal from controller 118 of a main robot 102 to secure the connection interface to the modular attachment, as previously illustrated in FIG. 3. According to at least one non-limiting exemplary embodiment, connector 306 may include, but not limited to, a pair of screws connected to an actuator, an electromagnet, and/or mechanical latch.

One skilled in the art would appreciate a substantially similar connection interface to be observed on the modular attachment, wherein the connection interface of the modular attachment may comprise opposite port types (e.g., female or male port types) to be attached to the port types of the connection interface 214 of a main robot 102. For example, the connection interface of the modular attachment may comprise mechanical inputs further comprising slots or gears to be coupled to the mechanical outputs of the connection interface 214 of a main robot 102.

Figure 9:
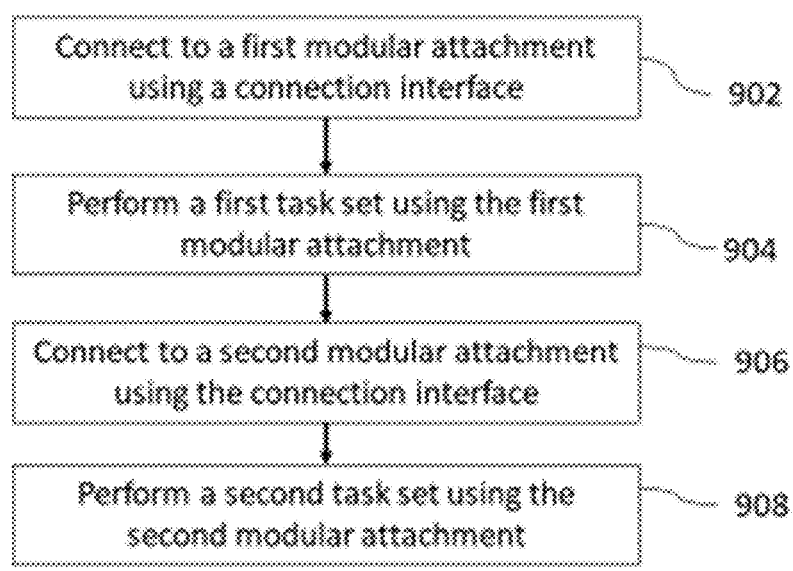
FIG. 9 is a process flow diagram of an exemplary method for a main robot, utilizing a connection interface, to connect to a plurality of modular attachments to perform a plurality of task sets.

FIG. 9 is a process flow diagram illustrating a method for a main robot 102, comprising a connection interface 214, to connect to a plurality of different modular attachments to accomplish a plurality of corresponding sets of tasks, according to an exemplary embodiment. The set of tasks may include one or more tasks such as mopping a floor, picking up items off a floor, taking images or video, assisting humans, and/or any task to be accomplished by a main robot 102 using a modular attachment.

Block 902 illustrates a main robot 102 connecting to a first modular attachment using the connection interface 214. According to at least one non-limiting exemplary embodiment, the main robot 102 may determine the first modular attachment to use to accomplish a first set of tasks, as illustrated in block 904, based on a user input, instructions stored in a memory, instructions communicated by an external server, and/or prior use of the first modular attachment to accomplish tasks of the first task set. According to at least one non-limiting exemplary embodiment, controller 118 may determine a modular attachment used to perform a task based on a learning process, wherein a main robot 102 may attempt to accomplish the task using a plurality of different modular attachments to find the most efficient modular attachment to perform the task.

Block 904 illustrates main robot 102 utilizing the first modular attachment to perform the first task set. Main robot 102 may effectuate the control of the first modular attachment by sending power output, electrical data signals, and/or mechanical output to the first modular attachment via the connection interface 214.

Block 906 illustrates main robot 102 connecting to a second modular attachment using the connection interface 214 to complete a second task set. The second modular attachment may be determined using substantially similar methods illustrated in block 902 above. According to at least one non-limiting exemplary embodiment, the second task set may comprise different tasks from the first task set, requiring a different modular attachment to perform the second task set after completion of the first task set. According to another non-limiting exemplary embodiment, the second task set may comprise some tasks of the first task set (e.g., a subset of the first task set) requiring the second modular attachment to complete the second task set.

Block 908 illustrates main robot 102 utilizing the second modular attachment to perform the second task set. Main robot 102 may effectuate the control of the second modular attachment by sending power output, electrical data signals, and/or mechanical output to the second modular attachment via the connection interface 214.

According to example embodiments, a robotic system may comprise a base device including a port for receiving at least one extension; and at least one processor, generally included in the control module, configured to execute computer readable instructions to: move the base device from a first position to a different second location along a trajectory; and change orientation of the base device from a first orientation to a different second orientation based on connecting the at least one extension to the port of the base device. The at least one processor is further configured to change characteristics of the base device from a first characteristic to a different second characteristic based on the at least one extension received by the port. For example, the first characteristic may correspond to floor mopping and the second characteristic may correspond to vacuum cleaning.

The robotic system described herein comprises a control module comprising a central processing unit, memory, and a set of computer readable instructions, and at least one sensor, wherein the control module is in operative connection to a drive module and at least one task module; the central processing unit is configured to function as an adaptive computerized predictor apparatus by receiving input from the at least one sensor and operate in accordance with a learning process based on the sensor input to determine a path of motion through a space and control the motion of the drive module through the space, and function as a controller to direct the task module to perform its task.

The control module is configured to receive instructions from a human operator through an interface such as a touch pad, keyboard, voice recognition systems and the like. It may also receive instructions from a centralized computer source containing master instructions, such as in a local network. The received instructions may instruct the control module to operate the system in a manner not included in its standard programmed instructions, such as to move to a specific location and/or perform a requested task in response to the command.

The control module is in operative communication with the drive unit, described in more detail below. When the robot system is placed in a physical space, the control module operates the drive module to explore and map the space using one or more sensors, such as visual, sonic and/or pressure sensors to locate and map the boundaries of the space and any obstacles to motion in the space. The control module may also map locations where tasks may be conducted. The navigating robot may also assign labels to different locations ("this is a kitchen", "this is a bedroom", "this location is next to Martin's chair") based on its programmed or received instructions. On subsequent travels through the space, the control module may discover and map locations where obstacles or task sites have been added or removed, thereby continually learning the space.

The control module is also in operative communication with at least one task module and selects its programmed instructions based on which module(s) are in communication. The control module may also choose not to carry out a programmed instruction to carry out a task if it determines that the assigned task module is not in place, is inoperative, or needs supplies loaded or waste unloaded, or is otherwise not capable of carrying out the task. The control module may communicate the inoperable condition to a human or network operator to inform the operator that the system needs attention.

An example implementation of an adaptive robotic apparatus for use with the adaptive predictor methodology described hereinafter. The apparatus may comprise an adaptive controller and a robot drive unit (e.g., robotic platform). The controller may be configured to generate control output for the sensor(s) or drive unit. The output may comprise one or more motor commands (e.g., pan camera to the right, or steer to the left), sensor acquisition parameters (e.g., use high resolution camera mode), commands to the wheels, arms, and/or other actuators on the robot, and/or other parameters. The output may be configured by the controller based on one or more sensory inputs. The input may comprise data used for solving a particular control task. In one or more implementations, such as those involving a robotic arm or autonomous robot, the signal may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information.

In some implementations, such as those involving object recognition, the signal and/or input may comprise an array or stream of pixel values in one or more digital images (e.g., video, radar, sonography, x-ray, magnetic resonance imaging, and/or other types), or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal may comprise a target motion trajectory. The motion trajectory may be used to predict a future state of the robot on the basis of a current state and the target state. In one or more implementations, the signals may be encoded as spikes.

The controller may be configured to generate controller output based on one or more of (i) sensory input and robot feedback. In some implementations, robot feedback may comprise proprioceptive signals, such as the readings from servo motors, joint position, and/or torque. In some implementations, the sensory input may correspond to the controller sensory input described above.

The adaptive predictor may be configured to generate predicted controller output based on one or more of (i) the sensory input and the robot feedback. The predictor may be configured to adapt its internal parameters, e.g., according to a supervised learning rule, and/or other machine learning rules.

The sensory input and/or the robot feedback may collectively be referred to as sensory context. The context may be utilized by the predictor in order to produce the predicted output. By way of a non-limiting illustration of obstacle avoidance by an autonomous rover, an image of an obstacle (e.g., wall representation in the sensory input) may be combined with rover motion (e.g., speed and/or direction) to generate Context_A. When the Context_A is encountered, the control output may comprise one or more commands configured to avoid a collision between the rover and the obstacle. Based on one or more prior encounters of the Context_A—avoidance control output, the predictor may build an association between these events.

The learning process of the adaptive predictor may comprise supervised learning process, reinforcement learning process, and/or a combination thereof. The learning process of the predictor may be configured to generate predictor output. The control block, the predictor, and the combiner may cooperate to produce a control signal for the robot.

The adaptive predictor may be configured to generate predicted controller output based on one or more of (i) the sensory input and the robot feedback. Predictor realizations, comprising robot feedback may be employed in applications such as, for example, wherein (i) the control action may comprise a sequence of purposefully timed commands (e.g., associated with approaching a stationary target (e.g., a cup) by a robotic manipulator arm); and (ii) the robot may be characterized by a robot state time parameter (e.g., arm inertia, and/or motor response time) that may be greater than the rate of action updates. Parameters of a subsequent command within the sequence may depend on the robot state (e.g., the exact location and/or position of the arm joints) that may become available to the predictor via the robot feedback.

One particular implementation of the computerized neuromorphic processing system, for use with an adaptive robotic controller is one wherein the computerized system may comprise an input device, such as, for example, an image sensor and/or digital image interface. The input interface may be coupled to the processing block (e.g., a single or multi-processor block) via an input communication interface. In some implementations, the interface may comprise a wireless interface (cellular wireless, Wi-Fi, Bluetooth, etc.) that enables data transfer to the processor from remote I/O interfaces. One such implementation may comprise a central processing apparatus coupled to one or more remote camera devices providing sensory input to the adaptive predictor block.

The system may further may comprise a random access memory (RAM), configured to store neuronal states and connection parameters and to facilitate synaptic updates. In some implementations, the memory may be coupled to the processor via a direct connection (e.g., memory bus). The memory may also be coupled to the processor via a high-speed processor bus.

The system may comprise a nonvolatile storage device. The nonvolatile storage device may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage may be used to store state information of the neurons and connections for later use and loading previously stored network configuration. The nonvolatile storage may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus may be coupled to one or more of an external processing device, a storage device, an input device, and/or other devices via an I/O interface. The I/O interface may include one or more of a computer I/O bus (PCI-E), wired (e.g., Ethernet) or wireless (e.g., Wi-Fi) network connection, and/or other I/O interfaces. In some implementations, the input/output (I/O) interface may comprise a speech input (e.g., a microphone) and a speech recognition module configured to receive and recognize user commands.

It will be appreciated by one skilled in the art that various processing devices may be used with computerized system including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

The apparatus, in one or more implementations, may interface to external fast response memory (e.g., RAM) via high bandwidth memory interface, thereby enabling storage of intermediate network operational parameters. Examples of intermediate network operational parameters may include one or more of spike timing, neuron state, and/or other parameters. The apparatus may interface to external memory via lower bandwidth memory interface to facilitate one or more of program loading, operational mode changes, retargeting, and/or other operations. Network node and connection information for a current task may be saved for future use and flushed.

In some example embodiments, the HLND framework may be utilized to define network, unit type and location, and/or synaptic connectivity. HLND tags and/or coordinate parameters may be utilized in order to, for example, define an area of the localized inhibition of the disclosure described above Adaptive predictor and control methodology described herein may advantageously enable training of robotic controllers. Previously learned actions (primitives) may be reused in subsequent actions that may comprise the same and/or similar control operations. A hierarchy of control actions (primitives) may be developed so as to enable a single higher-level action indication (by an operator) to invoke execution two (or more) lower level by the predictor actions without necessitating generation of the explicit control instructions by the operator. By way of an illustration, a task of teaching a robot to reach for an object may be partitioned into two or more (simpler) sub-tasks: e.g., approach target and/or avoid obstacles. In turn, individual tasks approach target and/or avoid obstacles may be partitioned into a sequence of robot movements (e.g., turn left/right, go forward/backwards). One or more predictors of the robot controller may be trained to perform lower level. Another predictor may be trained to associate an action indicator (e.g., approach) with one or more movement tasks. A hierarchy of action primitives may enable an operator to operate the robot to perform composite tasks based on previously learned sub-tasks.

When teaching the controller a new task (behavior of serving a glass of water), using the previously learned behaviors and/or primitives (reaching, grasping an object, etc.) may be utilized thereby accelerating learning compared to methods of the prior art.

One or more predictors may be configured to learn to execute learned tasks may be When teaching the controller a new task (behavior of serving a glass of water), using the previously learned behaviors and/or primitives (reaching, grasping an object, etc.) may be utilized thereby accelerating learning compared to methods of the prior art.

The learning process of the adaptive predictor may comprise supervised learning process, operated in accordance with a teaching input from a supervisor agent. Supervised learning may utilize fewer memory and/or computational resources (due to, e.g., a smaller exploration state space). The computational efficiency may be leveraged to implement more complex controller (for given hardware resources) and/or to reduce hardware complexity (for a given controller task load).

In one or more obstacle avoidance applications, an adaptive predictor apparatus may be configured to learn to anticipate the obstacles, allowing for faster and smoother anticipatory avoidance behavior.

In one or more object recognition applications, an adaptive predictor apparatus may speed-up and/or improve reliability of object detection in the presence of noisy and/or otherwise poor sensory information ("pattern completion".)

Adaptive prediction methodology may provide a means for evaluating discrepancy between the predicted state and the actual state (configured based on, e.g., input from the environment) thereby allowing the control system to be sensitive to novel or unexpected stimuli within the robot environment.

In some implementations, such discrepancy evaluation may be utilized for novelty detection. By monitoring the discrepancy, one or more behaviors that result in unpredicted, and/or novel results may be identified. Learning of these behaviors may be repeat until these behaviors are learned (become predictable). In some implementations, the behavior predictability may be determined based one the discrepancy being below a given threshold.

In one or more implementations, training methodology described herein may be applied to robots learning their own kinematics and/or dynamics (e.g., by the robot learning how to move its platform). Adaptive controller of the robot may be configured to monitor the discrepancy and once one or more movements in a given region of the working space are learned, the controller may attempt to learn other movements. In some implementations, the controller may be configured to learn consequences robot actions on the world: e.g. the robot pushes an object and the controller learns to predict the consequences (e.g., if the push too weak nothing may happen (due to friction); if the push is stronger, the object may start moving with an acceleration being a function of the push force).

In some sensory-driven implementations, the controller may be configured to learn associations between observed two or more sensory inputs.

In one or more safety applications, the controller may be configured to observe action of other robots that may result in states that may be deemed dangerous (e.g., result in the robot being toppled over) and/or safe. Such approaches may be utilized in robots learning to move their body and/or learning to move or manipulate other objects.

Figure 10:
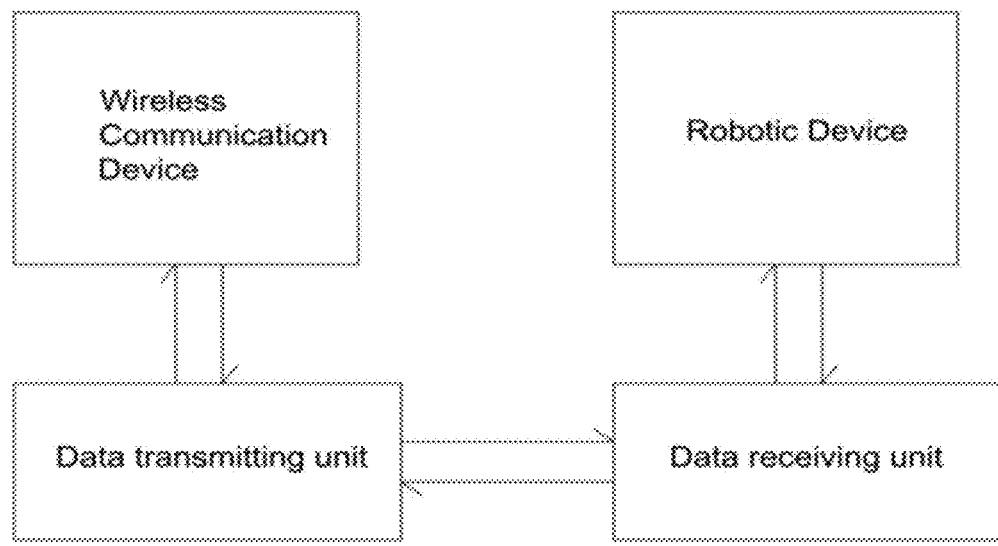
FIG. 10 illustrates a system of communicating data to a robotic system to perform multiple tasks.

FIG. 10 describes a system to perform multiple tasks. The system comprises a wireless communication device, an application, a data transmitting unit and a data receiving unit, such as is achieved between a master robot and a slave robot. The wireless communication device may send voice commands or signals via an application to the slave robotic device. The slave robotic device then receives the data, through the data receiving unit, from the data transmitting unit, and accordingly processes the data and executes the command as desired based on the input signals received from the master robot. The wireless communication may be achieved by use of Bluetooth, pairing, or radio frequency identifiers (RFID). Alternatively, the communication system between a master robot and slave robot may be paired with physical connections or ports that allow the master and slave robots to pair with each other and in-turn, function in unison.

Figure 11:
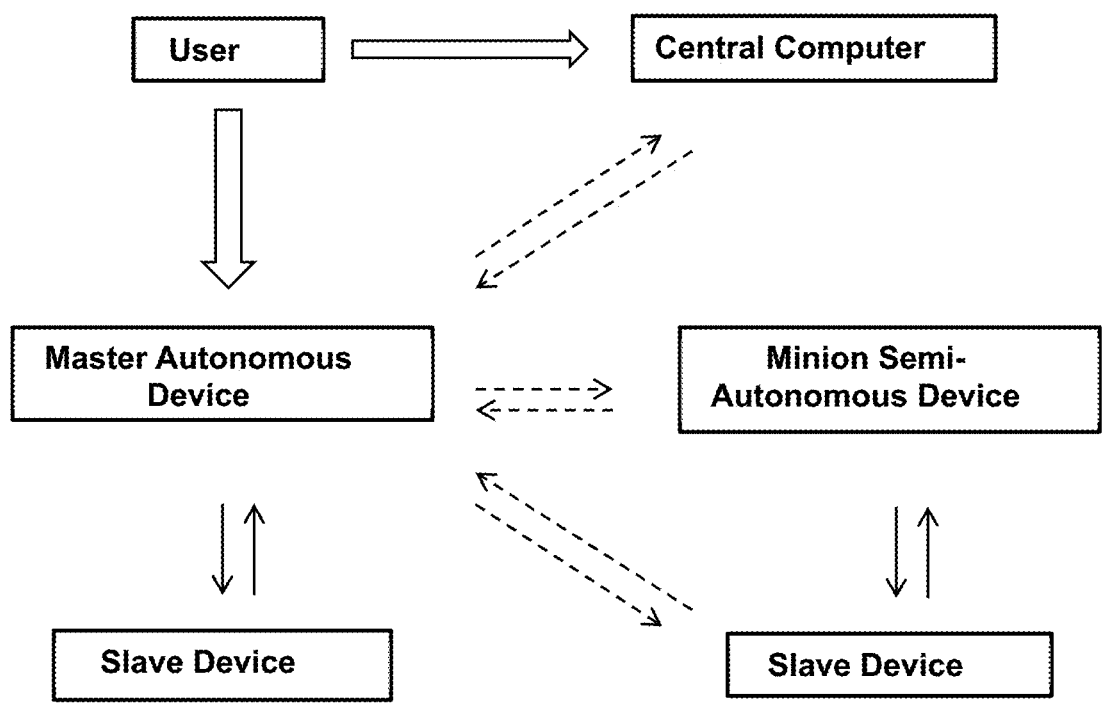
FIG. 11 illustrates a hierarchical system of master and slave devices.

As used herein and illustrated schematically in FIG. 11, the term "master" refers to a component of the robotic device and/or system that controls other components, such as accessory modules. For example, a master device comprises a drive unit and a control module including a processor, memory, and communication system for providing commands to a slave or minion device and receiving input such as sensory data from the devices under its control. Alternatively, the master device may be located physically in a stationary central hub. The term "slave" refers to a component, for example an accessory module, of the robotic device and/or system that receives all its operating instructions from a master component. A slave device cannot operate independently from a master device, although a slave may comprise a processor and memory containing instructions associated with its function that can be accessed and controlled by a master device. The term "minion" refers to a component of the robotic device and/or system that can operate either autonomously based on its own operating instructions or subservient to a master component based on instructions from the master device. A minion device may comprise a drive unit and a control module including a processor, memory, and communication system for providing commands to a slave device and receiving input such as sensory data from slave device(s) under its control. The minion device can control an associated slave device directly, either when operating autonomously, or when being controlled by a master device. Alternatively, the master device can control a slave device associated with a minion device without routing instructions through the minion processor. In some embodiments, a minion device, such as a minibot, may be carried on board a slave device and deployed by the slave device operated by a master device at a locus where the minion's function is to be conducted. The term "user" as used herein can encompass any operator of the robotic device that can determine the tasks that the robotic device and system carries out. In many embodiments, the "user" is a human. According to one non-limiting exemplary embodiment, an operator of the robotic device can be non-human (e.g., another robot, artificial intelligence, etc.) with the capability of telling the robotic device what tasks to carry out. The user can program the master device directly or through a central computer in communication with the master device. The robotic operating system can be designed to facilitate any system of user/master/minion/slave control hierarchy.

Figure 12:
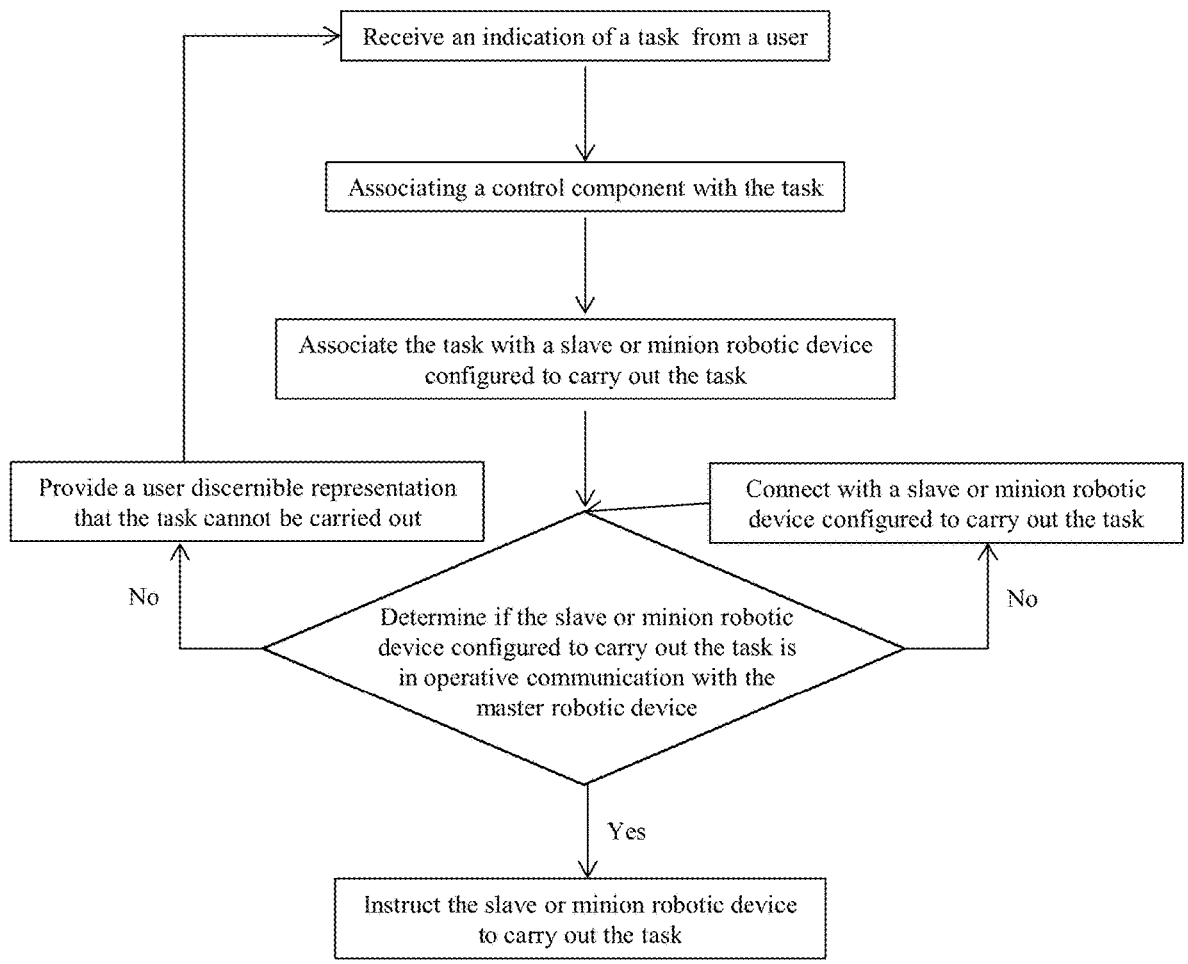
FIG. 12 illustrates a process flow sequence for carrying out a task according to the hierarchical system shown in FIG. 13.

FIG. 12 illustrates a process flow sequence for carrying out a task according to the hierarchical system shown in FIG. 11. Shown is a method for controlling a robot to execute a task, the method comprising, based on an indication received from a user, executing a plurality of actions within a master autonomous robotic device; individual ones of the plurality of actions being configured based on sensory input and a given user input or a plurality of user inputs wherein the input comprises a control command; the plurality of tasks comprising, associating a control component with the task, associating the task with a slave or minion robotic device configured to carry out the task; determining if the slave or minion robotic device configured to carry out the task is in operative communication with the master robotic device; and if the slave or minion robotic device configured to carry out the task is in operative communication with the master robotic device, directing the control component to the slave or minion robotic device thereby instructing the slave or minion robotic device to carry out the task; or if the slave or minion robotic device configured to carry out the task is not in operative communication with the master robotic device, connecting with a slave or minion robotic device configured to carry out the task so that the master robotic device is in operative communication with the slave or minion device; or providing a user discernible representation that the task cannot be carried out.

In some embodiments, the master robotic device can autonomously connect to a slave or minion device configured to carry out the desired task. For example, the master device can autonomously locate a slave device configured to carry out the task, such as in a docking station or a storage facility, and physically connect to the slave device. Alternatively, the master device may wirelessly connect to a minion device that is connected/associated with a slave device that is configured to carry out the task. Once the appropriate slave or minion device is connected to the master device, it determines whether operative communication has been established with the slave or minion device. If operative communication has been established, the master directs the control component to the slave or minion robotic device, instructing the slave or minion robotic device to carry out the task.

In some instances, the master device may be unsuccessful in connecting to a slave or minion device configured to carry out the task. For example, an appropriate slave or minion device may not be within range of the master device to allow a connection. Alternatively, the appropriate slave device may need to be connected manually to the master or minion device. Alternatively, the slave or minion device may not be able to carry out the desired task because it needs supplies, is full of waste, needs charging, etc. In any of these instances, the master device needs human intervention to carry out the desired task. In these instances, the master device provides a user discernible representation that the task cannot be carried out. The user discernible representation may be a simple visual and/or audible signal emitted by the master device, or it may be instantiated by output directed to a user interface unit 112, as described herein. The human user can cancel the task indication, alter the indication to carry out a different task, provide the needed slave or minion device, such as by connecting the slave device to the master device, or enable the slave or minion device to conduct the task, etc. Once the master device is connected to the appropriate slave device or minion, it can determine that operative communication has been achieved and instruct the slave device to carry out the task.

In some embodiments, the control command is conveyed to the master robotic device via a central computer.

In some embodiments, when the control component is directed to the minion robotic device, the control command is directed to a further slave robotic device associated with the minion robotic device thereby instructing the further slave robotic device to carry out the task.

In some embodiments, the provision of the user discernible representation comprises disposing an icon on a display;

and configuring a user interface unit 112 to receive input based on the user action configured in accordance with the icon.

Figure 13:
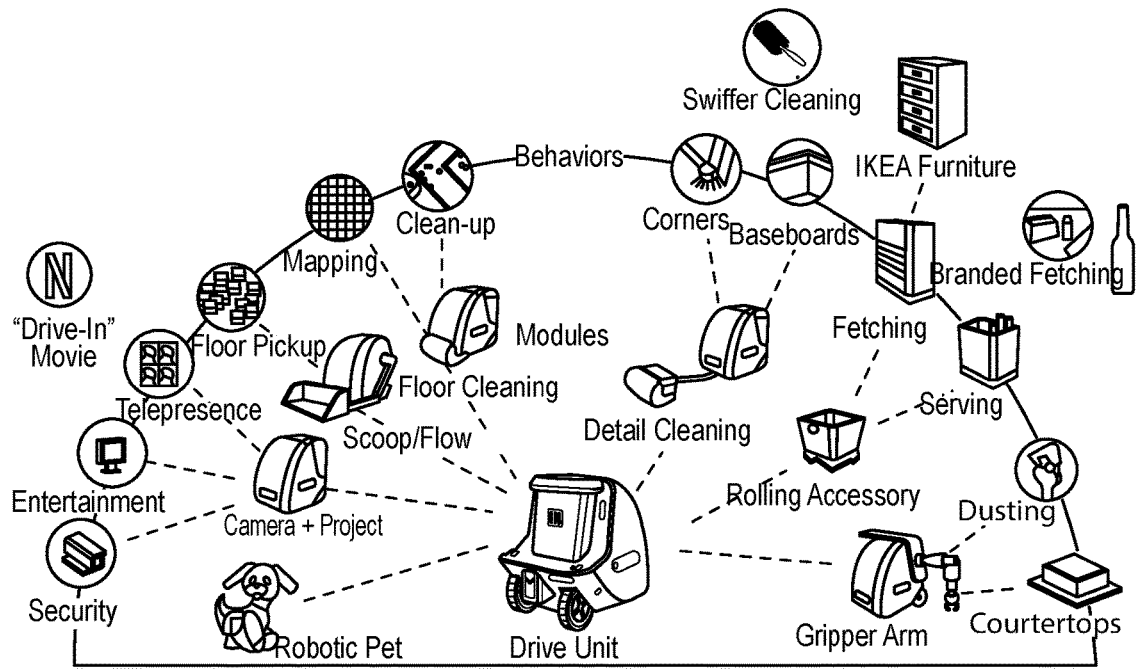
FIG. 13 is a schematic diagram illustrating various configurations of the drive module, the control module (brain) and one or more task modules.
Figure 14:
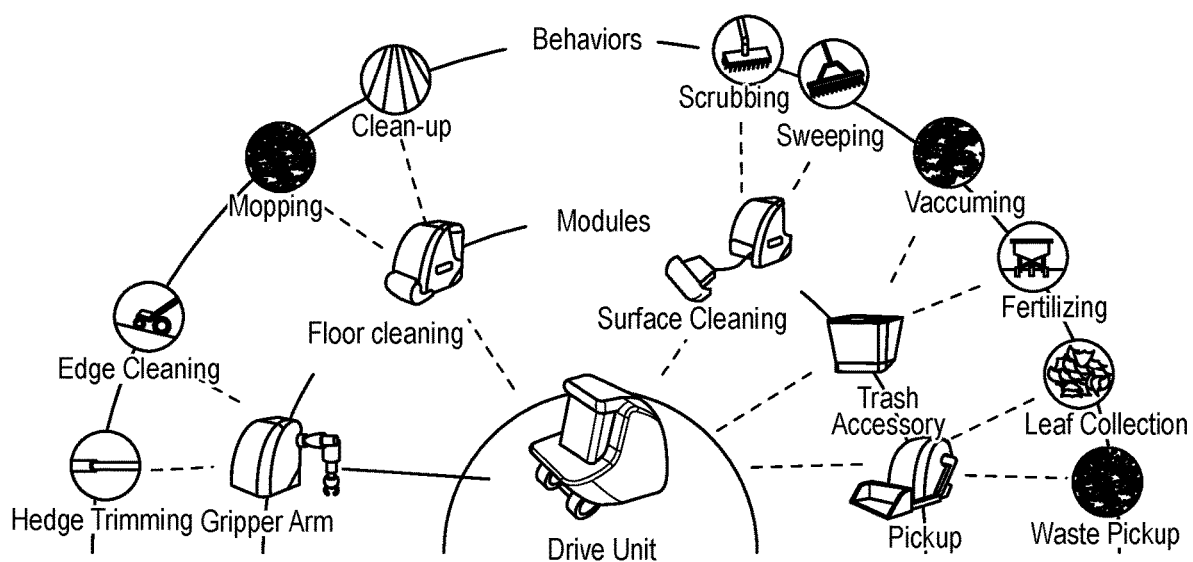
FIG. 14 is a schematic diagram illustrating a network of autonomous robots as described herein comprising a central control unit (brain hub), a master bot for mapping and/or performing a task, and at least one "minion" bot.

FIGS. 13 and 14 are exemplary illustrations of a main robot 102 and a plurality of modular attachments operable by the main robot 102. The plurality of modular attachments may improve the functionality the main robot 102 with respect to performing specific tasks. According to a non-limiting exemplary embodiment, a main robot 102 operating autonomously may be assigned a plurality of different tasks, each requiring a specialized modular attachment to provide the main robot 102 with additional functionality required to perform the plurality of specialized tasks. These tasks may comprise, according to the same exemplary embodiment, vacuuming a floor, dusting a surface, and picking up items from a floor and may be performed in a specified order based on a user input.

Figure 22:
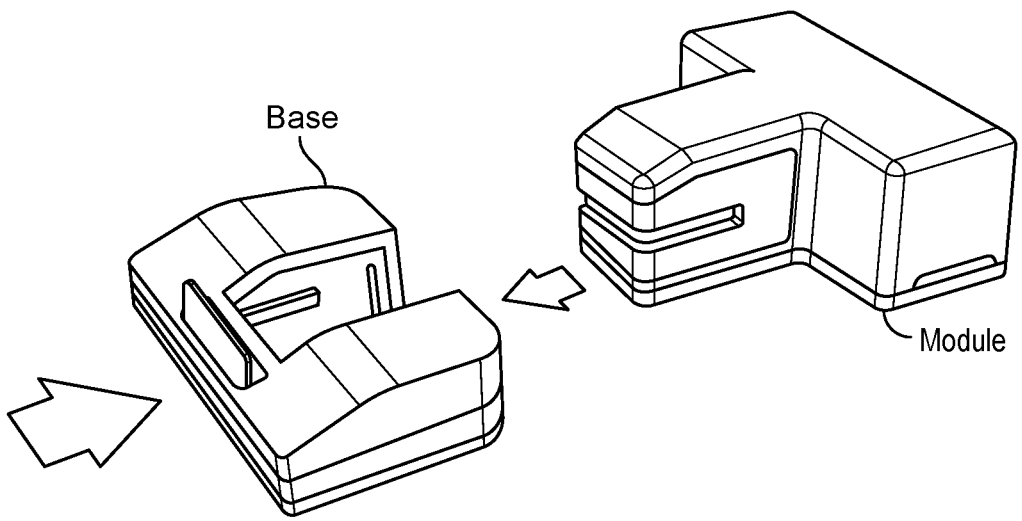
FIGS. 22, 23, 24A and 24B show views of alternative embodiments showing arrangements for attaching a task module to a drive module.
Figure 23:
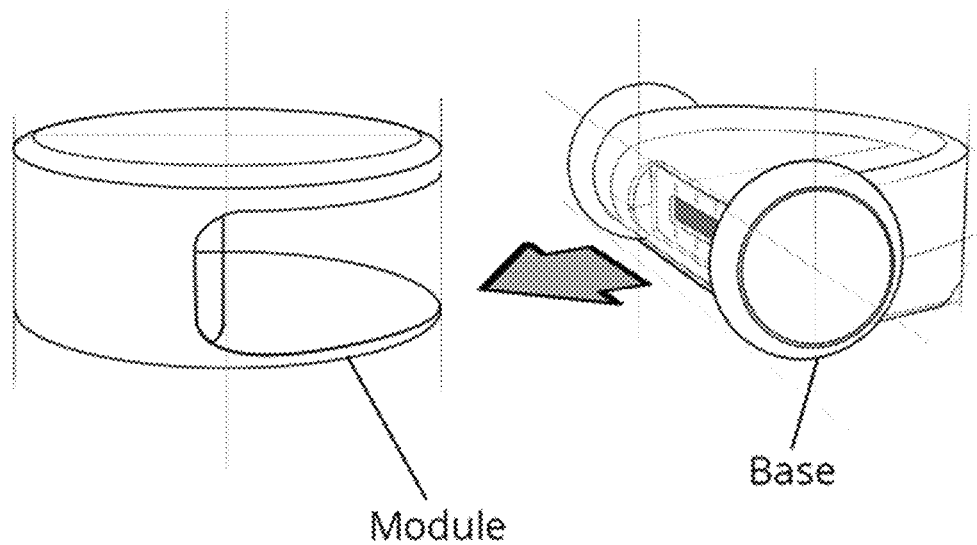

FIGS. 13 and 14 describe a modular ecosystem to perform multiple household tasks such as cleaning and/or yard maintenance tasks. The robotic device comprises a base unit comprising a drive unit and a control module wherein the base unit is configured to operationally connect to a plurality of accessories such as backpack accessories, trailer accessories and ground accessories to perform multiple yard maintenance tasks, as described in more detail below with reference to FIGS. 17-26. In some cases, the accessories can be connected as a single part or as multiple component parts. As shown for example in FIGS. 22 and 23, these accessories can be connected or snap-fitted into the base drive module. The accessories provide electronic identification regarding their function to the control module to enable the control module to configure the robotic device to enable the accessories to function. These accessories can define how the underlying base unit operates based at least in part on their connection with the control module.

FIG. 13 shows exemplary embodiments of the drive unit or the master robot module or unit that can be configured to be connected to a variety of separate, independently operable modules to assist the master robot with household cleaning tasks, among others. FIG. 14 shows exemplary embodiments of the drive unit or the master robot module or unit that can be configured to be connected to a variety of separate, independently operable modules to assist the master robot with outdoor yardwork. In embodiments, the task performed by the at least one task module may be selected from a set of core applications, for example the group consisting of: cleaning, mopping, vacuuming, dusting, purifying, carrying, reaching, retrieving, serving and delivering. Cleaning may comprise surface cleaning wherein the surface is a floor, wall, corner, baseboard, shelf, and or counter. Purifying may comprise filtering air, water or other fluid. Carrying, retrieving, serving and delivering comprise transferring an object from one location to another location. Additional apps or shortcuts may provide further instructions such conduction tasks according to brand recognition, or behaviors specified within the app.

In other words, FIGS. 13 and 14 show the drive unit or the master robot module or unit that can be configured to be connected to a variety of separate, independently operable modules. These modules can vary in shape, size, function, and capability. The different modules can be considered as a slave robot module or unit, as described further in reference to FIG. 11. The slave robot module or unit can be connected to the master robot such that the master robot can perform a different function or has a change in characteristics based on the type of slave robot that has been connected or attached to the master robot. For example, as discussed above, if a detail cleaning slave robot is attached to the master robot drive unit, then the master robot would be reconfigured to perform the functions of corner and baseboard cleaning, wiping, etc. Whereas, if the master robot device unit is connected to a floor cleaning slave unit module then the master robot device unit may be reconfigured to perform other functions such as vacuuming, clean-up, mopping etc. In another example, as discussed herein, if a mowing slave robot is attached to the master robot drive unit, then the master robot would be reconfigured to perform the functions of mowing. Whereas, if the master robot device unit is connected to a sweeping slave unit module then the master robot device unit may be reconfigured to perform other functions such as sweeping, etc. The resultant functions that the master robot device unit performs depend on the type of slave robot device units that are affixed, attached or connected to it. As shown in FIGS. 17-26, the master unit may be connected to more than one accessory module, so the master robot is configured to operate all slave units attached or connected to it and perform the functions associated with the slave units.

Still referring to FIGS. 13 and 14, the modular ecosystem comprises a drive unit that is configured to be connected to a plurality of modular accessories or task modules. The robotic device comprises a base unit comprising a drive unit and a control module wherein the base unit is configured to operationally connect to a plurality of accessories such as backpack accessories, trailer accessories and floor accessories, discussed further below, to perform multiple household tasks. Controlled by a control module (not shown, but generally integral with or attached to the drive unit), the drive unit transports the various task modules to locations in an indoor or outdoor space or environment such as a room, house, shop, warehouse, yard, driveway, patio, and the like where the task assigned to the task module is to be conducted. The control module instructs the task module to carry out its task, according to its dedicated task instructions. The modular accessories perform multiple tasks, such as various cleaning and/or yard maintenance tasks. As shown in FIG. 13, a floor cleaning module may be attached to the drive unit for vacuuming, scrubbing, mopping, clean-up and/or grout scrubbing. A detail cleaning module is a module that for example cleans the corner and baseboards by vacuuming or wiping with microfiber cloth. It may also comprise a tethered vacuum for cleaning in tight spots or under or around furniture. Also, as shown in FIG. 14, a ground module may be attached to the drive unit for mowing, yard vacuuming, blowing, hard surface scrubbing, and/or sweeping. Other modules may include modules for edging of lawns, hedge trimming, debris pick-up and the like. A rolling accessory trailer module may comprise a utility cart.

Main robot 102 may first navigate autonomously to a vacuum modular attachment, connect to the modular attachment using a connection interface 214 further illustrated above in FIG. 2, and vacuum the floor. Later, main robot 102 may navigate to a gripper arm modular attachment, connect to the gripper arm modular attachment using the connection interface 214, and dust the surface using the gripper arm. Lastly, main robot 102 may navigate to a scoop/plow modular attachment, connect to the modular attachment using the connection interface 214, and pick up items from the floor. As illustrated in this exemplary embodiment, for main robot 102 to perform a plurality of tasks of varying complexity, main robot 102 must attach to a plurality of different modular attachments of varying complexity and functionality. As discussed in the present disclosure, a connection interface 214 may provide a main robot 102 with the ability to connect to the plurality modular attachments of varying complexity using only one connection interface, connection interface 214, as illustrated above in FIG. 2. Advantageously, the use of a single connection interface 214 to attach to a plurality of varying complexity modular attachments may provide a main robot 102 with the capability to quickly and easily switch between the plurality modular attachments to perform a plurality of tasks of varying complexity without the need for different connectors (e.g., ethernet, USB, PCIe, etc.) to be positioned on the chassis of the main robot 102 for each of the plurality of modular attachments.

FIG. 15 shows various configurations of the drive module, the control module (brain) and one or more task modules combined into a robotic system. In an example embodiment, the drive module provides a mobile base for the system and a lower platform for one or more task modules such as a macro-module, or modules 1 and 2. The drive module also provides a frame that provides an upper platform for the control module (brain) at the top of the apparatus. Placement of the control module at the top of the system allows for 360-degree scanning by one or more sensors in the control module, but the frame also results in fixed height for the robot apparatus.

Alternatively, the control module is located in or one the drive module, allowing for variable height stacking of task modules on the platform (modules 1, 2, and up to 'n' modules, wherein 'n' being a positive integer greater than one (1) or two (2)). Locating the control module at the base on the system allows for flexible expansion of task modules, but may also limit the ability of the sensor(s) to scan the space around the robotic system.

Figure 21A:
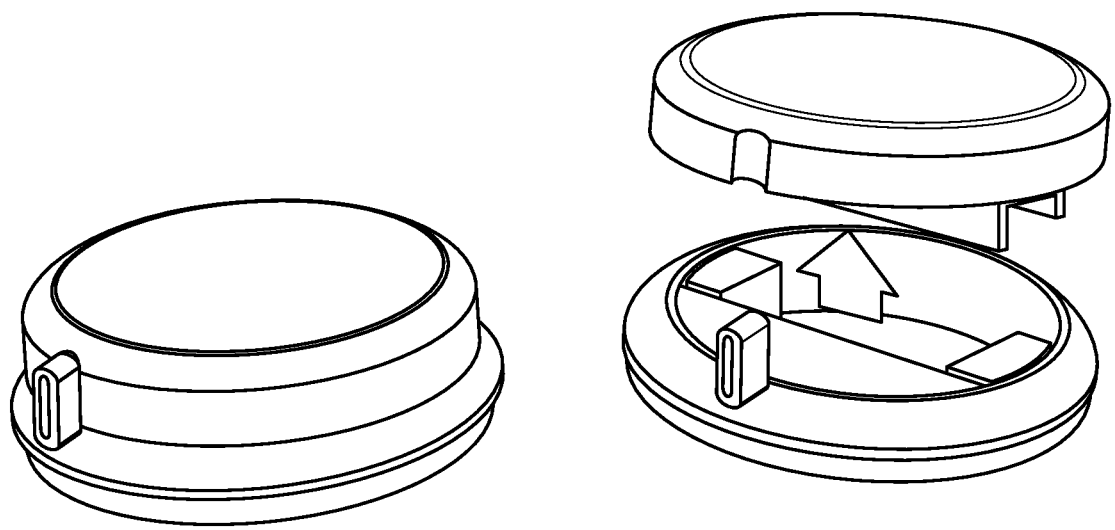
FIGS. 21A and 21B show perspective and exploded views of an embodiment of a drive module with integral control module with a task module attached and removed.
Figure 21B:
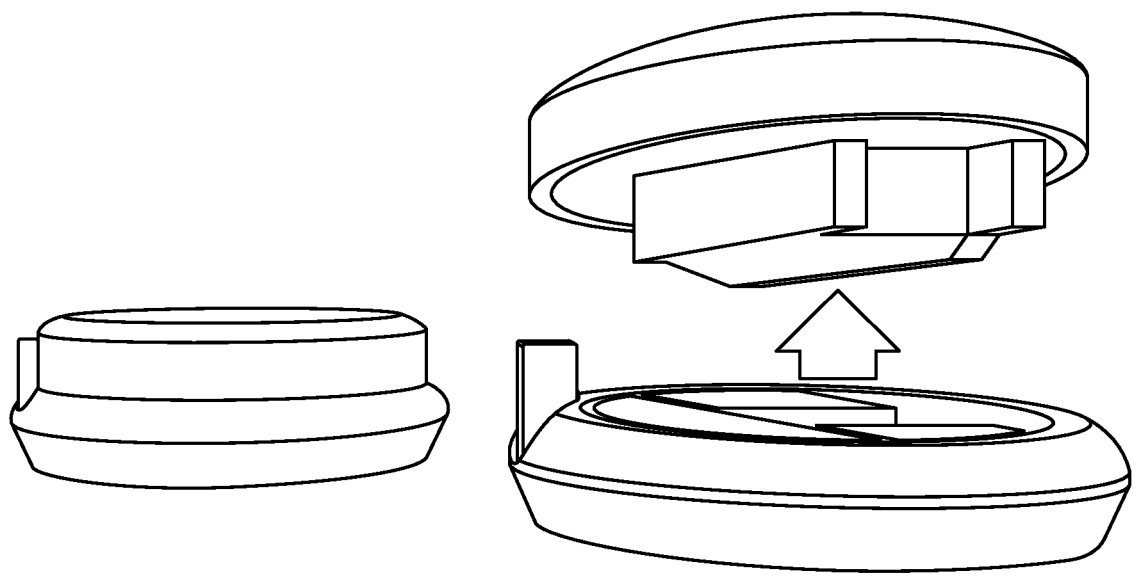
Figure 24A:
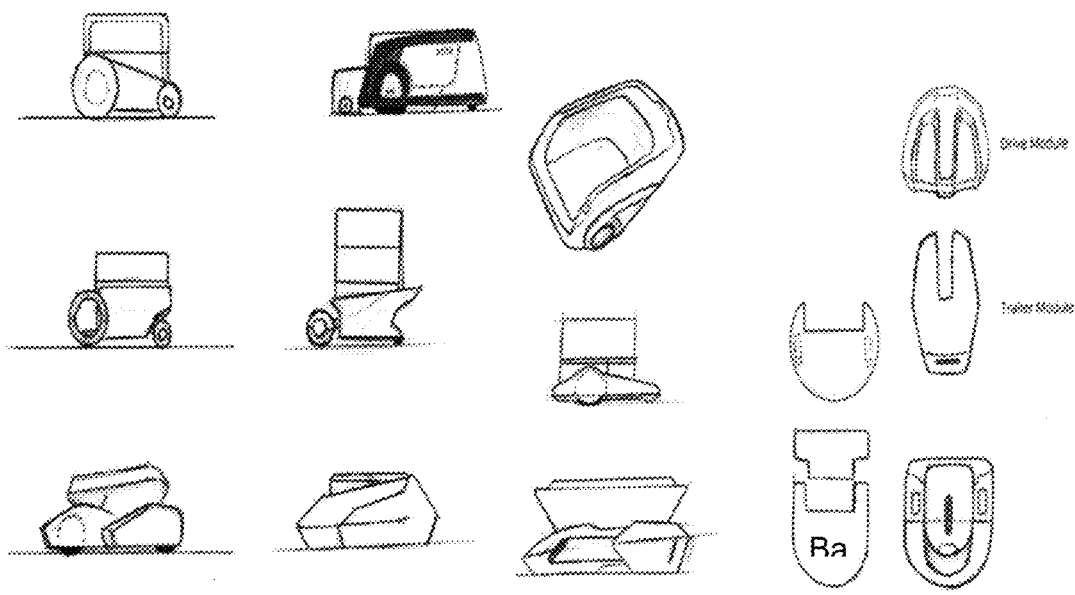

In another example embodiment, the drive module provides a platform for a stack of task modules on the platform (modules 1, 2, and up to 'n' modules, where 'n' is an integer greater than one (1) or two (2)), with the control module at the top of the stack. Each stackable module is connected to the drive unit or a lower module in the stack via a top port with a top connector. Each stackable module comprises at least one top port to allow another stacked module to be connected to the robotic system. The top ports are configured to allow electric and electronic and connection through the stack to allow the control module to interact with all accessory modules and the drive unit at the bottom of the stack. The control module is always connected to the stack at the top, so that its user interface features are accessible. This configuration allows for variable height stacking and full-view scanning by the sensor(s). In some embodiments, a bottom module such as shown in FIGS. 21A-B below may be used as the lowest module in the stack with additional modules stacked on top. One embodiment of a drive unit includes a recess in which a top accessory module can be disposed, such as illustrated in FIG. 24A as image 24-1. This embodiment may be configured as a drive unit with an integrated bottom module, such as an integrated drive/mower unit. One can appreciate that other configurations may combine some of the features of the three configurations embodied in FIG. 15.

The drive unit comprises a plurality of wheels, at least one of which is steerable and at least one of which is in operational connection to a motor to drive the unit, on which the drive unit travels around an environment, such as a house, shop, school, warehouse, yard, driveway, patio, and the like. The driven wheel(s) and the steerable wheel(s) may be the same or different. For example, the steerable wheel may be steerable by swiveling on a pivot controlled by an actuator that provides rotational motion to the pivot, thereby turning the wheel. Alternatively, a pair of wheels may be steerable by a conventional steering mechanism such as a rack-and-pinion system. Alternatively, steering may be accomplished by turning paired wheels at different speeds and/or clockwise or counter-clockwise motion. Preferably, the drive unit can operate in forward and reverse directions to move the robotic device and attached accessories through the physical environment. As shown in, for example, FIG. 26B, an exemplified drive unit comprises four wheels. Alternatively, the drive unit could comprise continuous tracks such as caterpillar track or tank treads comprising a system of vehicle propulsion in which a continuous band of treads or track plates is driven by one or more wheels to move the robotic device.

The drive unit also comprises at least one electric motor to drive the wheel(s) and propel the robotic system through a space. It also comprises at least one power supply such as a battery, desirably rechargeable, to provide power to the drive motors, and optionally power the control module and/or accessory module(s), communications systems, sensors, displays, accessory or task modules, and/or other components of the robotic system. The drive module also comprises one or more connectors to link the drive unit to the control module and at least one task module and provide operative connectivity. The connector(s) comprise fasteners to physically attach the drive modules to the other modules, electric (power) connectors, electronic connectors, communication connectors and the like.

The base unit also comprises a control module that houses electronic and computer components of the robotic device. The control module includes at least one processor unit to communicate with and control the drive unit and one or more accessory modules. The control module is also in operable communication with at least one sensor, which may be located on the control module, the drive unit and/or an accessory unit. The control module controls the operation of the drive unit and the one or more accessories according to a combination of software programming, user instruction, machine learning and sensor input. For instance, the control module directs the drive unit to travel through the physical environment. The control module communicates with the attached accessories to identify which accessory is attached and can select a pathway through the environment based on the identified accessory. The control module may also direct the accessory to perform its configured task(s) at one or more locations along the pathway.

In some embodiments the drive unit and the control module are integrated into the base unit inside a single exterior casing. In other embodiments, the drive unit and the control module comprise separable modules, so that for example, either the drive unit and/or control module can be replaced in the robotic device. Alternatively, the drive unit may interface with different control modules, such as an on-board control module, or a control module on a separate drive unit or in a central hub. Whether integrated or separable, the drive unit and control module comprise a base unit to which the accessory modules are attached/connected and are operated therefrom.

Desirably, the drive unit may further comprise a port/connector to engage/disengage with an auxiliary apparatus, such as a docking or base station that may comprise a charging system to recharge the power supply. In some embodiments, the trailer port may function to connect to the docking station. The docking station desirably is powered by alternating current (AC) from a standard electrical power grid via a power cord and comprises a convertor for converting AC into direct current (DC) for charging the at least one battery. The docking station may also comprise a mechanical connection to the drive module to keep it locked in place during a charging or idle period. The robotic system can be controlled by the control module to autonomously connect to the docking station on a regular schedule, such as once daily at a time convenient for the human occupants of the space, in response to a command from an operator, and/or in response to an input from a sensor indicating a need to connect to the docking station, such as an indication of a low battery, an error code from one or more modules, or any other condition wherein the system cannot operate. The control module may also autonomously instruct the drive module to disengage from the docking station when it determines that the system is fully operational for conducting the tasks in its instructions.

FIG. 16 shows a schematic diagram illustrating a network of autonomous robots as described herein comprising a central control unit (brain hub), a master bot for mapping and/or performing a task, and at least one "minion" bot with basic sensing functions and at least one task module, each bot in wireless communication with the central control unit to provide input thereto and receive instructions therefrom. In this example embodiment, the master set of mapping and task instructions may be stored in a processor in the central hub. The hub may also house the learning system and operator interface functions of the control module. The hub may itself be mobile or stationary. For example, the central hub may be carried onboard a master bot. In embodiments wherein the central hub is stationary, the hub may also include a docking station for the autonomous mobile bots for recharging their batteries and/or a changing station for accessory modules. The master bot includes the full sensor array for mapping the space and defining task locations and in some embodiments the central hub. Various "minion" bots are controlled from the central hub via wireless communication to perform their assigned tasks. In embodiments, the tasks of the minion bots may be the same or different for each bot. For example, a network of minion bots may comprise a vacuum bot, a mopping bot, a plant care bot, etc. with each of their courses through the space mapped and directed by the control module just to the locations for each of their assigned tasks. The minion bots may have limited sensing and mapping capabilities. For example, they may have sensors to detect obstacles in their assigned pathways and communicate back to the central hub for collision avoidance instructions.

In some embodiments, the control module can interface with and control other drive units and accessories on minion devices in addition to slave accessories on its associated drive unit, as described in more detail with reference to FIG. 11. Additionally, the control module may interface with and control other smart-enabled devices in its environment. For example, the control module may control smart-enabled or remote control doors, such as shed or garage doors, gates or windows to open or close them, and/or operate lifts such as elevators or stair lifts to facilitate transit of the robotic system around its environment. The control module may also interface/communicate with smart devices carrying out their tasks in a smart home environment to monitor, control, turn on/off, regulate, adjust, etc. the smart devices.

In some embodiments, the control module may physically reside in a central hub that controls a plurality of drive units and accessories through smaller communication modules associated with the individual drive units and/or accessories.

In some embodiments, communication connectivity may also comprise radio-frequency (RF) or Wi-Fi connection between an accessory and/or a sub-accessory and the control module and/or a user interface.

The robot system may also comprise at least one task module, configured to carry out a specified task when instructed by the control module. The tasks include various cleaning and or transport functions as described generally above, and more specifically below.

Figure 17:
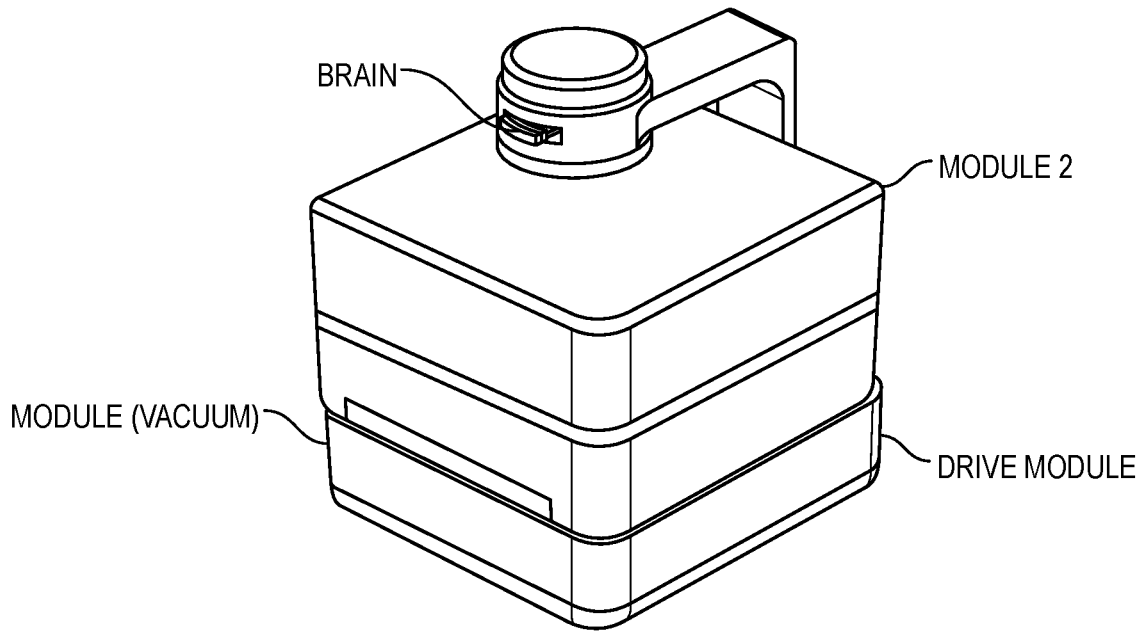
FIGS. 17 through 20 show perspective and/or exploded views of various embodiments of the configurations shown in FIG. 12.
Figure 18:
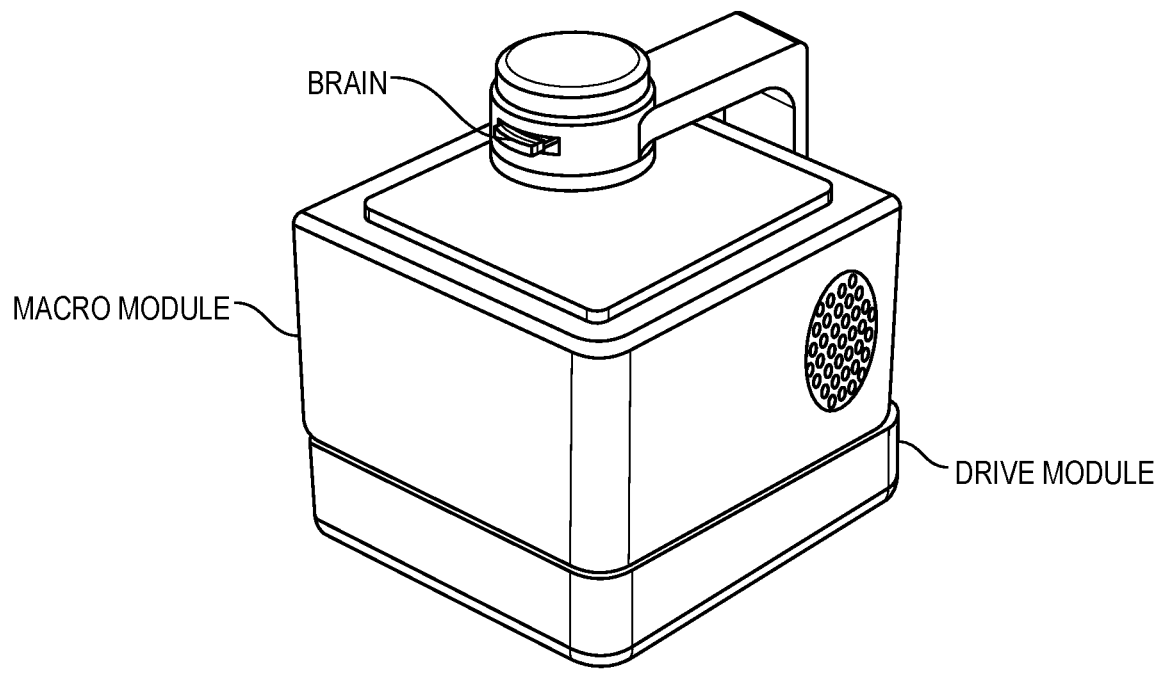
Figure 19:
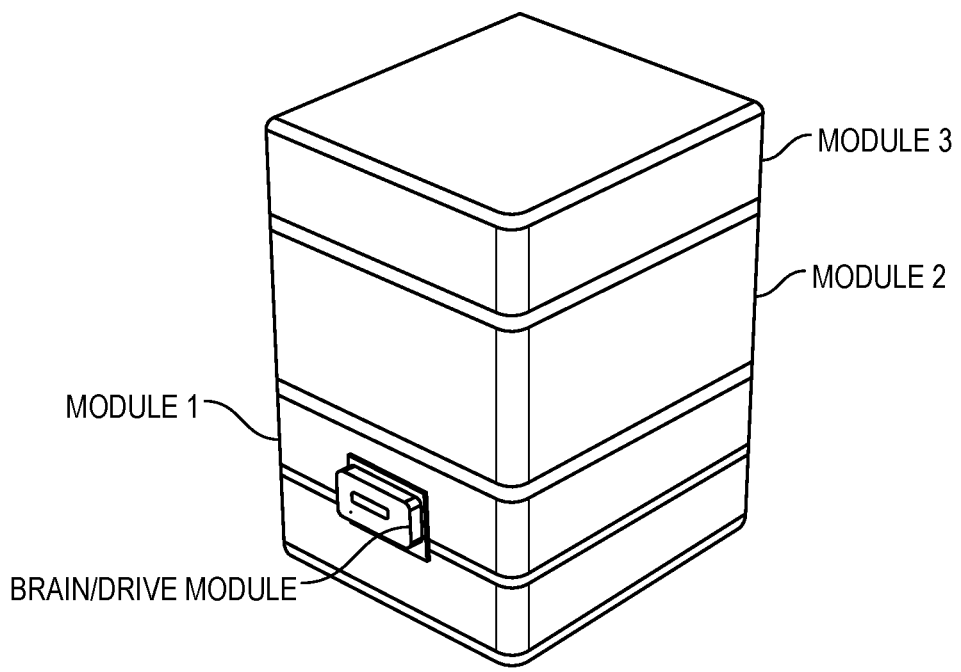
Figure 20:
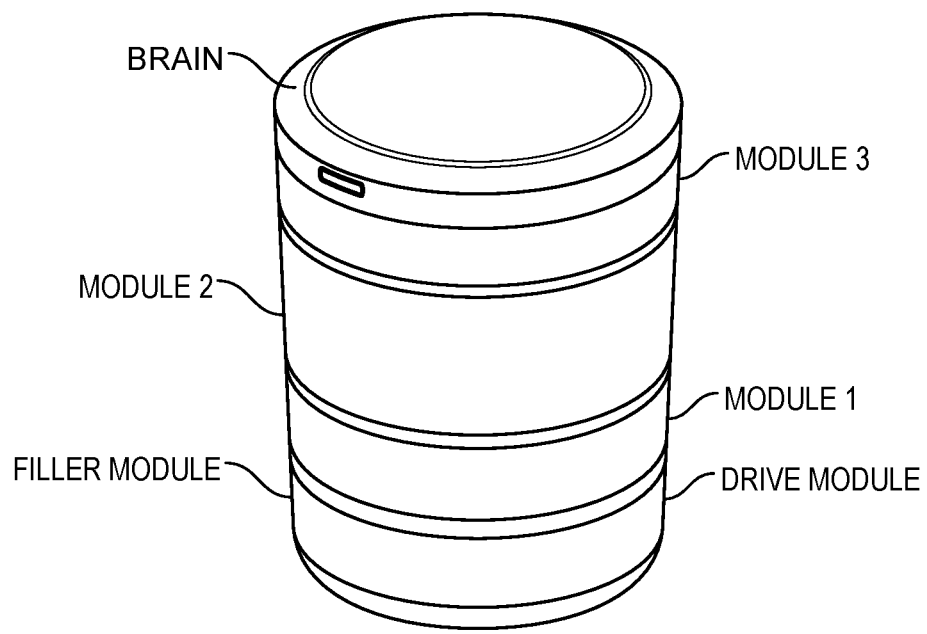

FIGS. 17 through 21 show perspective views of various example embodiments of the configurations shown in FIG. 15. FIG. 17 shows an example of a fixed height, brain on top configuration. As shown in FIG. 17, this example configuration comprises a vacuum module (module 1) that comprises a roller brush (shown in cutaway view) in a small module at the front of the drive module and a module stacked on top of the drive module that houses the vacuum system and dust collector. A second task module 2 is stacked above the vacuum module 1. The drive module also comprises a frame that provides a small platform centrally above the module stack where the control module (brain) and sensors are located. FIG. 18 shows an alternative embodiment of the fixed height, brain on top configuration, comprising a "macromodule" that comprises an air purifier. Other task modules may be used instead of the modules shown in FIGS. 17 and 18. FIG. 19 shows an example embodiment of a variable height, brain in base configuration, in which the control module and sensors are integrated into the casing of the drive module. A stack of three task modules is positioned on a platform on top of the drive module. FIG. 20 shows a variable height, brain on top configuration. In the example embodiment shown, the system has a circular rather than rectangular footprint. The drive module comprises a semicircular platform at the back of the base of the stack and a second semicircular "filler" module comprises the front of the stack. The filler module may not include any components of the robotic system, but simply comprise wheels and a platform to hold up a portion of the module stack. Alternatively, the filler module may comprise an auxiliary battery for the system for extended operation, and/or a supply or waste reservoir for one of the task modules. A stack of three task modules is positioned on top of the drive and filler modules, with a control module (brain) stacked on top of the task modules.

FIGS. 21A and 21B show perspective and exploded views of an example embodiment of a drive module with integral control module with a task module attached and removed. In this embodiment, the drive module has a void open to the floor in which a task module nests. This may be considered a configuration with a "bottom" module. Additional task modules could be stacked on top of the bottom module to provide additional functionality. The control module and sensor array are integrated into the front of the drive module. As shown in FIG. 21B, the bottom task module comprises a pair of roller brushes for sweeping dust and/or debris into the vacuum task module.

FIGS. 22 through 24A-B show perspective and/or exploded views of alternative embodiments of arrangements for attaching a task module to a drive module. In these embodiments, the drive module (base) and a task module have complementary shapes and connectors that mate the modules together into integrated units. In some of these embodiments, at least one task module is positioned at the same level as the drive module, and is towed as a trailer behind the drive module as in FIG. 22, or pushed in front of the drive module, as in FIG. 23.

Figure 24B:
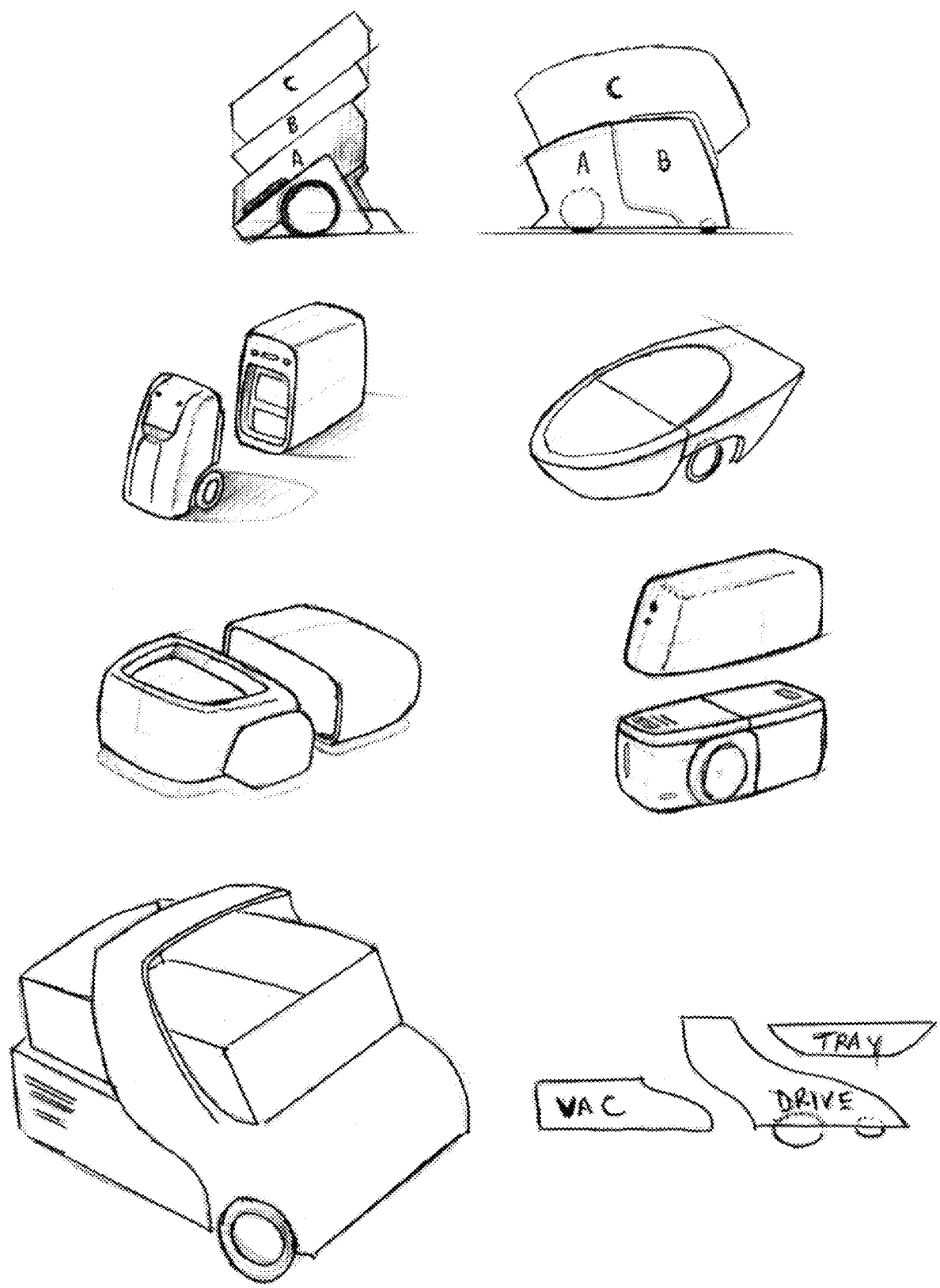
Figure 25:
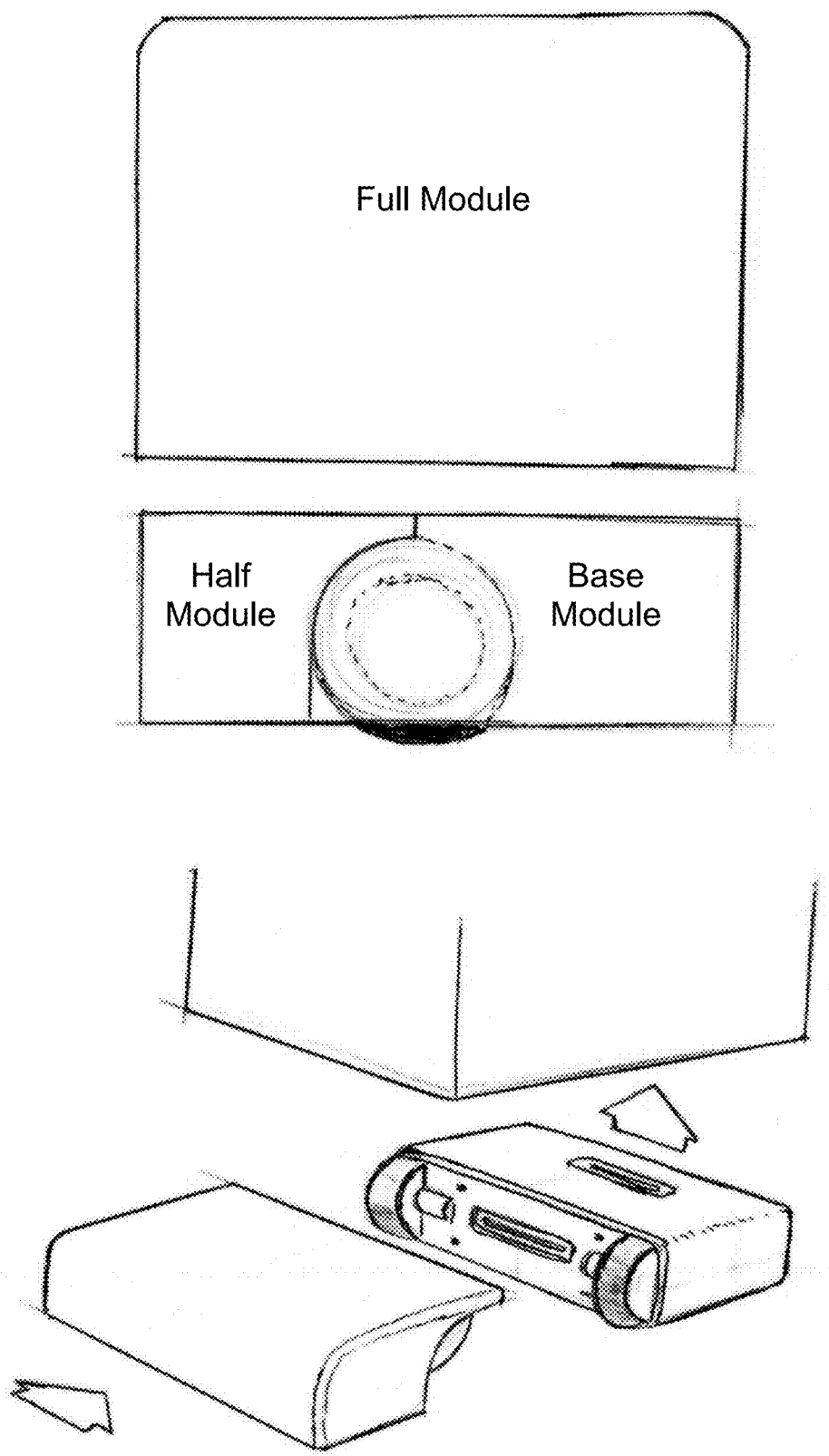
FIG. 25 show schematic views of an alternate configuration of the system comprising a drive (base) module comprising a first portion of the footprint of the system, a half module comprising the second portion of the footprint, and a full module mounted above the drive and half module.

FIGS. 24A and 24B and 25 show schematic views of an alternate configuration of the system comprising a drive (base) module comprising a first portion of the footprint of the system, a "half" module comprising the second portion of the footprint, and a full module mounted above the drive and half module. The half module may optionally comprise wheels in addition to the wheels in the drive module to help support modules stacked above the base. The half module may comprise a task module, for example, a vacuum module (as in FIG. 18) or a mopping module, an auxiliary battery for extended operation, and/or a space filler. The full module may comprise any of the task modules described below, such as a fluid reservoir, dust collector, air purifier, retriever, carrying module, counter cleaner, auxiliary vacuuming modules such as corner or crevice tools, manual hose adapter, plant care and or pet care modules.

Preferably, the base (drive) unit comprising the control module has one or more ports to attach to and communicate with various accessory modules. FIGS. 26A through 26D show conceptually in exploded view how the base unit can attach to a plurality of module accessory modules in an exemplary embodiment of the robotic device. These Figures show embodiments having a design motif in which the drive unit has a generally upright profile and the accessories are attached proximately to the lower front, upper rear and lower rear of the drive unit, referred to herein as the "floor" or "ground," "backpack" and "trailer" positions respectively. The pluralities of accessories may include (i) backpack accessory (ii) trailer (tug) accessory (iii) floor or ground accessory. As used herein, the term "floor" refers generally to modules at the lowest part of the robotic system that operate in indoor environments and the term "ground" refers generally to modules at the lowest part of the robotic system that operate in outdoor environments. However, one can appreciate that the distinction is merely arbitrary and the terms "floor" and "ground" are used interchangeably herein to refer to where accessories, modules, connectors and/or ports are positioned relative to the base unit of the robotic system, as discussed further below. By attaching a plurality of accessory modules to the base unit, the robotic system can perform multiple tasks. For example, the base unit may have a floor port, one or more backpack ports, and a trailer port for the attachment of accessories to the base unit.

This design is only one of a number of design possibilities and is not limiting as to the function of the device. FIG. 26C shows a single backpack port that engages the connector on a single backpack accessory. In some embodiments, more than one backpack port may be included on the base unit to allow more than one backpack accessory. For example, the base unit may have two backpack ports oriented side by side to allow two half-backpack accessories to be connected to the upper left rear and upper right rear of the base unit. For example, other designs for the drive module may have a more horizontal profile. In such embodiments, the "backpack" position may be more generally positioned at the top of the drive unit, as shown schematically in FIGS. 19 and 20. The base unit and backpack ports may be configured to connect to two (or more) backpack units stacked vertically at the top and/or rear of the base unit, such as shown schematically in FIGS. 19 and 20. In another alternative, a backpack unit may engage a single backpack port and provide pass-through connectivity from the backpack port to another stacked backpack accessory.

In some embodiments, a floor accessory includes an accessory that is configured to perform a task at or near the floor level on which the drive unit operates on. It is removably attached to the drive unit at the lower front face of the drive unit by a floor connector, which is configured to operationally connect to the drive unit via a floor port positioned generally at a position at the lower front face of the drive unit, such as in a recess as shown in FIG. 26B. The floor accessories are individually and interchangeably attached to the drive unit via the floor port. The floor connector and the floor port comprise complementary components that provide mechanical, electrical and/or electronic connection between the floor accessory and the drive unit.

A backpack accessory includes an accessory that is configured to perform a task at a level that is generally at or above the main body of the drive unit. It is removably attached to the drive unit at the upper rear face of the drive unit by a backpack connector, shown in FIG. 26A, which is configured to operationally connect to the drive unit via a backpack port positioned generally at a position at the upper rear face of the drive unit. The backpack connector and the backpack port comprise complementary components that provide mechanical, electrical and/or electronic connection between the backpack accessory and the drive unit.

The trailer accessory includes an accessory that is configured to perform a task at a position that is generally behind the main body of the drive unit. The trailer accessory is typically a device with wheels that can roll behind the drive unit. It is removably attached to the drive unit at the lower rear face of the drive unit by a trailer connector, which is configured to operationally connect to the drive unit via a trailer hitch or trailer port positioned generally at a position at the lower rear face of the drive unit, as shown in FIG. 26C in a closed position and in FIG. 26D in an open or operational position. The trailer connector and the trailer hitch comprise complementary components that provide mechanical, electrical and/or electronic connection between the trailer accessory and the drive unit.

The port/connector(s) comprise fasteners to mechanically/physically attach the other modules to the drive unit, electric (power) connectors, electronic connectors, communication connectors and the like. The accessory modules are typically attached to the drive unit in a fixed but releasable configuration by one or more fastening devices, including prongs, pins, clips, clamps, clasps, screws, flanges, cam locks and the like that engage a complementary portion on the other module such as a projection into a recess, a flange into a slot or groove, tongue and groove, etc. The fastening device may attach the accessory to the base unit by a friction fit, magnetic fit, vacuum fit, spring fit, etc. They may be engaged/disengaged manually by a user, by actuators linked to one or more fastener components controlled either by a user or autonomously by the control module, or in some embodiments, autonomously by the control module steering the drive unit into a fastening orientation to the accessory. Such mechanical fastening devices are known in the art and specific fastening mechanisms may be selected depending on design criteria for the system.

The port/connectors also provide electronic, electrical (AC or DC power), and communication connectivity between modules, such as between an accessory module and the control module and/or drive unit. These connectors are generally electro-mechanical devices used to join electrical terminations and create an electrical circuit. Typically, electrical connectors consist of plugs (male-ended) and jacks (female-ended), or they may be hermaphrodite. Connectors include keyed, pin and socket, and hybrid types. The connectors may be based on industry standard connectors such as 8D8C connectors, D-subminiature connectors, including A, B, mini-A, mini-B, micro-A, and/or micro-B USB connectors, Lightning connectors, etc. In some embodiments, the jack portion of the connector is located at the port on the base unit and the plug portion is located on the accessory module. In some embodiments, the power component of the port/connector is electrically connected to electrical components, such as batteries, physically located in the drive unit, while other electronic connections such as communication and sensor components connect the accessory to the control module.

Because the floor, backpack and trailer accessories are configured to perform different tasks at different locations relative to the central drive unit, one can appreciate that each of the connector/port combinations may be different for the floor, backpack and trailer accessories. However, to allow for interchangeability, each floor connector/port combination is configured identically for all floor and ground accessories in the robotic system. Likewise, each backpack connector/port combination is configured identically for all backpack accessories and each trailer connector/port or hitch combination is configured identically for all trailer accessories.

FIGS. 13 and 14 describe a plurality of module accessories. The plurality of accessories include various (i) backpack accessories (ii) trailer accessories and (iii) floor accessories as shown in the Figures. The accessories comprise components necessary to complete their assigned tasks, including components such as mechanical devices, motors, actuators, sensors, reservoirs for cleaning supplies, collectors for waste, and the like. The accessory may comprise its own power supply, and/or it may obtain power from a power supply on the base unit.

FIGS. 13 and 14 describe a plurality of floor and ground accessories attached to a floor port. In example embodiments, the floor or ground accessories may include mower, vacuum, tethered vacuum, floor mopper, scrubber, grout cleaner, blower, and other accessories. The ground accessories are individually and interchangeably attached to the drive unit via a ground port, shown in FIG. 26C, in a recess in the lower front of the drive unit.

The ground or floor accessory is attached to the drive unit using one or more releasable mechanical attachment mechanisms or fasteners. Since the ground accessory is configured to be pushed by the drive unit in the forward direction and pulled by the drive unit in reverse, the ground attachment is typically attached to the drive unit in a fixed but releasable configuration by one or more complementary fastening devices, such as a projection into a recess, a flange into a slot or groove, and the like. As shown in FIGS. 26A and 26B, the ground or floor accessory may fit into a recess at the lower front of the base/drive unit. Fastening elements include tongues on the sides of the ground accessory that mate with complementary grooves on the base/drive unit. Shown in the back of the recess is a floor port, which engages the floor connector (not shown) when the floor accessory is inserted into the recess. Because the floor accessory is configured to be in the proximity of the ground, in some embodiments the floor accessory comprises its own wheels to support it and facilitate movement across the ground. The wheels may be free-wheeling, or they may be driven to provide motive force to the robotic system.

Alternatively, or additively, the ground accessory may fit into a recess disposed below at least a portion of the chassis of the drive unit, such as centrally disposed between the wheels of the drive unit in an opening in the bottom of the drive unit, in a bottom connection, such as shown in FIGS. 21A and 21B. Another embodiment of a robot device comprising a bottom connection configuration is shown in perspective and plan views in FIG. 27, in which the recess is open to both the front and bottom of the drive unit. The drive unit is generally U-shaped, with the wheels set in housing in the arms of the U, and the drive motor in the base of the U. An upper plan view of the drive unit and a lower plan view of the bottom accessory module show complementary bottom connection portions. A bottom accessory module may have a ground port in its front to allow connection of a ground accessory as described above. A bottom accessory may also comprise a top port to allow a module to be stacked above it, as discussed further with regard to FIGS. 15, 17, 19 and 20.

As can be appreciated, in some embodiments described herein, accessories connected to different parts of the base unit may act together to conduct operations that are more complex than can be carried out by a single accessory. For example, a combination of a ground or bottom sweeper accessory and a vacuum backpack accessory can be contemplated. Some of these embodiments can be configured as cooperative embodiments in which, for example, an area blower is configured as a backpack accessory in coordination with a ground vacuum accessory.

In addition to being operatively interconnected via the base unit and control module, some cooperative embodiments may have a physical connectivity as well. For example, a vacuum ground accessory may be operatively connected with a backpack vacuum accessory to share components such as a vacuum source and dust collector, or a ground vacuum accessory may be combined with an air blower. Since vacuuming features may comprise some of the commonly used accessories, the base unit may be designed with a built-in passage, for example an air/fluid conduit, to accommodate such component sharing.

As discussed above, the robotic system comprises at least one sensor. For example, sensor(s) may be used for location and navigation of the drive unit.

The system also comprises various sensors for detecting conditions other than location. Sensors may be disposed on any of the modules, such as the drive unit, or accessory modules, and are operatively connected to the control module. The base unit for yard maintenance may comprise a rain sensor for halting or suspending operations if rain is too heavy for the task. Tilt, lift and other orientation sensors may signal the control module to lock out operation of, for example the mower module, if it is in an unsafe orientation. For loss or theft prevention features, the robot may include PIN identification to link it to a specific base station or location and disable the robot if it is removed beyond a specified distance from the base station. GPS may also be used similarly. If a robot is removed from its operating range by malfunction, theft, etc., the control module may activate a GPS application to allow tracking of the device. Other sensors may be associated with specific tasks to provide input to the control module to facilitate carrying out the tasks.

The task module may embody various cleaning functions including vacuuming, and mopping, waxing, buffing, wiping, dusting and the like. Vacuuming is a common household chore that is suitably done by a robotic system as described herein. As shown in FIGS. 17, 21B, 29 and 31, for example, the task module may comprise a vacuum module. The vacuum module generally comprises a mechanism for generating a vacuum such as a vacuum pump, Venturi, cyclone and the like, a reservoir for collecting dust and debris collected by the vacuum and power source for operating the vacuum. The vacuum may be suitable to pick up under dry or wet conditions. The vacuum module may further comprise brushes that can direct dust and/or debris toward the vacuum orifice. Such brushes may include roller brushes or rotary brushes. The reservoir may be contained in the vacuum module itself or in an auxiliary reservoir module allowing for greater capacity for collection.

A vacuum module comprises a vacuum motor used to create suction (negative pressure) that picks up particles such as dust, debris, etc. from a surface. The vacuumed material is separated from the air flow through the vacuum such as by filters, including HEPA filters and/or cyclonic separation and collected in a receptacle. There is also an exhaust of the vacuum motor (positive pressure) that is normally diffused and vented at low velocity into the area surrounding the vacuum. The vacuum cleaner vacuums hard floors, carpeted floors, hardscapes, and under/around furniture, including lawn or patio furniture, and cleans spots. The vacuum module may further comprise brushes, etc. to facilitate directing the particles into the suction zone of the vacuum module. The brushes may be passive, static brushes or they may be powered to provide motion to facilitate particle pickup. Powered brushes include brushes that rotate about a y-axis perpendicular to the direction of travel of the robotic device and parallel to the plane of the floor or ground (shown in FIGS. 17 and 21B) and/or brushes that rotate about a z-axis perpendicular to the plane of the floor or ground (shown in FIG. 29). The vacuum may collect dry particles and in some embodiments may also collect fluids (a wet/dry vacuum). To vacuum carpeted floor, the vacuum module may comprise air-powered or electrically powered "beater" mechanisms to dislodge particles from the carpet fibers.

The vacuum module may connect to the base module in a ground and/or bottom connection. Alternatively, the vacuum module may be connected in a backpack connection wherein the vacuum intake is disposed near ground level at the front of the robot, or at the back of the robot, and is in operational connection to the vacuum motor, filters and debris collector disposed in the backpack position of the robot. In some instances, the vacuum module may be connected to the base unit at both ground and backpack connections.

The vacuum cleaner module may comprise a tethered vacuum. In a tethered vacuum for instance, a slave or minion robot may be tethered to a master robot such that upon movement of the master robot, the slave robot can move along and follow the master robot. For example, a vacuum mini-bot (e.g., a small sized robot) may operate from a floor vacuum accessory to clean areas that may be inaccessible to the full robotic device, such as under or around furniture. The mini-bot may comprise a portion of the floor vacuum accessory that, in attached mode, operates cooperatively with a fixed portion of the floor vacuum accessory to vacuum the floor when the base unit travels along its path through the environment. Alternatively, when circumstances warrant, the mini-bot partially detaches or fully detaches from the main floor vacuum accessory to vacuum difficult-to-access areas while remaining in communication with the control module. For instance, a tethered vacuum mini-bot may be deployed from a front ground accessory and the main vacuum may be connected to the base unit in a bottom or backpack connection with a vacuum intake disposed near ground level. The vacuum mini-bot may be operated in "tethered" mode at the end of a retractable tether or umbilicus comprising power and communication connectivity to the base unit/control module. Alternatively, another embodiment of a mini-bot may operate fully detached from the floor vacuum accessory and be remotely controlled by the control module to vacuum the floor or hardscape, such as in difficult-to-access areas.

Because the mini-bots are small in size, they are limited in terms of travel endurance, carrying capacity and the like and are not intended to operate detached from the parent accessory and/or base unit for extended periods and are transported to and from their operating area by the base unit. The control module can communicate with the mini-bot to instruct it to return to the parent when needed. For example, a vacuum mini-bot may return to the parent vacuum accessory to empty its duct collector by reconnecting to the main dust collector in the vacuum accessory, and recharge its battery from the main battery in the base unit via its parent connector. In embodiments, the range of the mini-bot from the control module can be defined by the range of its RF (radio frequency) or Wi-Fi connection, so that the mini-bot can be autonomously recalled by the control module when it approaches the boundary of its operational range.

Similarly, task modules may include mopping, sweeping, scrubbing, polishing, waxing, buffing and dusting modules. Mopping modules may be similar to vacuum modules with the added features of a reservoir for holding fresh cleaning fluid such as water or detergent solution, and a reservoir for collecting soiled cleaning fluid after scrubbing or mopping. The floor mopper is attached to the floor port and cleans the floor surface. It cleans tile floors, wood floors, spots, by dry wiping and/or wet wiping with a cloth such as a microfiber cloth. A mopping module may comprise an absorbent surface such as a sponge or a pad or absorbent microfiber cloth, such as a chamois cloth, shammy cloth or Swiffer® cleaning cloth to collect liquid and small particles, including hair. The absorbent surface may be passively fixed in the mopping module or it may be powered to move in a back-and-forth, circular, elliptical or other pattern of motion, optionally with variable pressure. Mopping modules may comprise absorbent pads that can be stripped of fluid by application of pressure on the pad during operation. The mopping module may further be configured to dispense a cleaning solution on the floor as it mops.

A floor polisher module may be similar to a mopping module, except it is configured to dispense and spread a fluid such as floor polish onto the floor. Waxing modules are similar but do not require collecting the fluid (wax) after application. Buffing and dusting modules operate using dry pads or wipes. A combination mopper/polisher/waxer module may be contemplated.

A sweeper module sweeps floors hardscapes, and under/around furniture, including lawn or patio furniture, and cleans spots. The sweeper module comprises brushes, etc. to direct particles into a collector on the module. The brushes may be attached to an axle connecting traveler wheels on the sweeper module and rotate as the robot moves, or they may be powered to facilitate particle pickup. Powered brushes include brushes that rotate about a y-axis (perpendicular to the direction of travel of the robotic device and parallel to the plane of the ground and/or brushes that rotate about a z-axis (perpendicular to the plane of the ground).

The sweeper module may connect to the base unit in a ground and/or bottom connection. In some instances, the sweeper is connected to the front of the robot in a ground connection. The sweeper may also be connected to the base unit in a bottom connection. In other instances, the sweeper module may comprise a sweeper implement connected to the base unit at a ground connection at the front of the base unit, and be in operative communication with a debris receptacle connected in a bottom connection.

Another floor accessory comprises a brushed scrubber to clean uneven floor surfaces such as tile or stone floors. Scrubbing modules may comprise powered rotary and/or roller brushes. A problem with floor cleanliness on tile and stone floors is the dirt and grime that builds up in the grout lines between tiles, or other crevices that may typically lie several millimeters below the top floor surface. An embodiment of a robotic cleaner is for an autonomous robot to clean these grout lines with a brush-like abrasive attachment. The robot uses one or more of its onboard sensors (e.g. reflectance, and camera/imaging) to follow a grout line on the floor. The attachment tracks along the grout line and cleans it using frictional/abrasive motion. The attachment applies a force normal to the plane of the floor sufficient to cause cleaning through friction. The brush itself could also exhibit its own independent pattern of motion. Examples of the pattern of motion could be but are not limited to: 1) Only the linear motion imparted by the movement of the robot; 2) A vibrating x-y motion in the plane of the floor; 3) A rotational motion about the z-axis normal to the plane of the floor. The brush could take on various other geometries, including but not limited to a vertical disk with rotation in the direction of the grout line. A plurality of brushes that rotate about several z-axes normal to the plane of the floor can also be used as a more general floor scrubber that does not need to follow a specific grout line. The robot may have the ability to dispense a cleaning solution to facilitate the frictional cleaning. The robot may also have the ability to reclaim the cleaning solution from the floor.

A floor buffer may be similar, except instead of brushes for scrubbing, the buffer comprises soft pads.

A combination scrubber/buffer module may be contemplated, which comprises interchangeable brushes and buffer pads, or in which buffer pads are mounted on the brushes to contact the floor surface for buffing.

Because the mopper and scrubber accessory may comprise a means for collecting fluids from the floor, a combination floor accessory may provide components for general vacuuming and mopping or scrubbing, thereby reducing the number of separate modules needed for general floor cleaning operations.

Since mopping and scrubbing usually involve applying a cleaning fluid such as water, soap solutions, and the like to the surface to be scrubbed, the mopper and/or scrubber module may be operated in conjunction with a backpack module for dispensing fresh cleaning solution at the front of the robot and collecting soiled cleaning solution at the rear of the robot. The backpack accessory in this instance may comprise a vacuum module that can also operate as a dry vacuum. In effect, a powered sweeper module in combination with a fluid dispensing/collecting backpack module may comprise a scrubbing accessory. A powered sweeper module without a fluid dispensing/collecting module may indicate to the control module that the robot should be operated as a sweeper. A fluid dispensing module without fluid, for instance determined by an onboard fluid sensor, may indicate to the control module that the robot should be operated as a dry vacuum. Only the combination of connected sweeper and fluid dispensing modules may indicate to the control module to operate the robot as a scrubber.

Rather than simply venting the air from a vacuum module as exhaust, a variety of useful tasks can be performed by repurposing the vacuum motor exhaust as a blower. One instantiation comprises an air-jet duster. A flexible tube, for example made of plastic or rubber, is connected to the exhaust from the vacuum motor. The tube may have a single air jet at the distal end of the flexible tube, or a plurality of holes along its length. When the vacuum motor is turned on, the tube inflates and the air is exhausted through the hole(s) as high-speed jets (air jets) at one or more heights. The position of the holes (air jets) could be customized at different heights by the user or homeowner for optimal cleaning of the localized environment. The air jets can then be used in a variety of cleaning tasks, including but not limited to blowing dust off surfaces and objects including but not limited to furniture, counters, shelves and window blinds. The distal air jet may be directed toward objects by an articulated arm as part of the device controlled by the control module, or the plurality of holes may provide generally undirected air currents that can blow the dust off surfaces where it can fall into the path of a collection device. If the air-jet duster is connected to a mobile robot as described herein, for example as a backpack accessory, it could navigate around and clean multiple areas of the home.

The air-jet duster could be combined with a means to collect the dust that is blown off the surfaces or objects. These means could be, but are not limited to: 1) Using the suction side of the vacuum motor to pick up the dust from the floor once it settles; 2) Using an electrostatic attractor to collect dust while still in the air; 3) Using a filter-based air purifier to collect and capture the dust as it settles.

In an alternative or additive instantiation, the vacuum exhaust or a portion thereof can be used to direct dust and dirt into an area for easy vacuum pickup. The exhaust of the vacuum motor is focused into high-speed air jets substantially in the plane of the floor that are used to direct dust and dirt. This concept could be instantiated to direct dust and dirt from the outer extremities of the robotic vacuum cleaner into the center where they can be more easily and reliably picked up by the main vacuum assembly as it travels along a pathway. For example, this instantiation could be used to blow debris from along baseboards or under toekick spaces into the path of the main vacuum accessory. In some embodiments, the speed and angle of the air-jets can be controlled dynamically by the control module based on input from sensor feedback to adapt to varying environments and cleanliness levels.

In an alternative or additive instantiation, the exhaust or a portion thereof can be used to direct dust and dirt from difficult-to-access areas. There are many areas in a home that get dirty but are difficult for a robotic vacuum to access, for example under tables and chairs. Vacuum exhaust is directed into air jets as described in previous instantiations but in this embodiment the exhaust is configured to provide a general area blower as a means to clear dirt, dust and debris from areas where a robotic vacuum can't access. Once removed from the inaccessible area, the debris can be picked up normally using the robotic vacuum. The blower embodiment may be configured to blow air in a single direction relative to the robotic device, in which case the entire robot device maneuvers to direct the air in a desired direction. In alternative embodiments, the blower may be configured on a swivel or turret to direct the air in various angles relative to the orientation of the robotic device. In some embodiments, the robotic vacuum could systematically (or adaptively based on sensor inputs) blow from different angles or locations in order to best aggregate the debris for later collection.

As can be appreciated, in some embodiments, accessories attached to different parts of the base unit may act together to conduct operations that are more complex than can be carried out by a single accessory. For example, a combination of a floor vacuum accessory and a specialized cleaning backpack accessory for cleaning a surface above the floor can be contemplated. Some of these embodiments can be configured as cooperative embodiments in which for example, the air jet duster or area blower is configured as a backpack accessory in coordination with a floor vacuum accessory.

Other specialized cleaning modules are described below. In some embodiments shown in FIG. 13, the backpack accessories include detail cleaning functions such as cleaning baseboards and corners, and other backpack accessories.

Figure 28:
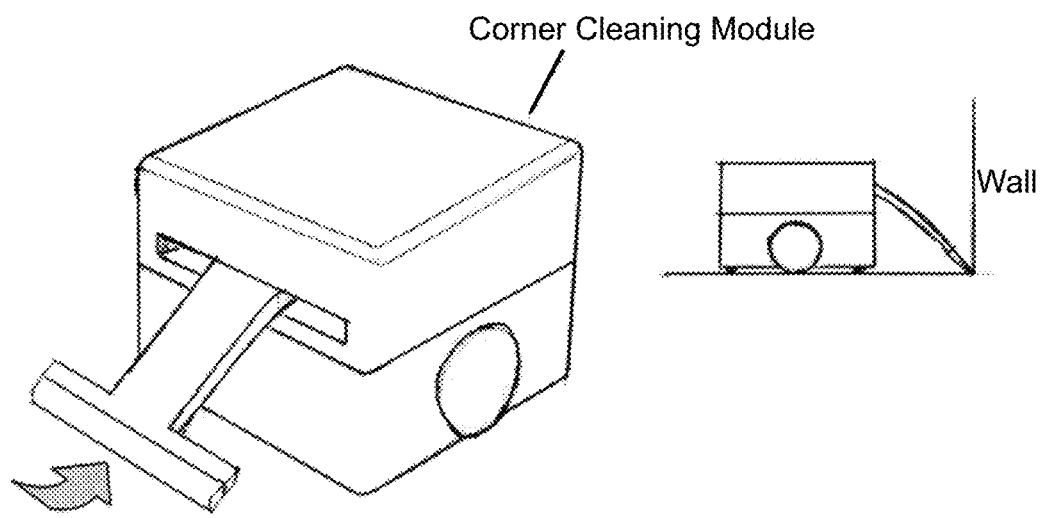
FIG. 28 shows an embodiment of a task module for cleaning corners and baseboards between floors and walls comprising a horizontally extendable arm.

A detail cleaning module accessory may be a vacuum module that cleans the corner between the floor and the wall and/or baseboards. It may comprise an articulated arm that directs a small vacuum nozzle or brush from the backpack to the baseboard or corner as the base unit travels close to the wall. FIG. 28 shows an example embodiment of a task module for cleaning corners and baseboards between floors and walls comprising a horizontally extendable arm for extending a cleaning tool such as a vacuum and/or cleaning wipe to contact the corner, wherein the arm can also move vertically to contact the vertical surface of the wall or baseboard. The example embodiment may also be configured to comprise a narrow crevice tool for reaching small spaces.

Figure 29:
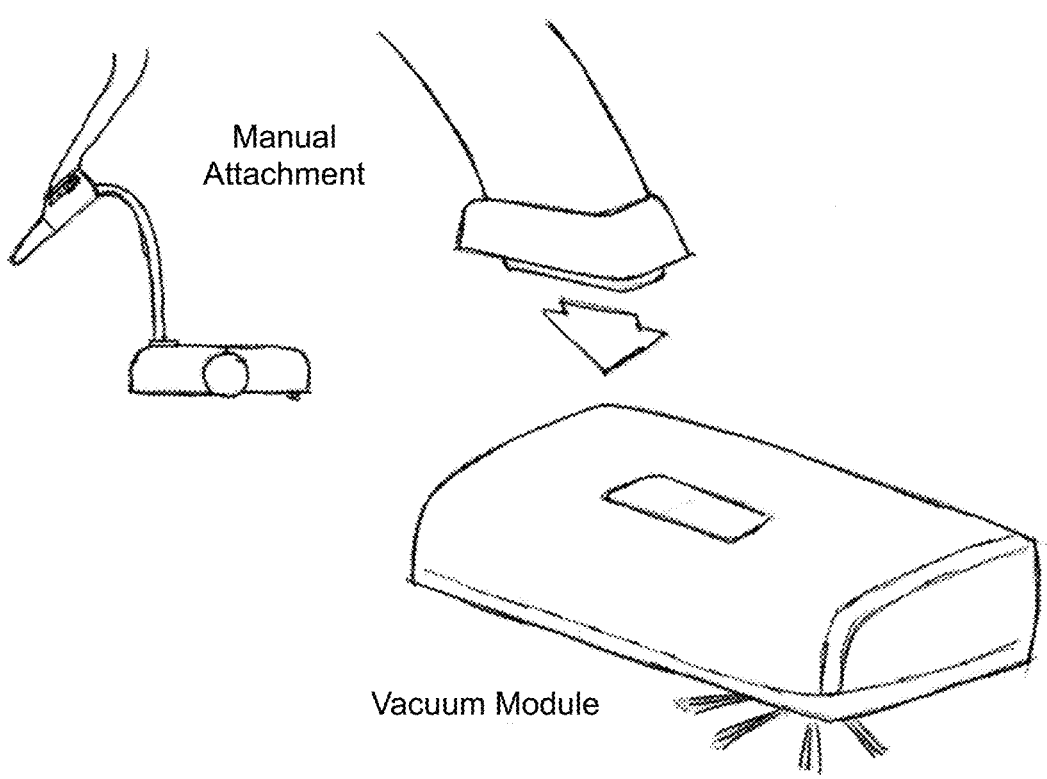
FIG. 29 shows an embodiment of a task module comprising a vacuum module configured for attaching a hose attachment.

FIG. 29 shows an example embodiment of a task module comprising a vacuum module configured for attaching a hose attachment for a human to manually vacuum a surface not accessible by the robot vacuum module. The hose attachment may be housed onboard the robot system in the vacuum module or in an auxiliary carrier module. Special tools for vacuuming may also be stored onboard. Also shown in this Figure is a rotary brush at the front of the module for sweeping dust and debris into the path of the module.

Another detail cleaning module accessory may be equipped with an absorbent cloth, such as a microfiber cloth, chamois cloth, shammy cloth or Swiffer® cleaning cloth. It may comprise an articulated arm that can extend from the backpack accessory to reach areas including wall surfaces, counters, tables, and other furniture.

Figure 30A:
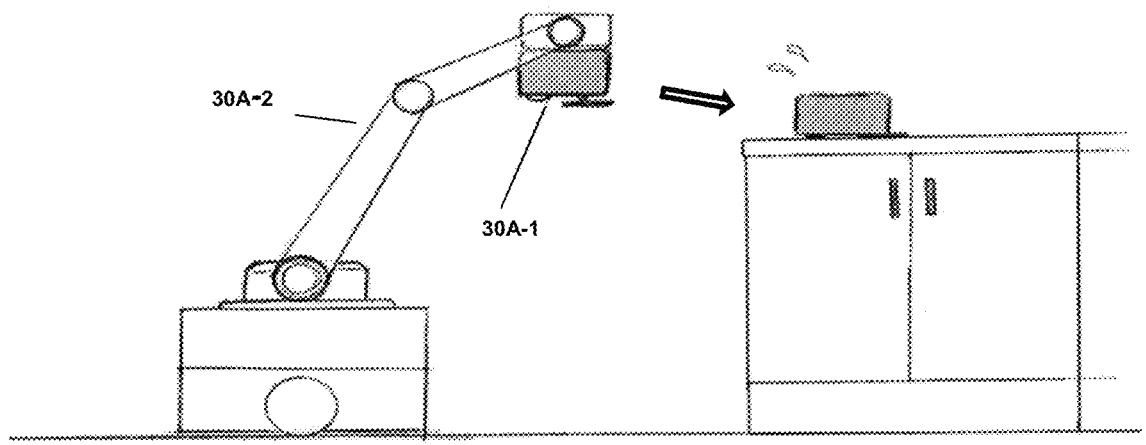
FIGS. 30A, 30B and 30C show embodiments of a task module for cleaning counter tops.
Figures 30B, 30C:
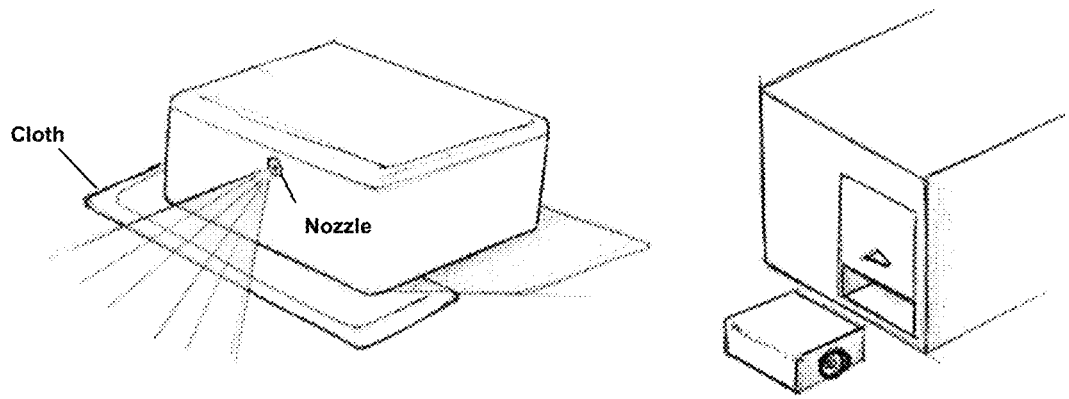

Sub-accessory cleaning bots may operate in detached mode from backpack accessories. For example, a counter-cleaning bot may be placed on an elevated surface from a backpack accessory and operate detached to clean the counter surface. Placement on the elevated surface could be achieved using an articulated arm. FIGS. 30A-C show an embodiment of a task module for cleaning counter tops comprising an articulated arm 30A-2 for removing a counter-cleaning minibot 30A-1 from its onboard compartment and placing it on a countertop for cleaning (FIG. 30A). The minibot 30A-1 (FIG. 30B) desirably may comprise sensors and/or software code or instructions to navigate on the surface of the counter, which may be controlled by the control module via wireless communication. The minibot in this embodiment comprises a reservoir and nozzle for spraying a cleaning fluid on the counter surface and an absorbent wipe or cloth for picking up the fluid after spraying the counter surface. Other variants include a vacuum minibot, or minibot that operates a dry wipe such as a microfiber wipe. The task module can recover and replace the minibot in its compartment (FIG. 30C) after it has cleaned the surface. The task module may further comprise a mechanism to remove and replace the wipe after it has cleaned a surface. In a variant not shown, the counter-cleaning module may comprise an articulated arm that wipes the counter itself rather than using a minibot. Alternatively, the mini-bot could be raised by the backpack accessory using a platform on a lift and the mini-bot could drive itself from the platform onto the elevated surface. The lift could be a scissors lift, a telescoping lift or an inflatable bladder.

Figure 31:
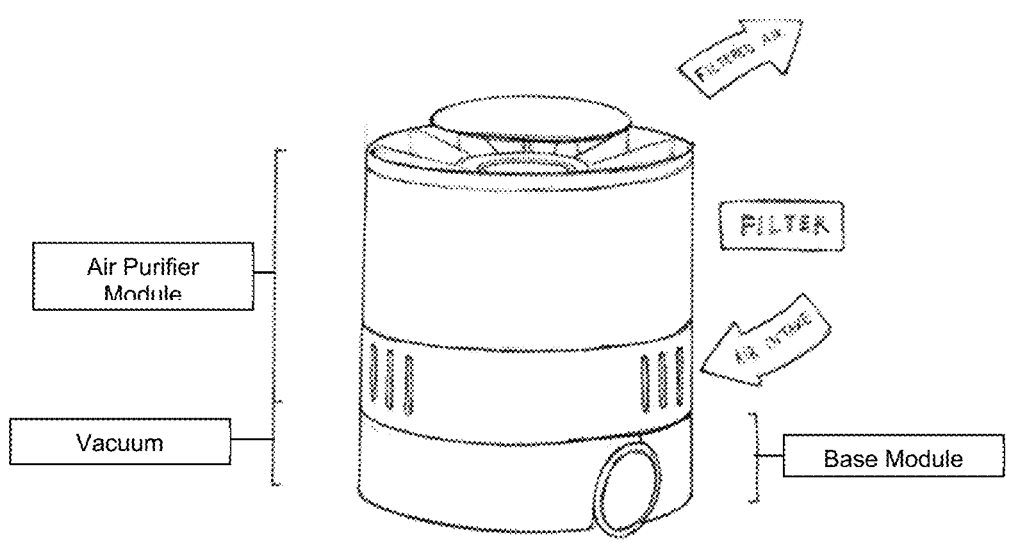
FIG. 31 shows an embodiment comprising a task module for an air purifier.

FIG. 31 shows an example embodiment comprising a task module for purifying air comprising an air intake, a filter and an exhaust for expelling filtered air back into the environment. The module may additionally or alternatively be configured to humidify or dehumidify the air by providing reservoirs for supplying or collecting water, respectively. In the example embodiment illustrated in FIG. 31, the base may also include a half module comprising a vacuum module in addition to the drive module.

Because the robotic system is modular, the homeowner or user can choose the modules to best suit his needs, and the system is expandable to add additional modules. In one of the example embodiments for indoor cleaning tasks, the modules comprise floor mopper, vacuum cleaner, and base.

In an example embodiment, the floor mopper is attached to the floor port and cleans the surface in a pattern by first applying liquid and then scrubbing the surface with variable pressure in a pattern. The floor mopper cleans tile floors, hard-wood floors, spots, wet wiping and dry wiping with a cloth such as a microfiber cloth.

In another example embodiment, the vacuum cleaner is attached to a floor port. The vacuum cleaner may be a simple vacuum or it may comprise a tethered vacuum. The vacuum cleaner is used for cleaning floor surface in pattern, tethered navigation and escape tight spots. The vacuum cleaner vacuums hard floors, carpet floors, and can vacuum under furniture and cleans spots.

In another example embodiment, the device is used for floor scrubbing and brushing, spot cleaning, detection of surface quality and gloss. General cleaning includes tasks such as cleaning baseboards, mopping floor, cleaning a grout-floor, air purification and freshening, cleaning blinds, dusting surfaces etc. Bathroom tasks include tasks such as cleaning one or more of bathroom floor, bathtub/shower, toilet, bathroom drains, grout between tiles on the wall, cleaning sinks, etc. These cleaning tasks may be carried out by the robotic system described herein, wherein various accessory modules are interchangeably connected to a base unit.

In an embodiment, a complete floor care combo mops floors, scrubs floors, sweeps floors, vacuums floors, cleans a grouted tile floor, vacuums under furniture and between tight spaces, cleans bathroom rugs, cleans up spills, cleans kitchen floor, and/or cleans a bathroom floor. The floor cleaning combo may be combined with a backpack combo for cleaning surfaces above the floor such as cleaning baseboards, corners, counters, blinds, etc. for a modular robotic cleaning system.

Figure 32:
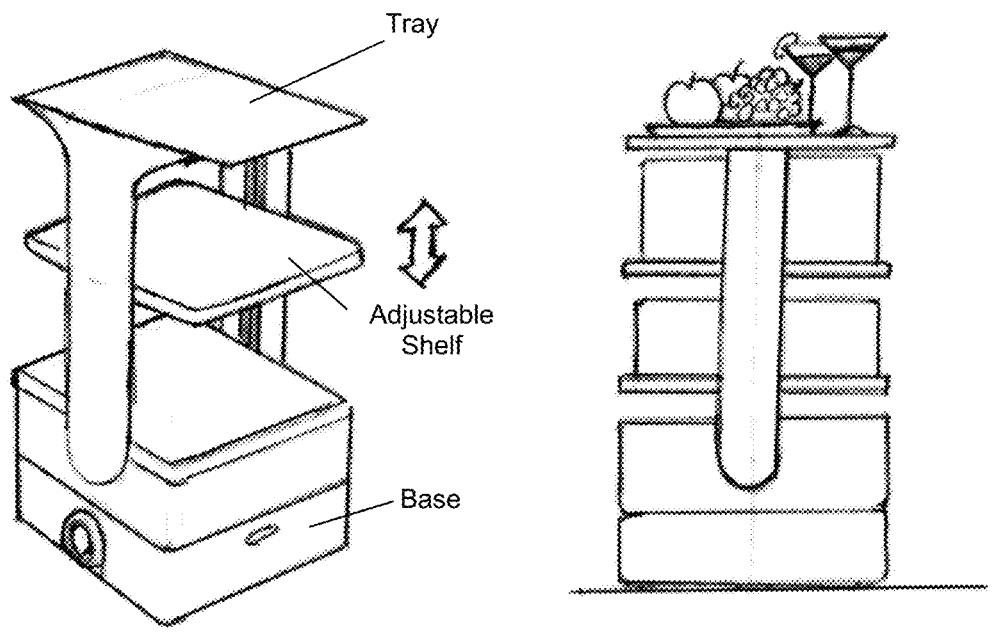
FIG. 32 shows views illustrating a carrying module as one embodiment of a task module.
Figure 32:
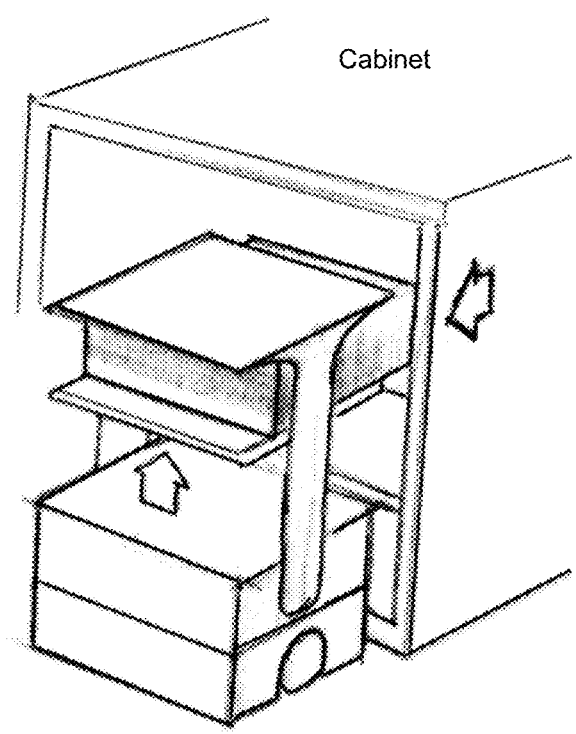

FIG. 32 shows views illustrating a carrying task module according to example embodiments. It comprises a fixed upper shelf or tray and a moveable shelf or tray configured to translate an object vertically and horizontally such as on or off another shelf or counter. The carrying module may be used to retrieve an object or objects from one location and transport the objects to another location. The movable shelf may comprise mechanisms for lowering and/or raising the object and moving it forward and/or backward to move it on or off the moveable shelf. For example, the moveable shelf may function similar to a fork lift for picking and placing the object. It may also comprise one or more sensors for identifying the object to be retrieved (such as a bar code reader or camera) which may be connected to pattern recognition software in the task module or the control module, and to determine whether there is a clear area in which to deliver the object. The example embodiment shown in FIG. 32 shows a domestic serving bot for delivering food and beverages in a home or restaurant. Other example embodiments may comprise a bot for retrieving and/or stocking goods in a shop or warehouse.

In some example embodiments, the fixed and/or the moveable shelf top shelf may be eliminated. In such example embodiments, the carrying module may comprise a pick and place apparatus that can engage objects and place them into an open rack system having a plurality of carrying positions. For example, these embodiments may be useful for delivering meal trays from a preparation area, such as a kitchen in a home or restaurant, to a serving area such as a table or counter. An alternate carrying module may comprise an articulated arm comprising a gripper for picking and placing an object on a carrying module shelf or rack.

As one of skill in the art can appreciate, the robotic system comprising a carrying task module embodiment may range from small bots capable of carrying small household items or single-meal trays to those capable of carrying cases or even pallets of goods for warehouse applications.

Other task modules may perform various food or beverage preparation tasks such as operating a blender, mixer, food processor, cooker, etc. Such task modules may also act in coordination with one or more articulating arm module(s) for placing a food or beverage item in and/or removing the item from the preparation application.

Other task modules include a plant care module comprising a reservoir for water, tubing to convey the water to a dispenser such as a nozzle on an articulating arm for dispensing water into a plant pot and/or misting the leaves of a plant, and a mechanism to generate pressure for moving the water from the reservoir through the tubing and dispenser. The control module can control the system to move the plant care module to the locations where plants are located, on a schedule, and/or it can determine whether a plant needs watering by analyzing input from one or more sensors in the plant care module that measure temperature, humidity and/or moisture.

Another task module may be a pet care module to dispense food and/or water to feeding/water stations according to a dispensing program. The pet care module may also advantageously utilize one or more auxiliary modules for storing food and/or water.

As discussed herein, a common yard maintenance task is mowing grassy areas such as lawns. Mowing grassy areas such as yards is a common yard maintenance task that must be done repeatedly during a growing season. Mowing is one of the most common yard tasks that a homeowner or user may wish to have conducted by a robot. It is a task that may be desirably conducted by a robotic device, allowing the user of the yard to have more time to enjoy the yard and/or carry out more complex maintenance tasks instead of mowing. Therefore, in some instantiations, the robotic device herein comprises a mower module, in either ground or bottom modules as described above.

The mower may be connected to the base unit in a ground connection or in some embodiments a bottom connection. In some instances, the base unit may comprise a mower module that is not removably connected to the base unit but is fixedly incorporated into the base unit, such as in a bottom connection, such as shown in FIG. 24A as image 24-1. In such instances, the user may purchase a base unit comprising an incorporated mower module and simultaneously or subsequently purchase additional accessory modules to augment the functions of the robot.

For outdoor applications in residential yards of up to about 2 acres, the drive unit is equipped with drive wheels having sufficient diameter, width, tread depth, power, etc. to traverse the outdoor terrain. For instance but not limitation, the drive unit comprises at least two drive wheels having a diameter of about 10 to 20 cm, width of about 2 to 4 cm and tread depth of at least 0.5 cm. The drive unit may comprise a four-wheel drive or an all-wheel drive transmission. Embodiments of the drive unit may comprise an electric motor having about 200 to about 1000 watts of power, depending on the size of the drive unit and accessory modules carried. Residential outdoor robots may weigh up to about 30 kg or more, such as about 8 to 25 kg. The overall dimensions of the drive unit may be about 60 to 80 cm long, 50 to 70 cm wide and about 20 to 40 cm high. The drive unit desirably is capable of driving up a slope of at least 20°, or 30°, or more.

The one or more battery in the drive unit may operate at 12 to 26 volts, such as 18, 20, 24, or 26 volts. Desirably, the one or more battery is of sufficient size to operate the robotic device for at least 50 to 100 minutes per charge. Batteries desirably provide from 4 to 10 aH, such as from 6 to 8 aH, or more.

Larger robot devices may be contemplated for operation by contractors or for maintenance of larger areas, such as grassy areas of commercial properties, common areas around apartment buildings, athletic fields, fairways of golf courses, and the like. Such instantiations desirably include features such as larger wheels, more robust chassis, wider mowing widths, more power, greater battery endurance, readily interchangeable batteries to allow for replacing discharged batteries with charged batteries to increase operational time, etc. They may also comprise other features related to controlling the device to operate in specified areas, including GPS systems for mapping and operating in areas defined by GPS coordinates, more sophisticated sensors, and the like.

A maintenance robotic system for golf courses may include multiple robotic devices to maintain their grassy areas. For instance, larger devices may be equipped with mowing modules suitable for mowing grass at fairway or rough heights. Smaller devices may be used to clip grass on putting surfaces, which require very uniform, short grass heights. Similar small devices could be used to clip grass on other surfaces, such as grass tennis courts, bowling greens, etc. Each robotic device could be programmed to mow appropriately mapped areas depending on the purpose of the areas. They may be controlled by a central hub in wireless communication with the devices.

Normally, manual grass mowing is conducted generally on a schedule several days apart, such as on a weekly time schedule. This allows the grass to grow significantly during the time between mowing. This can result in large grass clippings that may need to be collected during or after mowing, and then discarded. The robotic device can mow portions of the yard on more frequent intervals such as several times a week. This allows for less time for the grass to grow before cutting, providing smaller clippings.

Conventional robot mowers include at least one guide wire for defining the perimeter of the yard, perimeter of one or more zones within the yard, and exclusion areas such as hardscape or flower beds where the mower is not supposed to operate. A guide wire comprises a buried continuous loop wipe that encloses a perimeter and connects to a base station. The guide wire is similar to an invisible fence for pet enclosures. The wire is energized with low voltage electricity to provide a signal detectable by a sensor on the robot mower. The robot mower is configured to operate within the boundaries defined by the guide wire.

Guide wires are not without problems. They require installation below ground before the robot mower can be used. Further, the sensor on the robot may lose lock on the guide wire and become disoriented. This may be due for example, by detection of signals from other mower guide wires and/or pet enclosure wires.

As discussed above, the robot described herein may use a guide wire or other boundary indicating device as part of its mapping and localization programming, but its primary means of mapping comprises a learning program instantiated within the control module combined with user and sensory input.

The mower may desirably mow the grass in a random pattern to avoid striping. Alternatively, when a patterned look is desired, the mower may be programmed to mow in a pattern, such as stripes, cross-hatch or more complex patterns. These mowing patterns may be used on athletic fields or other areas where such patterning is desired for visual interest.

The yard may be divided into a plurality of zones. The number of zones may be determined by the size and configuration of the yard, and/or activities conducted in the yard. The robot mower may be programmed to mow each zone on a set schedule. The schedule may be determined by factors including when the zone may be used for outdoor activities, amounts of sun or shade in each zone, or proximity to the home. For instance, zones in the backyard where children and/or pets may play may be scheduled for when the zone is not expected to be occupied. Because the robot mower may operate at sound levels that may be lower than normal lawn mowers (such as at less than about 80 dB, or less than 70 dB), it may be able to schedule some zones for mowing at night. Alternatively or additively, the robot may be programmed to mow zones at timing that may also depend on weather, time of season and the like to adjust mowing intervals according to the amount of grass that may grow based on those factors. The user may also override the schedule programmed into the robot, for instance, when the user wishes to use a zone that is scheduled for mowing.

A mower module comprises a motor to drive at least one rotating blade implement that clips the ends of the grass as the device traverses a grassy area. Each rotating blade implement may comprise a plurality of blades, such as from 2 to 4, which are fixed to a central hub. Each blade comprises a sharpened profile on the forward edge in relation to the direction of rotation of the implement. The sharpened forward edge cuts the top of the grass at a desired height above the ground surface when the blade implement is rotated about a z-axis of the device. In some instances, the module may comprise 1-, 2-, 3-, or 4-blade implements. Desirably, the module comprises 2- to 4-blade implements. Multiple blade implements may provide a more uniform cut of the grass.

An alternative embodiment of a mower module comprises a blade implement comprising a rotating disk comprising a top disk and a bottom disk with a space therebetween, and plurality of blades pivotally mounted in the space near the periphery of the rotating disk. When the disk is rotated, the sharpened forward edges of the blades clip the ends of the grass. The blades are pivotally mounted so that each blade stays in a cutting orientation when passing through grass, but pivots into a non-cutting orientation inside the disk when the blade encounters objects with greater resistance to the blade's motion such as sticks, toys and the like that may be in the yard. Once the resistant object is passed by the mower module, the blades can pivot back to a cutting orientation.

The mower module also comprises a housing to protect users from contacting the rotating blade implement(s) when in operation. The housing may be shaped to facilitate holding the grass erect for clipping in the air currents generated by the rotating blade implement(s), and may also facilitate keeping the grass clippings airborne inside the housing where the rotating blade implement may further cut the clippings. The fine clippings can fall to the ground and do not need to be collected. As a result, the clippings can mulch the grass by returning moisture and/or nutrients to the grass.

Another common yard task is removing debris from hard surfaces such as driveways, walks, patios and the like. This task can be carried out with sweeper, vacuum, and/or blower modules similar to those described previously with reference to cleaning tasks.

Another backpack accessory may be an air jet or blower that uses the exhaust from the vacuum to provide an air jet or blower. Alternatively, the blower may use air from an air intake included in the blower module. If the blower is connected to a mobile robot as described herein, for example as a backpack accessory, it could navigate around and clean multiple areas of the yard.

For instance, the vacuum exhaust or a portion thereof can be used to direct dirt and debris into an area for easy vacuum pickup. Debris includes leaves, clippings, sticks, seeds, pollen, flower petals, etc. The exhaust of the vacuum motor may be focused into high-speed air jets in the plane of the ground that are used to direct dust, dirt and debris. This concept could be instantiated to direct dirt from the outer extremities of the robotic vacuum cleaner into the center where they can be more easily and reliably picked up by the main vacuum assembly as it travels along a pathway. For example, this instantiation could be used to blow debris from along edges between grass and hardscape or blow dirt and debris from difficult-to-access areas. There are many areas in a yard that get dirty but are difficult for a robotic vacuum to access, for example under patio furniture. Vacuum exhaust is directed into air jets as described in previous instantiations but in this embodiment, the exhaust is configured to provide a general area blower as a means to clear dirt, dust and debris from areas where a robotic vacuum can't access. Once removed from the inaccessible area, the debris can be picked up normally using the robotic vacuum.

The blower embodiment may be configured to blow air in a single direction relative to the robotic device, in which case the entire robot device maneuvers to direct the air in a desired direction. In alternative embodiments, the blower may be configured on a swivel or turret to direct the air in various angles relative to the orientation of the robotic device. In some embodiments, the robotic blower could systematically (or adaptively based on sensor inputs) blow from different angles or locations in order to best aggregate the debris for later collection.

When the robot is used as a blower instantiation, it may need to operate in both grassy and hardscape areas. Its pattern of motion may be mapped so that it directs debris to designated spot(s) in the yard for later pickup. Accordingly, the control module would reconfigure itself to navigate the yard differently when configured as a blower than when configured as a mower, sweeper or vacuum.

Another ground accessory comprises a brushed scrubber to clean hard ground surfaces such as concrete, blacktop (macadam), tile, paver or stone surfaces. The scrubber module used in yard maintenance tasks may be similar to the floor scrubber described above, comprising powered brushes. Because outdoor hardscapes are more durable and may be more uneven than indoor floor surfaces, a hardscape scrubber may include more robust brushes and/or mechanical components that a floor scrubber. Like a sweeper module, the scrubber module may be connected to the base unit at ground and/or bottom connections. The scrubber module may share several mechanical attributes with a sweeper module, so a combination sweeper/scrubber module may be contemplated.

Because some of the tasks involve similar mechanical and/or operational functions, combinations of accessory modules may provide components for mowing, sweeping, vacuuming and/or scrubbing, thereby reducing the number of separate modules needed for yard maintenance operations.

For instance, the sweeping/scrubbing module and the mowing mechanism may involve similar mechanical features, including a motor that rotates at least one implement about a z-axis. A combination mower/sweeper/scrubber module may be contemplated, which comprises interchangeable mower blades and sweeper and/or scrub brushes. The blades and brushes may be electronically coded, such as by RFID, so that when they are connected to the robot, the control module may determine which configuration to operate. When blades are connected, the robot is configured as a mower and operates in the grassy areas of the yard. When brushes are connected, the robot is configured as a sweeper or scrubber and operates on the hardscapes of the yard. As indicated above, a backpack module comprising fluid dispensing/collecting functions can configure the robot as a dry vacuum, wet vacuum, or scrubber depending on what other implementations are connected and/or enabled on the robot. Thus, a number of common yard maintenance tasks can be conducted with as few as two major modules and associated peripheral components.

Other yard maintenance and cleaning accessories include backpack accessories. As previously discussed, some vacuum modules may be disposed as backpack modules. The backpack accessory releasably and matingly attaches to the upper rear of the base unit by a complementary shape and engages the backpack port on the base unit with the backpack connector (shown in FIG. 26C) on the backpack accessory.

An edging module backpack accessory may comprise an articulated arm that directs a small vertically oriented blade rotating about the y-axis relative to the robot device from the backpack to cut a narrow groove between the grass and the edge of hardscape or mulch beds as the base unit travels close to the boundary of the grassy area. The rotating blade may be disposed in a housing to minimize the amount of flying debris and protect nearby people, animals or equipment from damage. This edging module may also optionally comprise the ability to be configured to orient the blade horizontally and function to cut grass that cannot be reached by the mowing footprint of the mowing module.

An alternative embodiment of an edging module may comprise a small plow-like implement that creates a small furrow between the grass and the edge of the hardscape or mulch bed as the base unit travels close to the boundary. The plow may create a furrow using only the linear motion imparted by the movement of the robot, or it may comprise a back-and-forth motion along the x-axis relative to the direction of motion to facilitate creating the furrow.

In either embodiment, the robot uses one or more of its onboard sensors (e.g., reflectance, and camera/imaging) to follow a boundary between grass and hardscape on the ground. The boundary may also be determined during mapping procedures discussed below. The attachment tracks along the boundary and creates a groove or furrow. In either embodiment, the edger may also be used to remove weeds or debris from gaps in hardscape, such as expansion gaps or spaces between pavers or stones.

A string trimmer may be another backpack accessory. This module deploys a string trimmer at the end of an articulated arm to spin a string about the z-axis. Like the edger, the string trimmer may cut grass that cannot be reached by the main mower module.

Although the edger and string trimmer may be configured as backpack accessories, in some instantiations, the edger and string trimmer may comprise a small minion robot or mini-bot that can be controlled by the main control module. In these instantiations, the minion device can trim the edges along the boundary of a grassy area while the main mower unit mows the field of the grassy area.

Larger objects such as sticks, toys, pet waste etc. may be picked up from the yard by a backpack accessory configured with a gripper attached to the distal end of an articulated arm, as shown in FIGS. 13 and 14, and moved to a different location. The object can optionally be placed in a receptacle, such as carried as a backpack accessory or in a utility cart towed behind the base unit as a trailer accessory, as discussed further herein. Alternatively, objects may be picked up with a scooper accessory and placed in a receptacle or utility cart accessory. The scooper may be deployed directly from the robot accessory as shown in FIGS. 13 and 14, or the scooper may be deployed at the distal end of an articulated arm. These pick-up functions may also be conducted by a minion robot.

Weeding is another common yard task. An edge trimmer, such as the plow edger, may also be configured as a weeder to remove unwanted vegetation from a lawn, garden or flower bed. The weed can be pulled from the ground by the plow extension of the edger module. The weed may be identified by the control module by comparison of images of representative weeds and desirable vegetation such as grass vegetables and/or flowers. The selection of a weed to be removed may be guided by exclusion/inclusion principles of image comparison where the weed identity is determined by inclusion of features of known weeds and/or exclusion of features of known desirable vegetation. In some embodiments, weeding may be conducted by a minion robot or mini-bot equipped with an edger module.

Another common yard task is hedge or shrub trimming. A hedge trimmer may comprise a trimmer head deployed at the distal end of an articulated arm or boom. The trimmer may comprise a rotating blade partially enclosed in a housing. The housing minimizes exposure of the blade to an opening where the hedge leaves and stems can enter for trimming. The housing also traps the trimmings in the housing where they are shredded into smaller pieces to facilitate their collection and avoid larger pieces that need to be collected from the ground. The articulated arm or boom may move the trimmer head in a combination of vertical, horizontal and arcuate motions to trim the face of the hedge and top of the hedge. In some instances, the arm or boom is configured to move the trimmer head from about 20 cm to about 2 meters above ground level. For small hedge trimming tasks, the housing may collect and hold the shredded trimmings for later disposal. The shredded trimmings may also be sufficiently small and uniform to function as mulch below the hedge. Alternatively, for larger hedge trimming tasks, the housing may be connected to a vacuum module by flexible tubing to be collected in the vacuum collector, either on board or in a utility cart trailer. The hedge trimmer may be deployed as a backpack accessory module or a trailer module depending on the size of the trimming tasks contemplated. A trailer hedge trimming module may comprise the trimmer head, articulated arm, vacuum module and trimming collector.

Another common yard maintenance task comprises applying fertilizer, pest or weed control agents, grass seed, or other lawn care products to provide a healthy lawn. A fertilizer module may be configured to deliver dry products such as granules or seed by dispensing the product from a hopper to a spreader apparatus such as a drop or broadcast spreader. An alternative embodiment is configured to deliver liquid products and comprises a reservoir and fluid dispensing apparatus such as one or more nozzles to dispense the liquid onto the lawn surface. A fertilizer module may be a backpack or trailer accessory depending on the size of the yard. The lawn care product is distributed as the robot navigates around the yard. A fertilizer path may be different than a mower pathway and the control module reconfigures itself to drive the robot in a prescribed fertilizer pathway. For example, a fertilizer pathway may comprise a less random pattern than a mower pathway.

Another common yard task is raking or collecting leaves in the fall. A leaf collection module may comprise a sweeper and/or vacuum function combined with a collection bin. Optionally, the leaf collector may further comprise a shredder to break the leaves into smaller portions. Because of the volume of leaves that need to be collected, a leaf collector module may be a trailer accessory. When towed by the base unit, the control module may also operate a mower module in the base unit to pre-shred the leaves prior to pick-up by the collector. A leaf collection pathway may be different from a mower pathway and the control module reconfigures itself to drive the robot in a prescribed leaf collector pathway.

Figure 27:
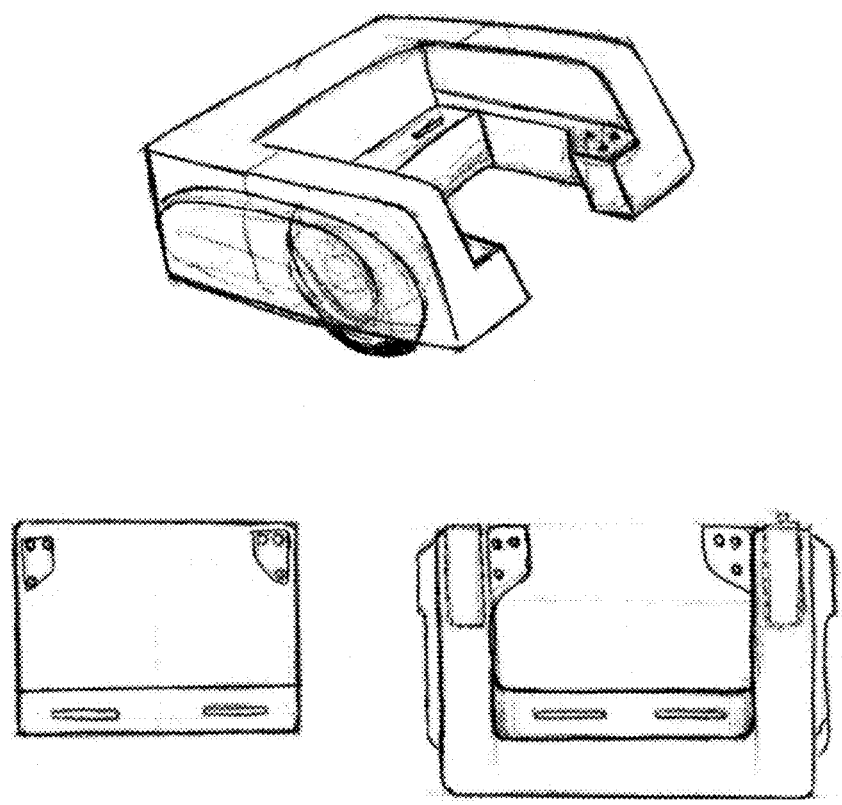
FIG. 27 shows views of an alternative embodiment showing arrangements for attaching stacked task modules to a drive module.

During winter months, the robot can be used to clear snow from hardscapes such as driveways and walks. The robot can use a scooper accessory to push, lift and dump snow in areas off the hardscape. The robot can converted to a snow blower by connecting an auger module at a ground connection and an impeller module at a backpack or top connection. The auger and impeller are designed to coordinate to move the snow through a passage connecting the auger and connector. Alternatively, the snow blower module may comprise a single module combining auger and impeller deployed as a bottom module in a drive unit such as shown in FIG. 27. The control module can control the drive unit to steer the snow blower configuration through the hardscape and rotate the chute of the impeller to direct where the snow is blown.

In other example embodiments shown in FIGS. 13 and 14, the trailer hitch is attached to a wheeled trailer accessory such as a utility cart. Because the trailer accessory travels behind the base unit, desirably the trailer hitch allows the trailer accessory to be pivotably attached to the base unit to allow for improved maneuverability when the trailer accessory is attached. A rolling accessory trailer module may comprise a utility cart for carrying reservoirs for clean water, cleaning fluids, fertilizers and receptacles for dust, trimmings, soiled water, etc. collected during the cleaning or yard maintenance tasks. In some embodiments, the utility cart comprises mechanisms to connect to the other accessories such as conduits to collect material from the dust collector(s) of vacuum module(s) or hedge trimmer modules, soiled water from a mopping or scrubbing module, and/or replenish water or cleaning supplies in the other accessories. It may also comprise an additional power supply for the robotic system. This accessory may extend the operational capabilities of the robotic system by reducing the amount of times the system may need to return to its docking station. Alternatively, the trailer module may comprise one or more of the modules described previously as floor, ground or backpack modules, such as a sweeper, vacuum, fertilizer, hedge trimmer, or an air jet blower. In such embodiments the trailer module may comprise one or more ports as described previously to connect the accessories to the trailer and/or the control module on the base unit. In some embodiments, the trailer accessory may comprise its own drive unit to help move it about the yard. Depending on its tasks, a trailer accessory may operate as a slave device or a minion device.

In some embodiments, the trailer accessory may be transported to a location and released by the base unit to conduct an operation, then retrieved by the base unit after the operation is completed. This feature may allow the base unit to regain mobility lost when a trailer accessory is attached and carry out additional operations. When detached from the base unit, the trailer accessory may be controlled remotely by the control module.

For example, a trailer module comprising a hedge trimmer can be placed in the locus of a hedge to be trimmed and detached from the base unit. The base unit with a mower module can mow an adjacent grassy area, while the hedge trimmer module trims the hedge. If the trailer module comprises its own drive unit, it can advance the hedge trimmer along the hedgerow as it trims. In another example, a trailer module comprising a counter cleaning minibot can be placed in the locus of a counter to be cleaned and detached from the base unit. The base unit with a floor vacuum module can vacuum the floor of the room, such as a kitchen or bathroom, while the counter-cleaning module cleans the counter.

In some embodiments such as various utility carts, the trailer accessory may have smart characteristics limited to providing connectivity and sensing information to the control module. Other trailer accessories may further comprises capability to inventory the contents of the accessory, including for example using on-board sensors to determine amounts of materials in various reservoirs or receptacles.

Because the robotic system is modular, the homeowner or user can choose the modules to best suit his needs, and the system is expandable to add additional modules. For instance, a starter robot may comprise a drive unit, a mower module in a ground or bottom connection, and a control module in a top connection. The mower module may be integrated into the drive unit or it may be removable, allowing for a different module to be used instead. Additional modules can be added to the starter robot. The additional modules may be purchased or rented. For instance, an auxiliary power source may be added as a backpack or a stacked top accessory to extend range of the robot. Edger and/or string trimmer modules as backpack accessories or minion robots may be added to conduct detail lawn maintenance tasks. A sweeper module may configure the robot as a sweeper by replacing or converting the mower module. Vacuum and/or blower backpack or stacked top accessory modules may be added. A combination of sweeper, fluid dispenser and vacuum modules may configure the robot as a scrubber. Hedge trimmer, fertilizer, and/or leaf collector modules can add additional capabilities to the system. A snow blower module set may be used during winter months.

A specific instantiation may comprise a drive unit, mower module, auxiliary power supply and control module, such as in stacked configuration with the auxiliary power supply disposed between the drive unit and the control module. Another instantiation may comprise a drive unit, mower module, optional auxiliary power supply, control module, and edger and/or string trimmer, such as when the edger and/or string trimmer modules are each independently backpack or minion robot modules.

Another instantiation may comprise a drive unit, mower or sweeper module, optional auxiliary power supply, control module, and vacuum module, such as wherein the vacuum module is a backpack accessory or top accessory disposed below the control module. Another instantiation may comprise a drive unit, mower or sweeper module, optional auxiliary power supply, control module, and blower module, such as wherein the blower module is a backpack accessory or top accessory disposed below the control module.

As discussed herein, the robotic system is reconfigured depending on which accessory device is attached to the base unit. In an example, when a mopping accessory is attached/connected, the robotic device operates to carry out a mopping routine, and when a vacuum accessory is attached/connected, the robotic device operates to carry out a vacuuming routine. The mopping routine may comprise, for example, determining a path that the robotic device travels along at the direction of the processor, and controlling the mopping accessory to carry out the mechanical operations of mopping, throughout the pathway, at specified locations along the pathway, and/or at locations where the processor determines a need for mopping based on sensory input, such as cleaning up a spill. In another example, when a mowing accessory is attached/connected, the robotic device operates to carry out a mowing routine, and when a vacuum accessory is attached/connected, the robotic device operates to carry out a vacuuming routine. The mowing routine may comprise, for example, determining a path that the robotic device travels along at the direction of the processor, and controlling the mowing accessory to carry out the mechanical operations of mowing, throughout the pathway, at specified locations along the pathway, and/or at locations where the processor determines a need for mowing based on sensory input, such as mowing a fast-growing patch of grass. In either instantiation, the vacuuming routine may comprise, for example, determining a path that robotic device travels along at the direction of the processor, which may be the same as or different from the mopping or mowing pathway, and controlling the vacuuming accessory to carry out the mechanical operations of vacuuming throughout the pathway and/or carrying out special vacuuming tasks specified in the operating instructions and/or at locations where the processor determines a need for special vacuuming tasks based on sensory input. Notably, the processor recognizes the capabilities of the accessory module attached to the base unit and provides instruction to the accessory and/or the drive unit based on its capabilities.

In some instantiations, when the mowing accessory is connected to the base unit, the controller controls the path of the device to operate in grassy areas of the yard. When the vacuum accessory is connected to the base unit, the controller controls the path of the device to operate in hardscape areas of the yard, such as walkways, driveways, patios and the like. The pathway of the device when operating as a mower in grassy areas may be random. The pathway of the device when operating as a vacuum in hardscape areas may be more regular, such as in a plurality of generally back-and-forth rows. In some instantiations, when a vacuum accessory and a mowing accessory are both connected to the controller, connection of the vacuum module will take precedence over the mower module, and the controller will operate the robot as a vacuum in the hardscape areas and block operation of the mower module. Such instantiations may include when the mowing accessory is integrated into the drive unit, or when the mowing accessory is connected at a ground or bottom connection and the vacuum module is connected at a backpack connection.

As discussed above, the robotic system may comprise a docking station to recharge the robot 102, located in proximity to a storage unit for a plurality of task modules. In an embodiment, the docking station and storage unit may be combined in a single changing station 199, discussed below with reference to FIGS. 33 through 39 below. The changing station 199 comprises a number of attributes already described for the robotic system and may be considered to be a specialized module within the robotic system.

Figure 33:
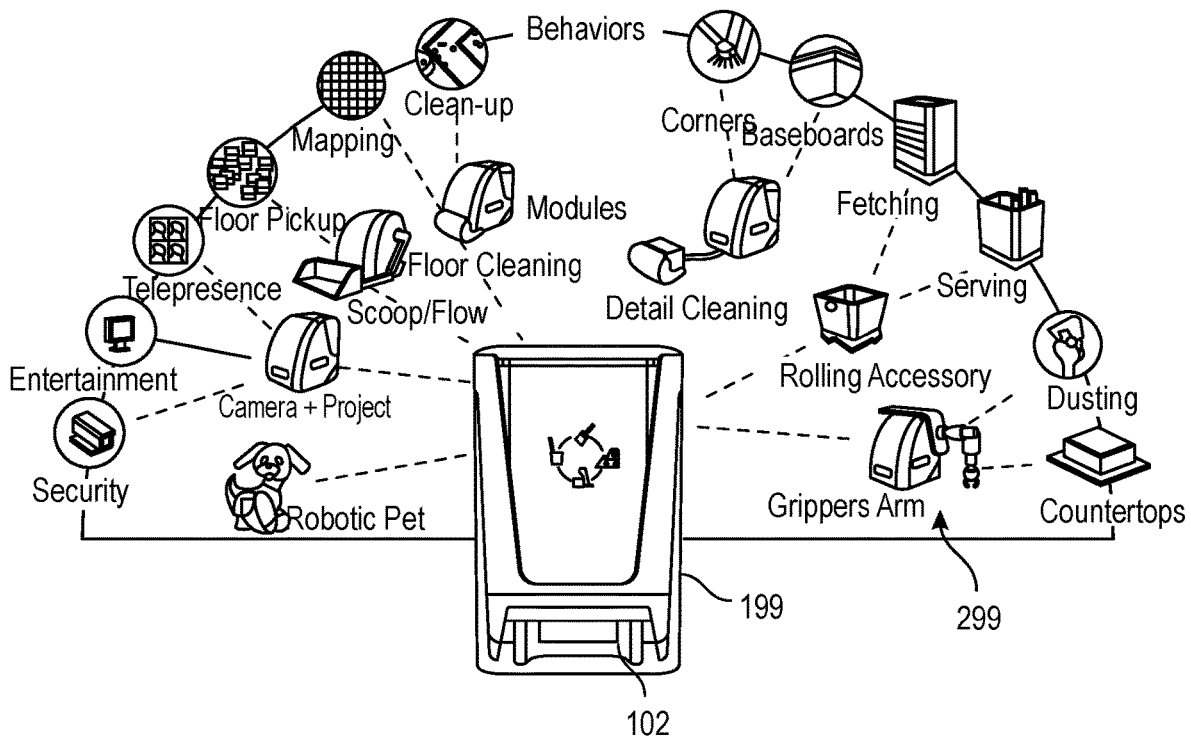
FIG. 33 illustrates a robot in a changing station according to an example embodiment.

FIG. 33 illustrates a module changing station 199 and a plurality of task modules 299 that may be stored within the changing station 199, according to an exemplary embodiment. As illustrated, a robot 102 may dock at a docking station of the changing station 199 to either exchange or attach to a module 299 stored within the changing station 199. Each of the modules 299 within the changing station 199 may enhance the ability of the robot 102 to perform specific tasks such as, for example, floor cleaning, picking up items, providing entertainment via a projector module, etc. Additionally, as illustrated, the changing station 199 may further comprise a display on the body of the changing station 199 to display which module the robot 102 is requesting from the changing station 199 (e.g., a vacuum attachment, as illustrated).

Figure 34:
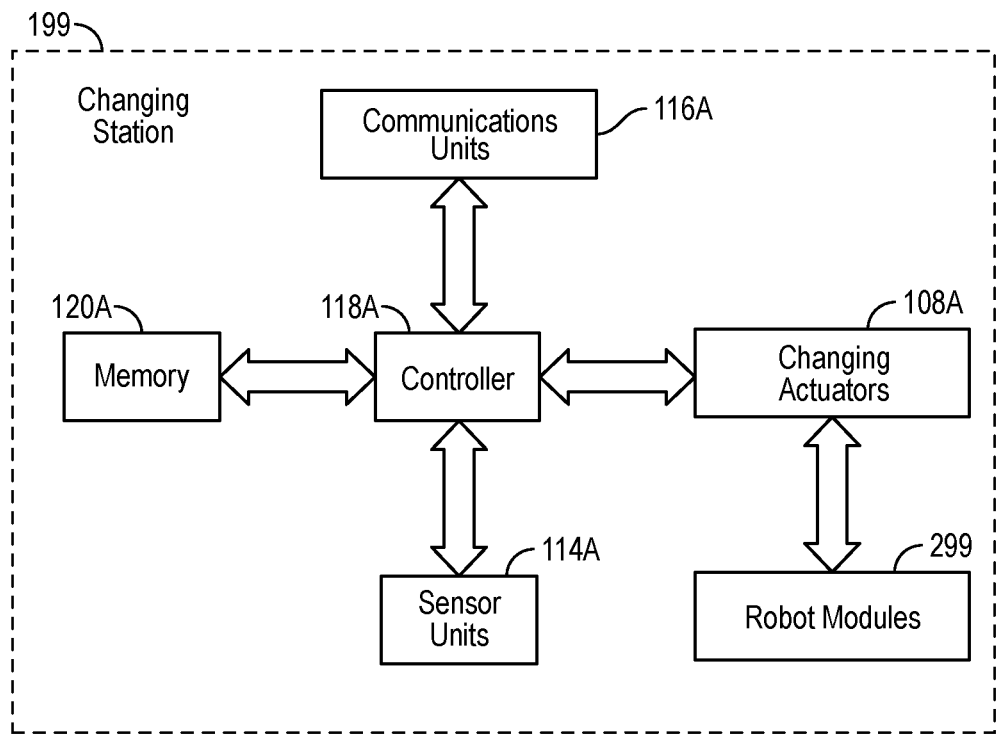
FIG. 34 illustrates a functional block diagram of a module changing station and components thereof in accordance with some exemplary embodiments of the present disclosure.

FIG. 34 illustrates a functional block diagram of a module changing station 199 and components thereof in accordance with some exemplary embodiments of the present disclosure. The module changing station 199 may comprise a controller 118A communicatively coupled to a non-transitory computer readable memory 120A. The controller 118A may comprise substantially similar features and functionality as a controller 118 of a robot 102 illustrated in FIG. 1A above, wherein the controller 118A may be configured to execute computer readable instructions stored on the memory 120A to perform functions of the robot changing station 199. Controller 118A may additionally be communicatively coupled to a communications unit 116A comprising a receiver, transceiver, user interface, and other communicative units. Communications unit 116A may be further configured to send and receive signals from the changing station 199 to one or more robots 102 that utilize the changing station 199. Communications unit 116A may be further be configured to send and receive signals from an external server which may provide computer readable instructions to the controller 118A. Controller 118A may additionally be communicatively coupled to sensor units 114A, comprising of one or more sensor units such as LiDAR sensors, pressure/contact sensors, proximity sensors, RFID tags, and/or any sensors of sensor units 114 illustrated above in FIG. 1A. Sensor units 114A may be configured to ensure a robot 102 requesting to utilize the changing station 199 approaches and docks within the changing station 199 correctly.

Lastly, controller 118A may be communicatively coupled to changing actuators 108A. Changing actuators 108A may comprise motors, actuators, belts, pulley systems, and/or any similar system configured to detach a module 299 from a robot 102 and replace the detached module 299 with a new module 299 based on a task to be performed by the robot 102, wherein the new module 299 to be attached to the robot 102 may be determined by the controller 118A.

According to at least one non-limiting exemplary embodiment, controller 118A may effectuate movements of a robot 102 entirely or partially based on computer readable instructions stored on memory 120A of the changing station 199. In other words, the changing station 199 may, in addition to exchanging modules 299, assign and execute tasks of the robot 102 by sending control signals via communications units 116A.

It is appreciated that the number of modules 299 stored within the changing station 199 may depend on the volume of the changing station (e.g., height, width, and length dimensions). Accordingly, the dimensions and shape of the changing station 199 as illustrated is not intended to be limiting.

Figure 35:
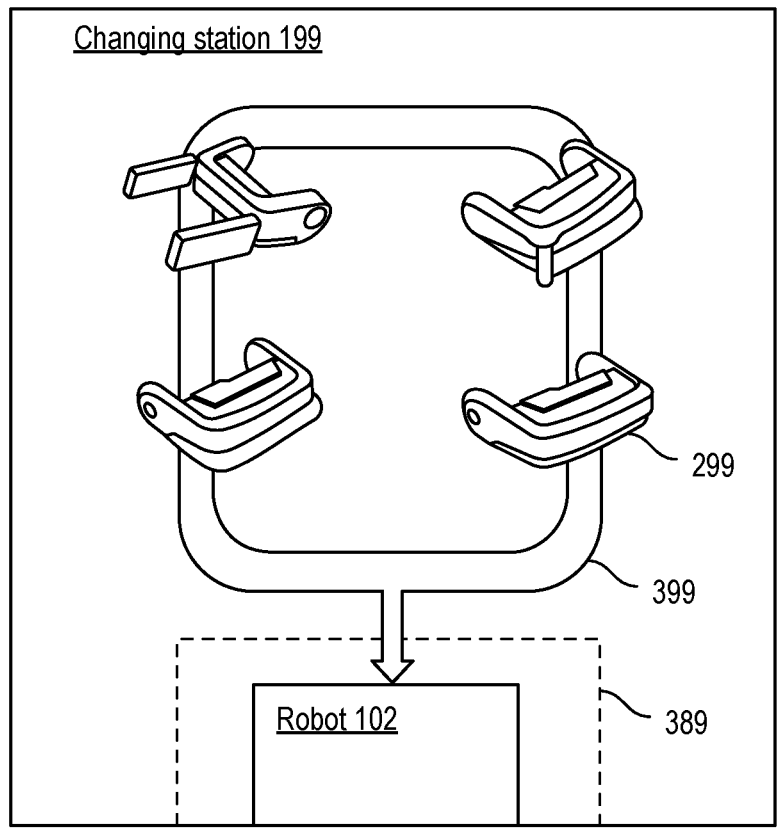
FIG. 35 illustrates a changing station according to an example embodiment.

FIG. 35 illustrates a representation of a changing station 199 with its front cover removed such that some components of the changing station 199 may be illustrated, according to an exemplary embodiment. The changing station 199 illustrated comprises a robot 102 desiring to exchange a current module 299 with a new module 299 stored within the changing station 199. Dock 389 may comprise some sensors of sensor units 114A configured to communicate to a controller 118A that a robot 102 is within dock 389 and request a specific module 299. Accordingly, dock 399 may comprise an input/output port of which the robot 102 may attach to such that communication signals between the controller 118 of the robot 102 and controller 118A of the changing station 199 may communicate. According to at least one non-limiting exemplary embodiment, this input/output port may be replaced by wireless communications via communication units 116 and 116A of the robot 102 and changing station 199, respectively.

Changing actuators 108A may comprise a belt and motor system 399 configured to rotate modules 299 within the changing station 199 until a module 299 desired by the robot 102 is rotated into proper position. These changing actuators 108A may additionally attach the module 299 to the robot 102 by providing mechanical work to position and securely attach the module 299 to the robot 102 (e.g., sliding a module 299 into a corresponding port on the robot 102).

According to at least one non-limiting exemplary embodiment, a changing station 199 may comprise a plurality of docks 389 such that a plurality of modules 299 may be exchanged simultaneously.

Figure 36:
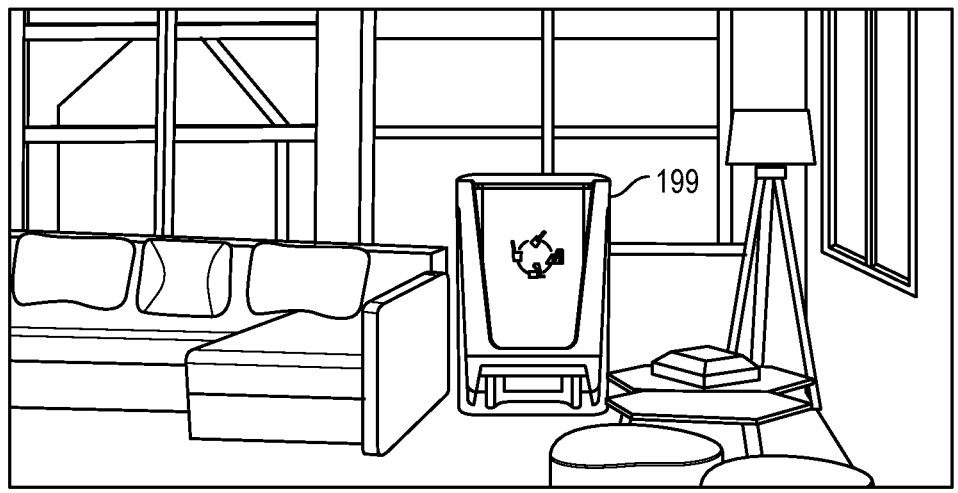
FIG. 36 is a perspective view of the changing station illustrated in FIG. 35 and a robot nested therein in a home environment.

FIG. 36 illustrates a changing station 199 placed within a household environment, according to an exemplary embodiment. A plurality of modules 299 stored within the changing station 199 may configure a robot 102 to perform household duties (e.g., cleaning). Accordingly, a robot 102 may perform the household duties by utilizing the modules 299 within the changing station 199. Advantageously, locating all available modules 299 for a robot 102 to perform the household duties are located within the changing station 199 which may reduce space occupied by the modules 299 if they were not stored within a centralized changing station 199. Additionally, the changing station 199 may provide a compact storage space for modules 299 and a central communication hub (see FIG. 16) for one or more robots 102 operating within the household.

According to at least one non-limiting exemplary embodiment, a changing station 199 may be located within other environments outside the household. For example, a warehouse may utilize a changing station 199 to enable robots 102 operating within the warehouse to perform a plurality of functions (e.g., lifting heavy objects with a forklift module and cleaning floors with a separate scrubber module). That is, a changing station 199 within a household comprising of modules 299 configured for household duties is not intended to be limiting.

Figure 37:
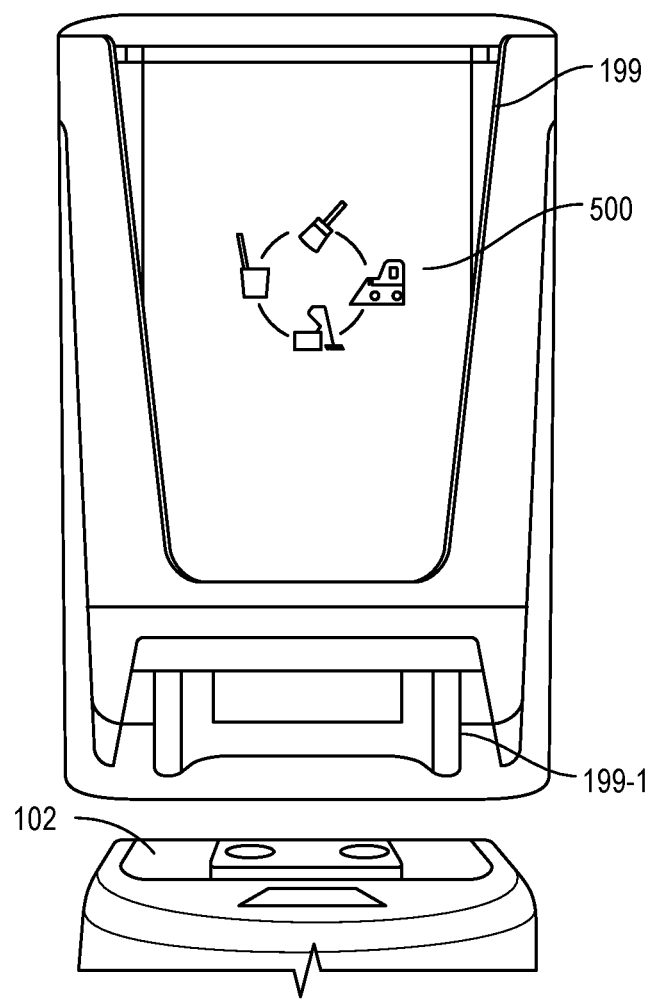
FIG. 37 is another perspective view of the changing station and robot.
Figure 38A:
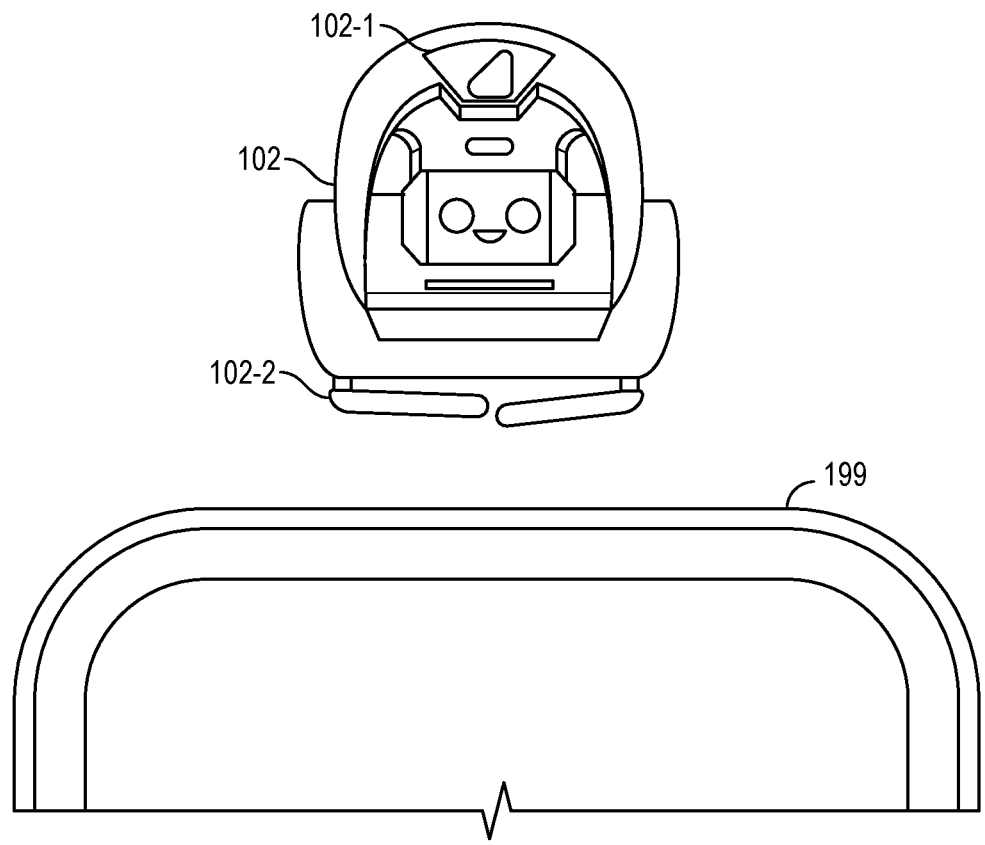
FIGS. 38A, 38B and 38C show additional perspective views of the changing station and robot wherein task modules are exchanged in response to changes in tasks instruction received by the robot from the changing station.
Figure 38B:
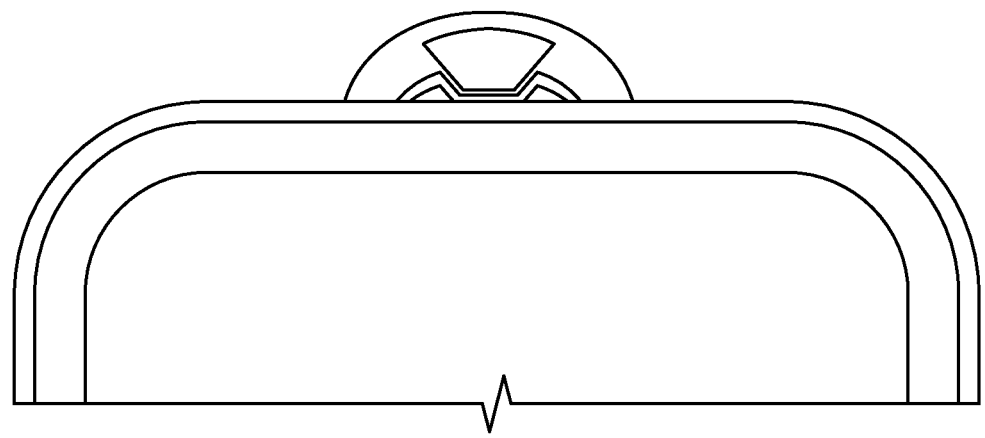
Figure 38C:
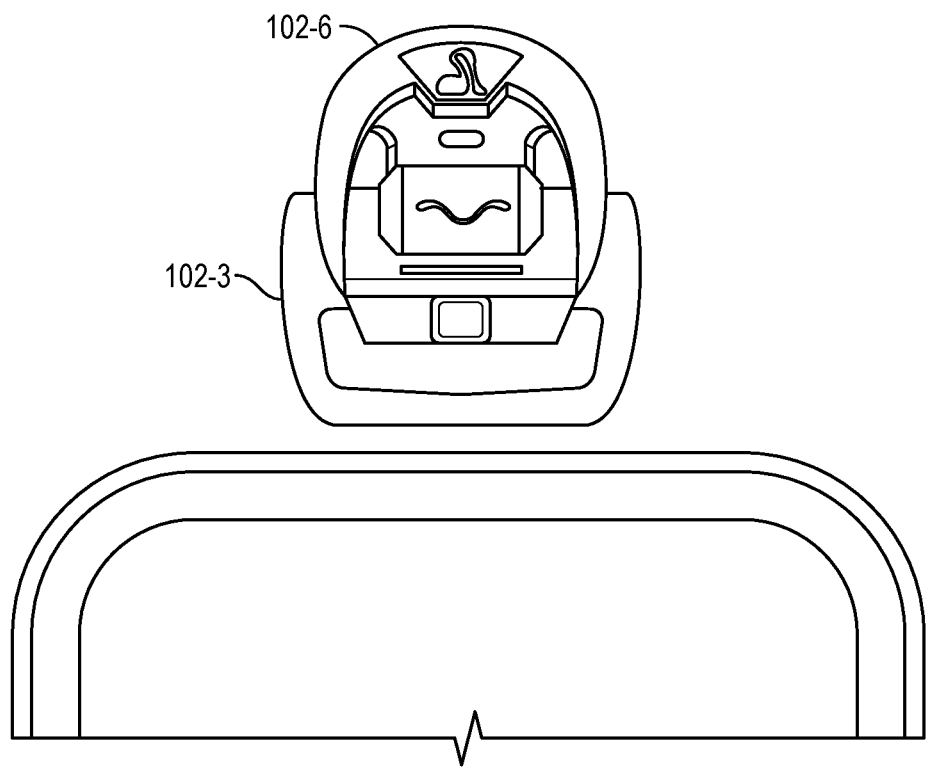

Next, referring to FIG. 37 another perspective view of changing station 199 and robot 102 is shown. The changing station 199 acts similar to a "mothership" or "brain" that executes instructions and tasks to robot 102. As shown, changing station 199 can delegate different tasks 500 to robot 102 upon having robot 102 docked inside it in the space 199-1 formed therein. As shown in FIG. 38A, when robot 102 approaches the changing station 199 it has first task 102-1 assigned to it with first attachment(s) 102-2. The first task may be vacuuming, cleaning, brushing, sweeping, mopping etc. In the embodiment shown in FIG. 38A, the task 102-1 is a "scooper" task. The first attachment may comprise various types of attachments that assist in performing these tasks such as brush, scrubber, tongs, jointed plate or arm, etc. After entering or nesting within the changing station 199 as shown in FIG. 38B, robot 102 may receive new instructions and tasks to perform. For example, as shown in FIG. 38C, robot 102 is shown after coming out of the nesting position in change station 199, and robot 102 is assigned new task 102-6 and is given new or second attachment(s) 102-3 associated with a vacuuming task 102-6. Additionally, color around the robot 102 changes indicating to an external user that robot 102 is performing a different task. The second attachment(s) 102-3 may be different from the first attachment(s) 102-2 and the second or subsequent task 102-6 assigned to robot 102 may be different from the first task 102-1.

Figure 39:
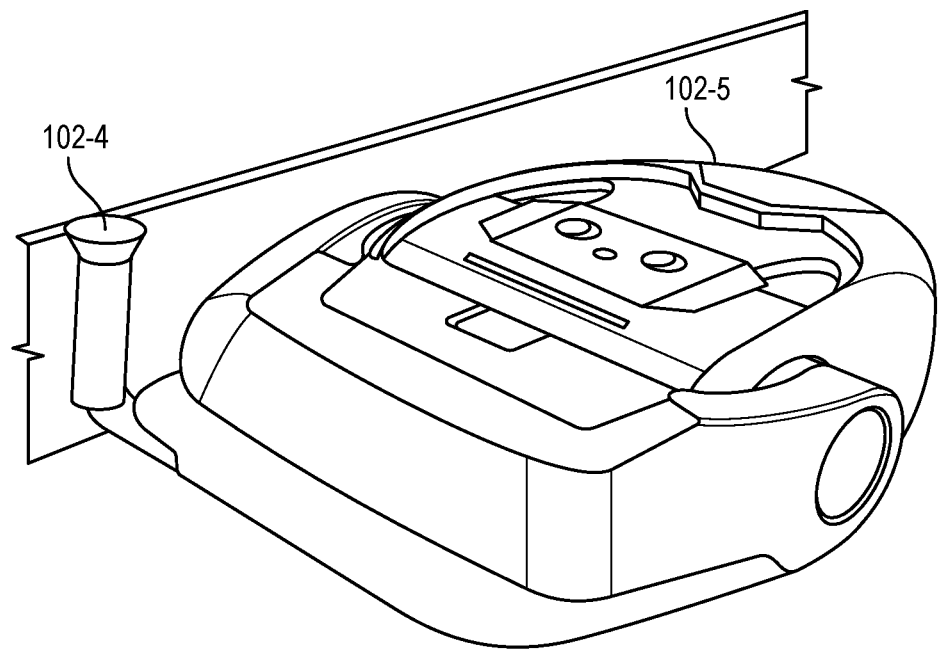
FIG. 39 is another example embodiment of robot.

Next, referring to FIG. 39, another perspective view of robot 102 performing a different task 102-5 with a different attachment 102-4 is illustrated. For example, in this illustration, robot 102 is shown performing the cleaning task of wiping/dusting baseboards.

Referring to FIGS. 40-44, further discussion as to master robot 200-A is noted. As shown from the side view in FIG. 40, master robot 200-A includes a base with wheels, and a projected arm that extends upward and away from the base of master robot 200-A. Additionally, master robot 200-A includes an interactive screen that can be connected to a remote server or internet for purposes of conducting FaceTime or other types of interactions with users near or distant to master robot 200-A.

Figure 41A:
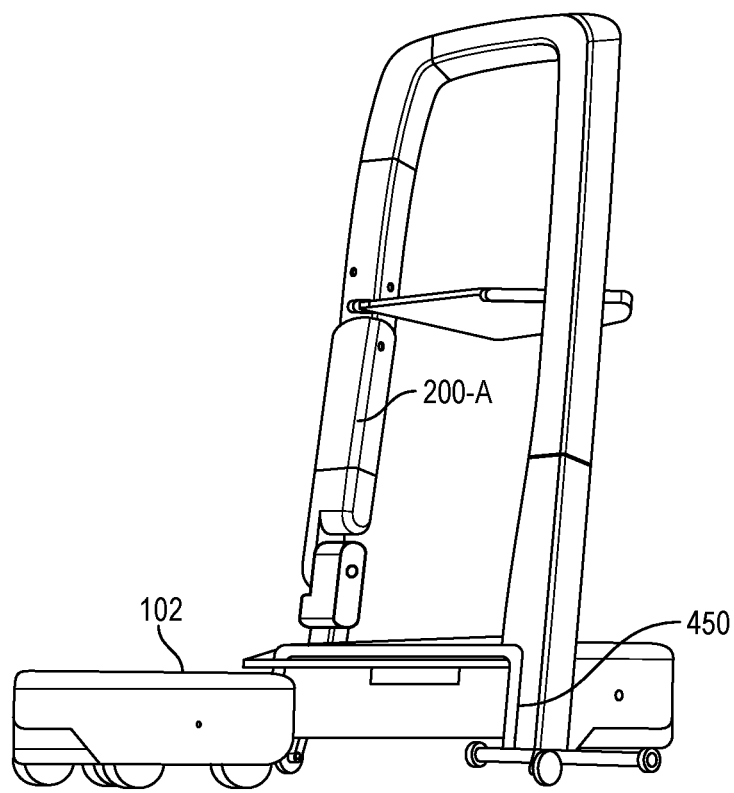
Figure 41B:
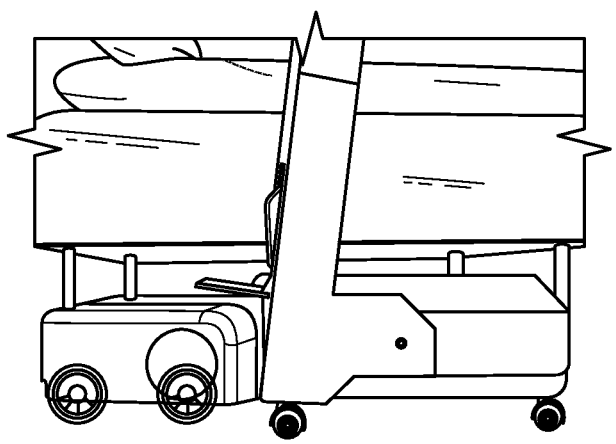
Figure 41C:
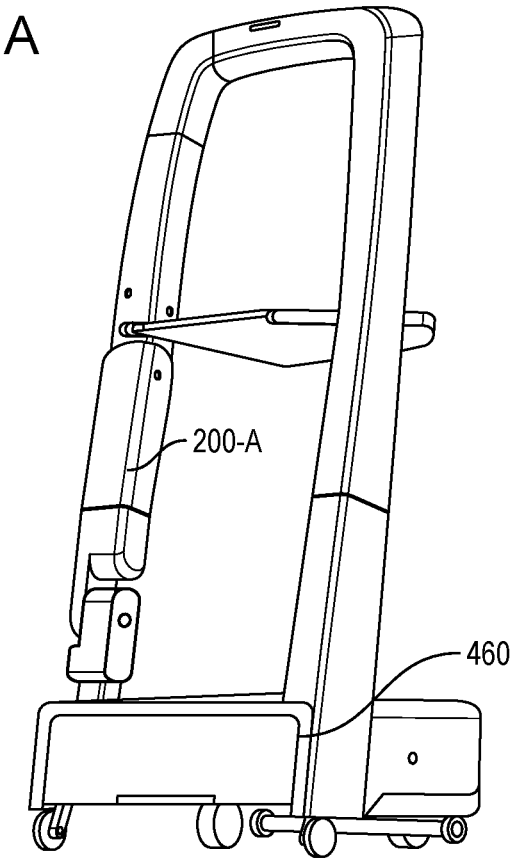

Next, with reference to FIGS. 41A-C, robot 102 will be described in conjunction with a master robot 200-A which is an independent robot from robot 102. In this embodiment, the robot 102 may be considered as a minion device of master robot 200-A. As shown in FIG. 41A, master robot 200-A includes a hollow compartment or spacing 450 in the bottom that is configured to receive robot 102 therein. As shown clearly in the side view illustration of FIG. 41B, robot 102 is received in the compartment or spacing formed in master robot 200-A. The master robot 200-A includes a hinged shutter 460 which acts like a garage door as it goes between an open position (shown in FIGS. 41A and 41B) and a closed position (FIG. 41C). The master also includes wheels such that after receiving robot 102 therein and closing the shutter 460, the master robot 200-A may maneuver around with robot 102 included or nested therein, thereby forming a single component or single robot instead of two separate robots. When the locus of a task is reached, the robot 102 may be deployed from the compartment 450 to perform the task. When the task is completed, the robot 102 can return to the compartment 450 and be maneuvered by master robot 200-A to another locus.

Figure 40:
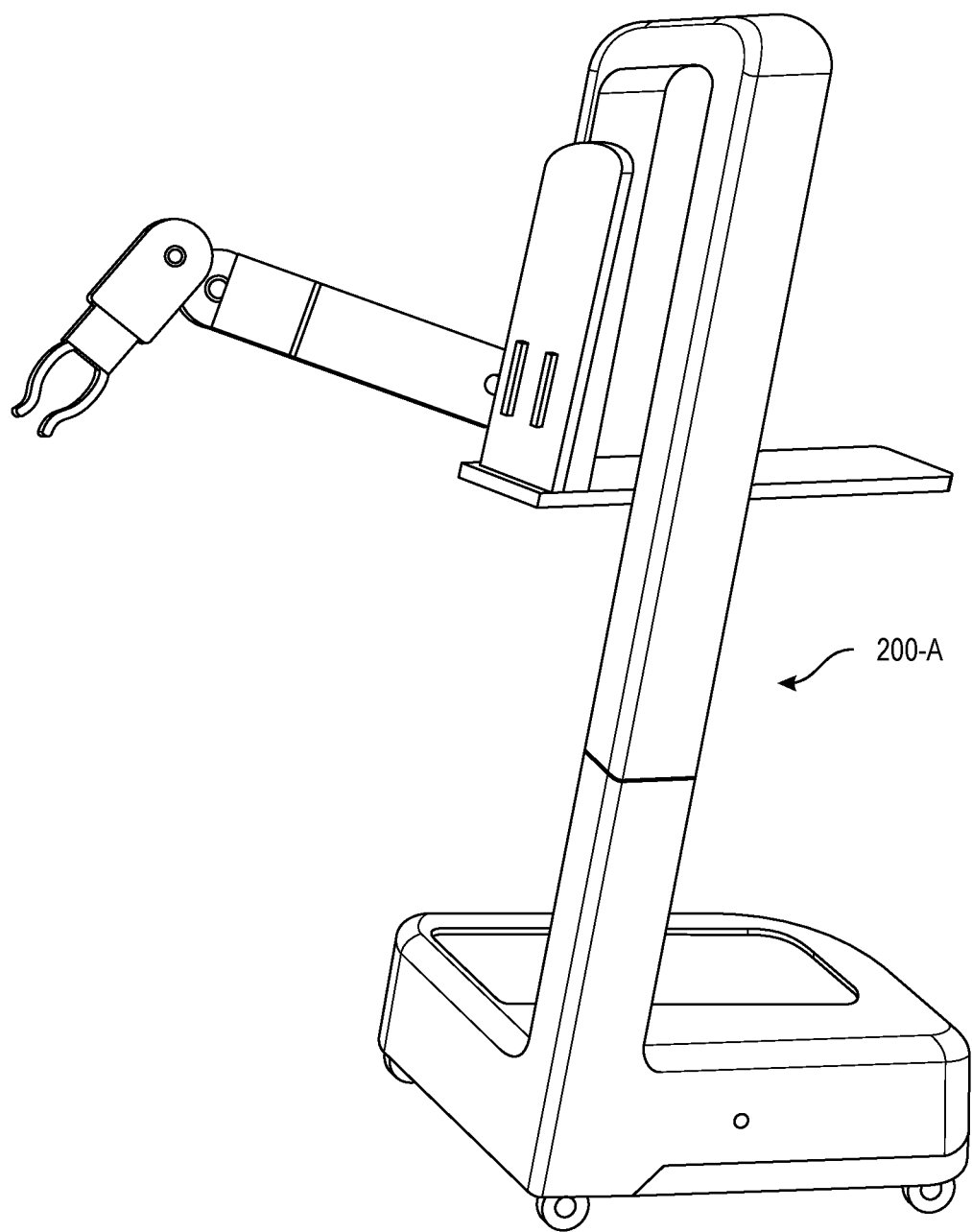
FIG. 40 illustrates perspective views of a master robot and a slave robot nested working together as a single robot.
Figure 42:
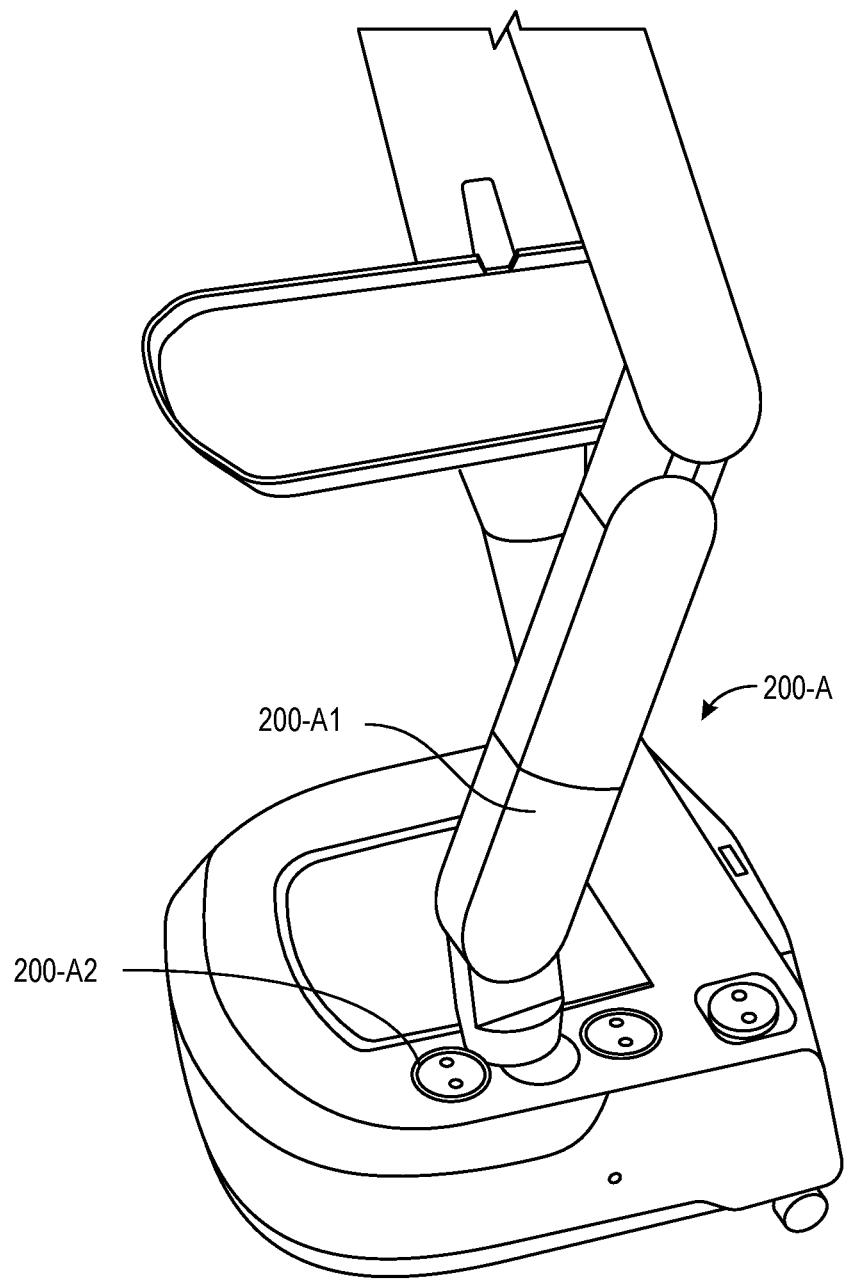

Referring to FIG. 42, base station of master robot 200-A includes a plurality of different types of distal end portions 200-A2 that are incorporated therein. These different distal end portions 200-A2 engage with the arm 200-A1 of master robot 200-A based on the type of task that needs to be performed. For example, as shown in FIG. 42, distal end of arm 200-A1 includes a brush as a distal end for cleaning purposes. In another example, the distal end portion 200-A2 may be a gripper as shown in FIG. 40. Numerous other types of distal ends may be incorporated with the arm 200-A2. Additionally, the arm 200-A1 may be multi-jointed, extendable and retractable to have different lengths, and have multiple degrees of freedom (or at least six degrees of freedom).

The robotic system of FIGS. 41, 42 and 43 may be an instantiation of a robotic cleaning system in which robot 102 operates as a floor cleaning unit, carrying out such tasks as mopping, vacuuming, scrubbing, etc. and the articulated arm module cleans surfaces above the floor such as cleaning baseboards, corners, counters, blinds, etc.

FIGS. 44A and 44B show another example embodiment of a master robot 200-A that is capable of performing different tasks than master robot 200-A illustrated in FIGS. 41-43. For example, master robot according this embodiment includes a distal end configured with "tongs" or finger-like devices that are capable of grasping objects like toys, objects, or dirty laundry for collection as shown in FIG. 44A. As shown in FIG. 44B, master robot 200-A includes a basket or bin that objects collected by the tongs are placed in.

The robotic system disclosed herein comprises the following aspects and embodiments.

In one aspect, provided is a universal connection interface for connecting a main robot to a plurality of modular attachments, the universal connection interface comprising: at least one data connection configured to communicate data between the main robotic apparatus and the plurality of modular attachments of varying complexity and functionality; and a connection unit configured to ensure connection between the main robot and a respective one of the plurality of modular attachments is secure. Embodiments of this aspect include those further comprise, a power input configured to provide power to at least one of the plurality of modular attachments; and a processor configured to execute computer readable instructions to determine whether at least one of the plurality of modular attachments requires power; and/or a multiplexing system and demultiplexing system, wherein each one of the multiplexing and demultiplexing systems are configured to communicate a plurality of data channels across a minimum of data connections, the data connections comprise electrical connections; and/or a processor configured to execute computer readable instructions to determine a number of the plurality of data channels, the number being based on a complexity of at least one of the plurality of modular attachments; and/or at least one dynamic amplifier configured to adjust output of at least one electromechanically coupled mechanical output; and a processor configured to execute computer readable instructions to control gain of the at least one dynamic amplifier, the computer readable instructions being stored on a non-transitory storage medium on at least one of plurality of modular attachments; and/or an encoder configured to encode output data based on a protocol; and a decoder configured to decode input data based on the protocol; and/or a processor configured to execute computer readable instructions to: determine a respective modular attachment from the plurality of modular attachments based on an interrogation reading from a proximity detection unit; enable at least one of a mechanical, electromechanical, or magnetic connector to secure a universal connection interface of the main robot to the respective modular attachment; and transmit and receive sensor data to aid connection of the universal connection interface of the main robot and the respective modular attachment.

Another aspect provides a non-transitory computer readable storage medium having a plurality of computer readable instructions stored thereon, that when executed by a processor, cause the processor to: navigate a main robot to a respective modular attachment from a plurality of modular attachments, determine the respective modular attachments from the plurality of modular attachments based on an interrogation reading; connect to the respective modular attachment using a universal connection interface; and communicate with the respective modular attachment, the communication comprises at least one of data communication, mechanical input, or a combination thereof.

Embodiments of this aspect include those wherein, the processor is further configured to execute the computer readable instructions to determine complexity of the respective modular attachment based on a communication signal from the respective modular attachment through a universal connection interface; and/or the processor is further configured to execute the computer readable instructions to encode input data based on a protocol stored in the non-transitory computer readable storage medium; and decode output data based on the protocol; and/or the processor is further configured to execute the computer readable instructions to add and remove operations to the protocol based on the complexity and function of the respective modular attachment; and/or the processor is further configured to execute the computer readable instructions to adjust at least one gain of at least one dynamic amplifier electromechanically coupled to at least one mechanical output on a universal connection interface.

Another aspect provides a method for a main robot to utilize a plurality of modular attachments of varying complexity using a universal connection interface comprising: connecting, via a universal connection interface, the main robotic apparatus to a first modular attachment of a plurality of modular attachments; performing a first set of tasks with the first modular attachment; connecting, via the universal connection interface, the main robotic apparatus to a second modular attachment of the plurality of modular attachments; and performing a second set of tasks with the second modular attachment, the first and second modular attachments are different modular attachments.

Embodiments of this aspect include those wherein the method further comprises, determining, via the universal connection interface, the complexity of an attached respective modular attachment of the plurality of modular attachments based on a signal communicated; and determining, via the universal connection interface, a number of data communication channels required for a main robot to effectuate control of the attached respective modular attachment based on the complexity of the attached respective modular attachment; and/or determining the first and second modular attachments from the plurality of modular attachments based on an interrogation signal transmitted by the main robot to a respective modular attachment; and/or sending and receiving a connection confirmation signal between the main robot and a respective modular attachment, the connection confirmation corresponding to secure connection between the main robot and the respective modular attachment, the connection confirmation signal being returned upon proper functioning of all data connections; and/or wherein the data connection includes at least one of electrical data connections, mechanical output connections, or a combination thereof.

Another aspect provides an autonomous robotic system comprising, a control module comprising a central processing unit, memory, a set of computer readable instructions, and at least one sensor; a drive module comprising a plurality of wheels, at least one of the plurality of wheels which is steerable and at least one of the plurality of wheels which is in operational connection to a motor to drive the module; at least one task module configured to perform a task or set of tasks as instructed by the control module; wherein the central processing unit is configured to function as an adaptive computerized predictor apparatus by receiving input from the at least one sensor and operate in accordance with a learning process based on sensor input from the at least one sensor in order to determine a path of motion through a space and control the motion of the drive module through the space and function as a controller to direct the task module to perform its task.

Another aspect provides a robot for providing a degree of freedom of motion to an accessory device, the robot comprising: a docking port configured to have the robot dock and undock from the accessory device, the docking port including one or more of a mechanical plug and an electrical plug; and a storage unit configured to store a map of one or more locations.

Embodiments of this aspect include those wherein, the accessory device is configured to clean a floor, docket by an autonomously navigating device, receive a degree of motion movement from an external device, and maneuver autonomously; and the robot is configured to select one or more programs based on the accessory device, the robot further configured to assign labels to one or more locations, and further configured to maneuver autonomously; and/or wherein the accessory device and the robot are configured to follow one or more users to one or more locations.

Another aspect provides a robotic system comprising: a base device including a port for receiving at least one extension; and at least one processor configured to execute computer readable instructions to move the base device from a first position to a different second location along a trajectory, and change orientation of the base device from a first orientation to a different second orientation based on connecting the at least one extension to the port of the base device.

Embodiments of this aspect include those wherein, at least one processor is further configured to change characteristics of the base device from a first characteristic to a different second characteristic based on at least one extension received by the port; and/or wherein the robotic system is configured to carry out one or more yard maintenance tasks; and/or the first characteristic corresponds to mowing and the second characteristic corresponds to one or more selected from the group consisting of vacuuming, sweeping, blowing, scrubbing, fertilizing, edging, string trimming, weeding, hedge trimming, and leaf collecting; and/or the yard maintenance task is selected from the group consisting of mowing, vacuuming, sweeping, blowing, scrubbing, fertilizing, edging, string trimming, weeding, hedge trimming, and leaf collecting; and/or at least one extension includes a first extension and a different second extension, and at least one extension configured to be detachable from the base device such that the first extension is replaced by the second extension; and/or the first extension corresponds to a module configured to perform a mowing task and the second extension corresponds to a module configured to perform a task selected from the group consisting of vacuuming, sweeping, blowing, scrubbing, fertilizing, edging, string trimming, weeding, hedge trimming, and leaf collecting; and/or the base device corresponds to a master component and at least one extension corresponds to a slave component, and at least one processor is further configured to affect the master component based on connection of the slave component to the master component by altering at least one of the orientations or characteristics of the master component; and/or the base device corresponds to a master component and at least one extension corresponds to a minion component, and at least one processor is further configured to affect the master component based on connection of the minion component to the master component by altering at least one of the orientations or characteristics of the master component; and/or wherein the first characteristic corresponding to floor mopping and the second characteristic corresponding to vacuum cleaning.

Another aspect comprises a module changing station system comprising: a non-transitory computer readable memory comprising a plurality of instructions embodied thereon, and a processor configured to execute the plurality of instructions to: detect a presence of a robot within a dock of the module changing station system via one or more sensor units; detach a current module from the robot utilizing one or more actuator units; determine a desired module to be utilized by the robot to perform a task based on the task; and attach the desired module to the robot utilizing the one or more actuator units.

An embodiment of this aspect in one wherein the specialized processor is further configured to send and receive control and communication signals from the robot as the robot performs tasks.

It may be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

As mentioned, there remains the foregoing description of the specific example embodiments that so fully reveal the general nature of the concepts herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of preferred example embodiments, those skilled in the art will recognize that the example embodiments herein can be practiced with modification within the spirit and scope of the appended claims.

What is claimed is:

1. A universal connection interface apparatus for connecting a main robot to a plurality of modular attachments, the universal connection interface comprising:
   at least one data connection configured to communicate data between the main robot and the plurality of modular attachments of varying complexity and functionality;
   a connection unit configured to ensure connection between the main robot and a respective one of the plurality of modular attachments is secure;
   at least one dynamic amplifier configured to adjust output of at least one electromechanically coupled mechanical output of the main robot; and
   a processor coupled to the main robot, the processor configured to execute computer readable instructions to control gain of the at least one dynamic amplifier, the computer readable instructions being stored on a non-transitory storage medium on at least one of the plurality of modular attachments.

2. The universal connection interface apparatus of claim 1, further comprising:
   a power input configured to provide power to at least one of the plurality of modular attachments, wherein the processor is configured to execute the computer readable instructions to determine whether at least one of the plurality of modular attachments requires power.

3. The universal connection interface apparatus of claim 1, further comprising:
   a multiplexing system and demultiplexing system, wherein each one of the multiplexing and demultiplexing systems are configured to communicate a plurality of data channels across a minimum of data connections, the data connections comprise electrical connections.

4. The universal connection interface apparatus of claim 3, wherein the processor is further configured to execute the computer readable instructions to determine a number of the plurality of data channels, the number is based on a complexity of at least one of the plurality of modular attachments.

5. The universal connection interface apparatus of claim 1, further comprising:
   an encoder configured to encode output data based on a protocol; and
   a decoder configured to decode input data based on the protocol.

6. The universal connection interface apparatus of claim 1, wherein the processor is further configured to execute computer readable instructions to:
   determine a respective modular attachment from the plurality of modular attachments based on an interrogation reading from a proximity detection unit;
   enable at least one of a mechanical, electromechanical, or magnetic connector to secure a universal connection interface of the main robot to the respective modular attachment; and
   transmit and receive sensor data to aid connection of the universal connection interface of the main robot and the respective modular attachment.

7. The universal connection interface apparatus of claim 1, wherein the processor coupled to the main robot is further configured to execute computer readable instructions to
   associate a control component with a task;
   associate the task with a modular attachment configured to carry out the task;
   determine that the modular attachment configured to carry out the task is in operative communication with the main robot; and
   direct the control component to the modular attachment, thereby instructing the modular attachment to carry out the task.

8. The universal connection interface apparatus of claim 1, wherein the main robot is configured to autonomously locate and connect to the modular attachment configured to carry out the task using the universal connection interface apparatus.

9. The universal connection interface apparatus of claim 1, wherein the processor coupled to the main robot is further configured to execute computer readable instructions to
   associate a control component with the task;
   associate the task with a modular attachment configured to carry out the task;
   determine that the modular attachment configured to carry out the task is not in operative communication with the main robot; and
   determine that the task cannot be completed.

10. The universal connection interface apparatus of claim 9, wherein the processor coupled to the main robot is further configured to execute computer readable instructions to provides a user discernible representation that the task cannot be completed.

11. A non-transitory computer readable storage medium comprising a plurality of computer readable instructions stored thereon, that when executed by a processor, cause the processor to:
    navigate a main robot to a respective modular attachment of a plurality of modular attachments,
    determine the respective modular attachment from the plurality of modular attachments based on an interrogation reading;
    connect the main robot to the respective modular attachment using a universal connection interface;
    adjust at least one gain of at least one dynamic amplifier electromechanically coupled to at least one mechanical output of the main robot on the universal connection interface; and
    communicate with the respective modular attachment, wherein the communication comprises at least one of data communication, mechanical input, or a combination thereof.

12. The non-transitory computer readable storage medium of claim 11, wherein the processor is further configured to execute the computer readable instructions to,
    determine complexity of the respective modular attachment based on a communication signal from the respective modular attachment through the universal connection interface.

13. The non-transitory computer readable storage medium of claim 11, wherein the processor is further configured to execute the computer readable instructions to,
    encode input data based on a protocol stored in the non-transitory computer readable storage medium; and
    decode output data based on the protocol.

14. The non-transitory computer readable storage medium of claim 13, wherein the processor is further configured to execute the computer readable instructions to,
add and remove operations to the protocol based on the complexity and functionality of the respective modular attachment.

15. The non-transitory computer readable storage medium of claim 11, wherein the plurality of computer readable instructions stored thereon further cause the processor to
associate a control component with a task;
associate the task with a modular attachment configured to carry out the task;
determine that the respective modular attachment of the plurality of modular attachments is configured to carry out the task;
determine that the respective modular attachment configured to carry out the task is in operative communication with the main robot; and
direct the control component to the respective modular attachment, thereby instructing the modular attachment to carry out the task.

16. The non-transitory computer readable storage medium of claim 11, wherein the plurality of computer readable instructions stored thereon further cause the processor to
associate a control component with a task;
associate the task with a modular attachment configured to carry out the task;
determine that the modular attachment configured to carry out the task is not in operative communication with the main robot; and
determine that the task cannot be completed.

17. The non-transitory computer readable storage medium of claim 16, wherein the plurality of computer readable instructions stored thereon further cause the processor to provides a user discernible representation that the task cannot be completed.

18. A method for a main robot to utilize a plurality of modular attachments of varying complexity using a universal connection interface comprising:
connecting, via the universal connection interface, the main robotic apparatus to a first modular attachment of a plurality of modular attachments;
performing a first set of tasks with the first modular attachment;
connecting, via the universal connection interface, the main robot to a second modular attachment of the plurality of modular attachments; and
performing a second set of tasks with the second modular attachment, the first and second modular attachments are different modular attachments;
wherein the universal connection interface comprises,
at least one data connection configured to communicate data between the main robot and the plurality of modular attachments of varying complexity and functionality;
a connection unit configured to ensure connection between the main robot and a respective one of the plurality of modular attachments is secure;
at least one dynamic amplifier configured to adjust output of at least one electromechanically coupled mechanical output of the main robot and
a processor coupled to the main robot, the processor configured to execute computer readable instructions to control gain of the at least one dynamic amplifier, the computer readable instructions being stored on a non-transitory storage medium on at least one of the plurality of modular attachments.

19. The method of claim 18, further comprising:
determining, via the universal connection interface, the complexity of an attached respective modular attachment of the plurality of modular attachments based on a signal communicated; and
determining, via the universal connection interface, a number of data communication channels required for the main robot to effectuate control of the attached respective modular attachment based on the complexity of the attached respective modular attachment.

20. The method of claim 18, further comprising:
determining the first modular attachment and the second modular attachment from the plurality of modular attachments based on an interrogation signal transmitted by the main robot to a respective modular attachment.

21. The method of claim 18, further comprising:
sending and receiving a connection confirmation signal between the main robot and a respective modular attachment, the connection confirmation corresponding to secure connection between the main robot and the respective modular attachment, the connection confirmation signal being returned upon proper functioning of all data connections.

22. The method of claim 21, wherein the data connection includes at least one of electrical data connections, mechanical output connections, or a combination thereof.

23. The method of claim 18, further comprising a processor
associating a control component with a task;
associating the task with a modular attachment configured to carry out the task;
determining that the modular attachment configured to carry out the task is in operative communication with the main robot; and
directing the control component to the modular attachment, thereby instructing the modular attachment to carry out the task.

24. The method of claim 23, further comprising the main robot autonomously locating and connecting to the modular attachment configured to carry out the task using the universal connection interface apparatus.

25. The method of claim 18, further comprising a processor
associating a control component with the task;
associating the task with a modular attachment configured to carry out the task;
determining that the modular attachment configured to carry out the task is not in operative communication with the main robot; and
determining that the task cannot be completed.

26. The method of claim 25, further comprising a processor executing computer readable instructions to provides a user discernible representation that the task cannot be completed.

27. A module changing station system comprising:
a non-transitory computer readable memory comprising a plurality of computer readable instructions embodied thereon,
a connection interface for connecting a main robot to a plurality of modular attachments, the universal connection interface comprising,
at least one data connection configured to communicate data between the main robot and a plurality of modular attachments of varying complexity and functionality;

a connection unit configured to ensure connection between the main robot and a respective one of the plurality of modular attachments is secure;
at least one dynamic amplifier configured to adjust output of at least one electromechanically coupled mechanical output of the main robot; and
a processor configured to execute the plurality of computer readable instructions to:
  detect presence of the main robot within a dock of the module changing station system via one or more sensor units;
  control gain of the at least one dynamic amplifier, the computer readable instructions being stored on a non-transitory storage medium on at least one of the plurality of modular attachments;
  detach a current module from the main robot comprising one or more actuator units;
  determine a desired module to be utilized by the main robot to perform a task; and
  attach the desired module to the main robot utilizing the one or more actuator units.

28. The module changing station system of claim 27, wherein the processor is further configured to:
send and receive control and communication signals from the main robot as the robot performs tasks.

* * * * *